United States Patent
Park et al.

(10) Patent No.: US 10,232,680 B2
(45) Date of Patent: Mar. 19, 2019

(54) AIR CIRCULATION CONTROL DEVICE FOR VEHICLE

(71) Applicant: LG ELECTRONICS INC., Seoul (KR)

(72) Inventors: Jongoh Park, Seoul (KR); Wonseok Yoo, Seoul (KR); Jeongsu Kim, Seoul (KR)

(73) Assignee: LG Electronics Inc., Seoul (KR)

(*) Notice: Subject to any disclaimer, the term of this patent is extended or adjusted under 35 U.S.C. 154(b) by 28 days.

(21) Appl. No.: 15/401,162

(22) Filed: Jan. 9, 2017

(65) Prior Publication Data

US 2017/0113512 A1    Apr. 27, 2017

(51) Int. Cl.
| | | |
|---|---|---|
| B60H 1/00 | (2006.01) | |
| B60J 7/057 | (2006.01) | |
| E05F 15/71 | (2015.01) | |
| G06K 9/00 | (2006.01) | |

(52) U.S. Cl.
CPC ......... *B60H 1/00771* (2013.01); *B60H 1/008* (2013.01); *B60H 1/00764* (2013.01); *B60H 1/00778* (2013.01); *B60H 1/00785* (2013.01); *B60H 1/00821* (2013.01); *B60H 1/00849* (2013.01); *B60H 1/00985* (2013.01); *B60J 7/057* (2013.01); *E05F 15/71* (2015.01); *G06K 9/00087* (2013.01); *G06K 9/00208* (2013.01); *G06K 9/00288* (2013.01); *G06K 9/00597* (2013.01); *G06K 9/00798* (2013.01); *G06K 9/00805* (2013.01); *E05Y 2900/542* (2013.01); *E05Y 2900/55* (2013.01)

(58) Field of Classification Search
CPC .......................... B60H 1/00771; B60H 1/008; B60H 1/00821; B60H 1/00849; B60H 1/00985; B60H 3/0085; B60J 7/057; E05F 15/71
See application file for complete search history.

(56) References Cited

U.S. PATENT DOCUMENTS

| | | | |
|---|---|---|---|
| 5,516,041 A * | 5/1996 | Davis, Jr. et al. ........................ B60H 1/00785 |
| 6,314,352 B1* | 11/2001 | Kunimatsu et al. ... G01C 21/26 |
| 2005/0044863 A1* | 3/2005 | Maeda et al. ...... B60H 1/00764 |
| 2008/0006651 A1* | 1/2008 | Arakawa et al. ..... A61M 21/00 |

(Continued)

FOREIGN PATENT DOCUMENTS

| | | |
|---|---|---|
| CN | 101722913 | 6/2010 |
| CN | 101793905 | 8/2010 |

(Continued)

OTHER PUBLICATIONS

EPO machine translation of DE 102012003313 (original DE document published Oct. 4, 2012) (Year: 2012).*

(Continued)

*Primary Examiner* — Behrang Badii
*Assistant Examiner* — David A Testardi
(74) *Attorney, Agent, or Firm* — Fish & Richardson P.C.

(57) ABSTRACT

An air circulation control device that includes a camera configured to capture an outside image of the vehicle; and a processor configured to: identify an object from the outside image, determine that an air circulation mode is a first air circulation mode or a second air circulation mode based on the identified object, and provide a signal including information indicating the air circulation mode is disclosed.

37 Claims, 46 Drawing Sheets

(56) References Cited

U.S. PATENT DOCUMENTS

| | | | |
|---|---|---|---|
| 2008/0168785 A1* | 7/2008 | Sauer et al. | B60H 1/00785 |
| 2008/0188172 A1* | 8/2008 | Hollemans et al. | B60H 1/00742 |
| 2009/0188267 A1* | 7/2009 | Dai et al. | B60H 1/00735 |
| 2009/0265037 A1* | 10/2009 | Bassa | B60H 1/00771 |
| 2012/0034858 A1* | 2/2012 | Reichel et al. | B60H 1/00828 |
| 2013/0141578 A1* | 6/2013 | Chundrlik, Jr. et al. | H04N 7/181 |
| 2016/0318368 A1* | 11/2016 | Alger et al. | B60L 1/008 |

FOREIGN PATENT DOCUMENTS

| | | | |
|---|---|---|---|
| CN | 202271905 | | 6/2012 |
| CN | 102991440 | | 3/2013 |
| CN | 103847463 | | 6/2014 |
| DE | 102004004191 | A1 * | 9/2005 |
| DE | 102004035882 | A1 * | 2/2006 |
| DE | 102007061658 | A1 * | 6/2009 |
| DE | 102009041487 | | 5/2010 |
| DE | 102009041487 | A1 * | 5/2010 |
| DE | 102012003313 | A1 * | 10/2012 |
| DE | 102011055684 | A1 * | 5/2013 |
| EP | 807544 | A2 | 11/1997 |
| EP | 1422089 | A2 * | 5/2004 |
| EP | 1987972 | A2 * | 11/2008 |
| EP | 2896523 | | 7/2015 |
| JP | S64047612 | | 2/1989 |
| JP | 2003072353 | A2 | 3/2003 |
| JP | 2003136935 | | 5/2003 |
| JP | 2003335121 | A * | 11/2003 |
| JP | 2004331019 | | 11/2004 |
| JP | 2004331019 | A * | 11/2004 |
| JP | 2005067531 | | 3/2005 |
| JP | 3837884 | | 10/2006 |
| JP | 2008116359 | A2 | 5/2008 |
| JP | 2008254487 | | 10/2008 |
| JP | 2010195249 | | 9/2010 |
| JP | 2010195249 | A * | 9/2010 |
| JP | 2010208540 | | 9/2010 |
| JP | 2013225205 | A * | 10/2013 |
| JP | 2014125006 | | 7/2014 |
| JP | 2014151698 | | 8/2014 |
| JP | 2015069380 | A * | 4/2015 |
| KR | 100815153 | | 3/2008 |
| KR | 10-2015-0058881 | | 5/2015 |
| WO | 2015099463 | | 7/2015 |
| WO | WO-2015/099463 | A1 * | 7/2015 |

OTHER PUBLICATIONS

JPO machine translation of JP 2010-195249 (original JP document published Sep. 9, 2010) (Year: 2010).*
EPO machine translation of DE 102009041487 (original DE document published May 20, 2010) (Year: 2010).*
EPO machine translation or EP 1987972 (original EP document published Nov. 5, 2008) (Year: 2008).*
EPO machine translation or DE 102011055684 (original DE document published May 29, 2013) (Year: 2013).*
EPO machine translation or EP 1422089 (original EP document published May 26, 2004) (Year: 2004).*
Extended European Search Report in European Application No. 17150051.5, dated Jun. 8, 2017, 13 pages (with English translation).
European Office Action in European Application No. 17 150 051.5, dated Feb. 15, 2018, 5 pages.
Chinese Office Action in Chinese Application No. 201611010030.6, dated Nov. 30, 2018, 22 pages.

* cited by examiner

200d

200f

2117

2118

2120

2311

2211

2212

AIR CIRCULATION CONTROL DEVICE FOR VEHICLE

CROSS-REFERENCE TO RELATED APPLICATION

This application claims the benefit of Korean Patent Application No. 10-2016-0002063, filed on Jan. 7, 2016, the contents of which are hereby incorporated by reference herein in its entirety.

TECHNICAL FIELD

The present disclosure generally relates technologies about an air circulation control device for a vehicle.

BACKGROUND

A vehicle is an apparatus that moves into a specific direction as a driver operates. A common example of a vehicle is a car.

A vehicle air conditioning system allows a driver or a passenger to choose between an outside air circulation mode and an inside air circulation mode. In the outside air circulation mode, the vehicle air conditioning system may bring outside air into a cabin of the vehicle. In the inside air circulation mode, the vehicle air conditioning system may recirculate air that is already in the cabin of the vehicle.

SUMMARY

This specification generally describes an air circulation control device for a vehicle.

In general, one innovative aspect of the subject matter described in this specification can be embodied in an air circulation control device comprising: a camera configured to capture an outside image of the vehicle; and a processor configured to: identify an object from the outside image, determine that an air circulation mode is a first air circulation mode or a second air circulation mode based on the identified object, and provide a signal including information indicating the air circulation mode.

The foregoing and other embodiments can each optionally include one or more of the following features, alone or in combination. In particular, one embodiment includes all the following features in combination. The processor is further configured to determine that the air circulation mode is the first air circulation mode or the second air circulation mode based on location information, wind direction information, or wind speed information, the location information indicating a location of the object, the wind direction information indicating a wind direction relative to the vehicle, and the wind speed information indicating a wind speed relative to the vehicle. The processor is configured to generate the location information, the wind direction information, and the wind speed information based on the outside image. The processor is configured to: determine a wind direction from the object toward the vehicle, determine a distance between the object and the vehicle, and determine, based on the wind direction and the distance, that the air circulation mode is the first air circulation mode or the second air circulation mode. The processor is configured to: determine a wind direction from the object toward the vehicle based on the outside image, the location information, and the wind direction information, determine a distance between the object and the vehicle, determine that a current lane that the object is located is a traveling lane of the vehicle or an opposite lane of the vehicle, and determine, based on the wind direction, the distance, and the current lane, that the current air circulation mode is the first air circulation mode or the second air circulation mode. The processor is configured to: determine a wind direction from the object toward the vehicle based on the outside image, the location information, and the wind direction information, determine a distance between the object and the vehicle, determine that a current location of the object is a sidewalk adjacent to a traveling lane of the vehicle, and determine, based on the wind direction, the distance, the current location of the object, that the air circulation mode is the first air circulation mode or the second air circulation mode. The processor is configured to determine that the air circulation mode is the first air circulation mode or the second air circulation mode based on distance information indicating a distance between the object and the vehicle. The processor is configured to determine that the air circulation mode is the first air circulation mode or the second air circulation mode based on wind direction information or wind speed information, the wind direction information indicating a wind direction relative to the vehicle, and the wind speed information indicating a wind speed relative to the vehicle. The processor is configured to generate the distance information based on the outside image. The air circulation control device further comprises one or more object sensors configured to measure a distance between an object and the vehicle, wherein the processor is configured to obtain the distance information from the one or more object sensors. The processor is configured to determine that the air circulation mode is the first air circulation mode or the second air circulation mode based on speed information indicating a speed of the vehicle relative to the object. The processor is configured to provide, based on a determination that the air circulation mode is the first air circulation mode, a signal that results in a process to reduce condensation inside the vehicle. The processor is configured to provide, based on a determination that the air circulation mode is the first air circulation mode, a signal that adjusts a temperature inside the vehicle. The processor is configured to: determine that a current temperature inside the vehicle satisfies a threshold temperature, and provide, based on the determination that the current temperature inside the vehicle satisfies the threshold temperature, a signal including information indicating a duration of the air circulation mode. The processor is configured to: identify a traffic light in the outside image, determine whether the identified traffic light indicates go or stop, and determine, based on the determination whether the identified traffic light indicates go or stop, that the air circulation mode is the first air circulation mode or the second air circulation mode. The processor is configured to: identify one or more vehicles from the outside image, determine that a number of the one or more vehicles satisfies a threshold, and determine, based on the determination that the number of the one or more vehicles satisfies the threshold, that the air circulation mode is the first air circulation mode or the second air circulation mode. The processor is configured to: obtain a current speed of the vehicle, determine that the vehicle is travelling or stopping based on the current speed, and determine, based on the determination that the vehicle is travelling or stopping, that the air circulation mode is the first air circulation mode or the second air circulation mode. The processor is configured to determine, based on the determination whether an object is identified, that the air circulation mode is the first air circulation mode or the second air circulation mode. The processor is configured to: identify an intersection from the outside image, identify a first vehicle crossing the intersection, determine that the first vehicle is within a threshold distance from the vehicle, determine whether the vehicle is traveling or stopping, and determine, based on the determination that the first vehicle is within the threshold distance from the vehicle and the determination of whether the vehicle is travelling or stopping, that the air circulation mode is the first air circulation mode or the second air circulation mode. The processor is configured to: determine whether the identified object is one of a diesel vehicle, a motor cycle, a garbage vehicle, a truck, a construction sign board, a soundproof wall, a parking lot gate, an automatic wash gate, a vehicle carrying a smoking passenger, or a smoking pedestrian, and determine, based on the determination of whether the identified object is one of a diesel vehicle, a motor cycle, a garbage vehicle, a truck, a construction sign board, a soundproof wall, a parking lot gate, an automatic wash gate, a vehicle carrying a smoking passenger, or a smoking pedestrian, that the air circulation mode is the first air circulation mode or the second air circulation mode. The processor is configured to: determine whether the identified object is one or more trees, one or more flowers, or an orchard, and determine, based on the determination of whether the identified object is the one or more trees, the one or more flowers, or the orchard, that the air circulation mode is the first air circulation mode or the second air circulation mode. The air circulation control device further comprises an interface unit configured to communicate with a user device or a control unit of the vehicle, wherein the processor is configured to: receive user information using the interface unit, and determine, based on the user information, that the air circulation mode is the first air circulation mode or the second air circulation mode. The processor is configured to: determine whether the user information includes pollen allergy information of a user, determine whether the identified object includes one or more allergy-causing plants, and determine, based on the pollen allergy information of the user and the determination of whether the identified object includes one or more allergy-causing plants, that the air circulation mode is the first air circulation mode or the second air circulation mode. The processor is configured to: determine that the identified object includes a restaurant sign or smoke from a restaurant, and determine, based on the determination that the identified object includes a restaurant sign or smoke from a restaurant, that the air circulation mode is the first air circulation mode or the second air circulation mode. The air circulation control device further comprises an odor sensor configured to detect a certain type of material from outside air of the vehicle, wherein the processor is configured to determine, based on the type of material detected by the odor sensor, that the air circulation mode is the first air circulation mode or the second air circulation mode. The processor is configured to: determine whether the type of material detected by the odor sensor satisfies a threshold level, and determine, based on the determination that the type of material detected by the odor sensor satisfies the threshold level, that the air circulation mode is the first air circulation mode or the second air circulation mode. The air circulation control device further comprises an output unit configured to communicate with an external device for providing the signal including information indicating the air circulation mode. The output unit includes a display unit and the processor is configured to provide graphics data associated with the air circulation mode to the display unit. The graphics data include first graphics data indicating the air circulation mode and second graphics data indicating a cause of changing an air circulation mode. The air circulation control device further comprises an interface unit configured to communicate with a user device or a control unit of the vehicle, wherein the processor is configured to: obtain a current temperature inside the vehicle and a threshold temperature that reduces risk of condensation inside the vehicle using the interface unit, determine, based on the current temperature inside the vehicle and the threshold temperature that reduces risk of condensation inside the vehicle, whether condensation will occur inside the vehicle, and provide, based on a determination that condensation will likely occur inside the vehicle, a signal that results in a process directed to reducing condensation inside the vehicle. The signal that results in a process directed to reducing condensation inside the vehicle includes information indicating a temperature difference between the current temperature inside the vehicle and the threshold temperature that reduces risk of condensation inside the vehicle. The processor is configured to provide, based on a determination that condensation will occur inside the vehicle, a signal for controlling a window or a sunroof. The signal for controlling the window or the sunroof includes information indicating a temperature difference between the current temperature inside the vehicle and the threshold temperature that reduces risk of condensation inside the vehicle. The air circulation control device further comprises an interface unit configured to obtain vehicle internal humidity information, wherein the processor is configured to determine whether condensation will occur inside the vehicle based on the vehicle internal humidity information, and provide, based on the determination that condensation will occur inside the vehicle, a signal that results in a process that reduces condensation inside the vehicle. The first air circulation mode indicates circulating air inside the vehicle without bringing in air outside the vehicle and the second air circulation mode indicates circulating air inside the vehicle by bringing in air outside the vehicle. The air circulation control device further comprises one or more wind sensors configured to detect a wind direction and a wind speed, wherein the processor is configured to generate the wind direction information and the wind speed information based on the wind direction and the wind speed that are detected by the one or more wind sensors.

In general, another innovative aspect of the subject matter described in this specification can be embodied in a vehicle comprising: an air circulation controlling unit; and an air quality monitoring unit that includes: a camera configured to capture an outside image of the vehicle, and a processor configured to (i) identify an object from the outside image, (ii) determine that an air circulation mode is a first air circulation mode or a second air circulation mode based on the identified object, and (iii) provide a signal including information indicating the air circulation mode, wherein the air circulation controlling unit is configured to circulate air inside the vehicle based on the signal including information indicating the air circulation mode.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A vehicle may include any one of an internal combustion vehicle equipped with an engine as a power source, a hybrid vehicle equipped with an engine and an electrical motor as power sources, an electric vehicle equipped with an electrical motor as a power source, and a fuel cell vehicle equipped with an electrical motor as a power source.

In the following description, the left of a vehicle means a left side with respect to a traveling direction, and the right of the vehicle means a right side with respect to the traveling direction. Front or ahead means a straight forward traveling direction of the vehicle, and rear or reverse means a backward traveling direction of the vehicle.

Figure 1:
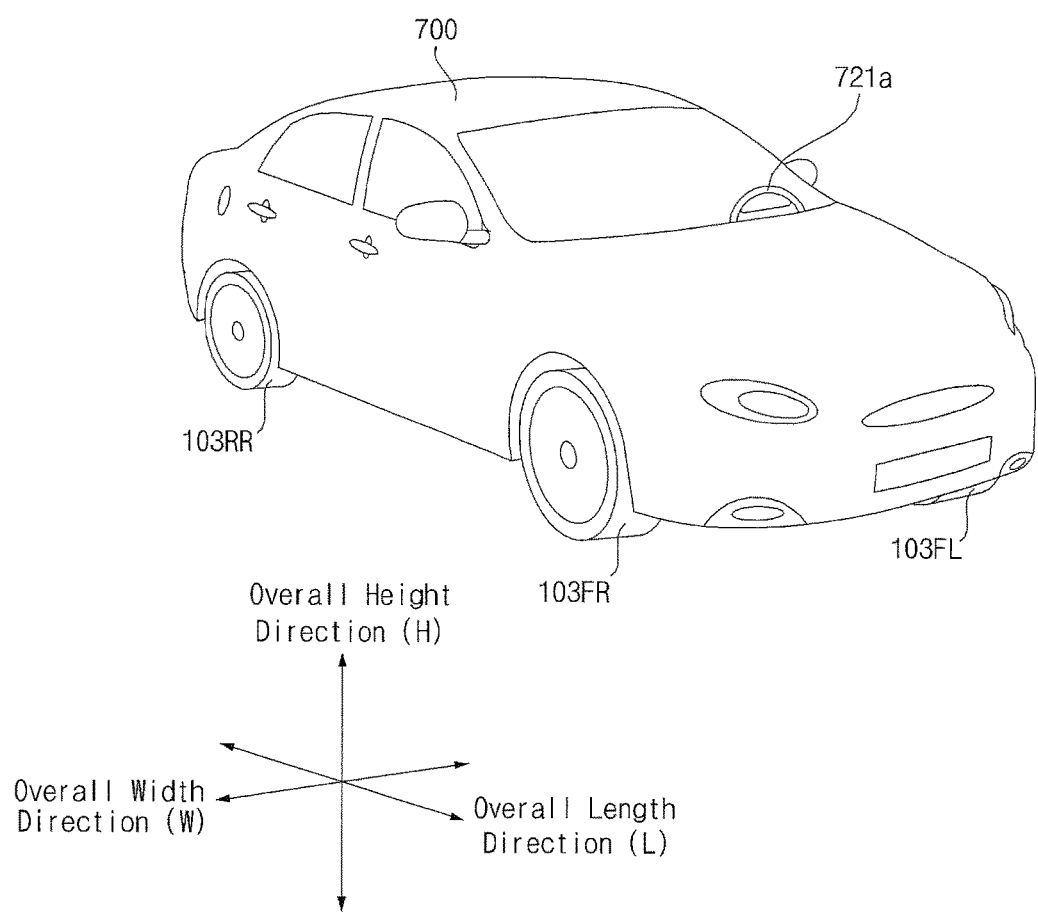
FIG. 1 is a diagram illustrating an example exterior of a vehicle.

FIG. 1 illustrates an example exterior of a vehicle.

Figure 3:
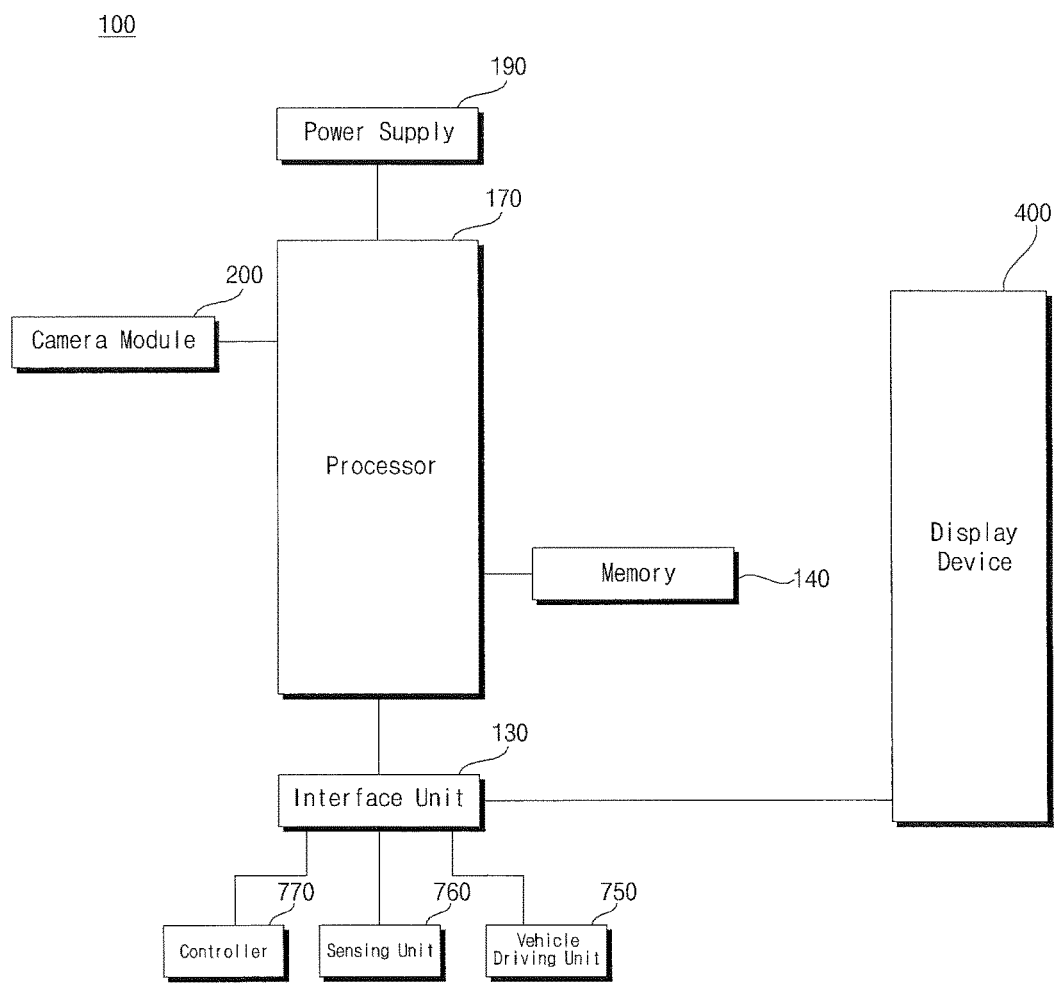
FIG. 3 is a block diagram illustrating an example air circulation control device for a vehicle.

Referring to FIG. 1, a vehicle 700 may include wheels 103FR, 103FL, 103RR . . . , a steering input device 721a for controlling a traveling direction of the vehicle 700, and a vehicle air circulation control device 100 (FIG. 3).

The vehicle air circulation control device 100 may provide a signal for controlling a Heating, Ventilating, and Air Conditioning (HVAC) unit to switch to an outside air circulation mode or an inside air circulation mode according to object information acquired by a camera module.

FIGS. 2A to 2F illustrates an example camera module.

Figure 2A:
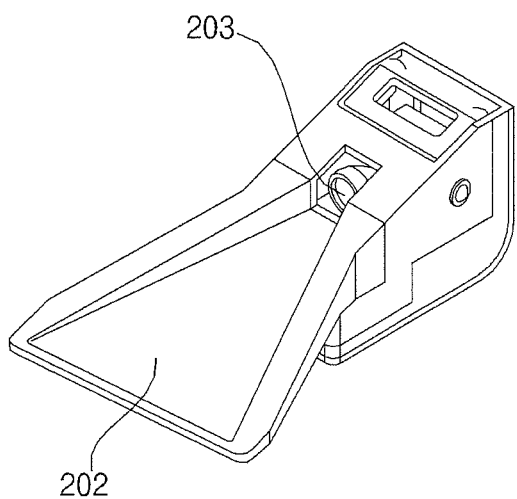
FIGS. 2A to 2F are diagrams of an example camera module.

Referring to FIG. 2A, a camera module 200a may include an image sensor (for example, a Charged Coupled Device (CCD) or Complementary Metal Oxide Semiconductor (CMOS) image sensor), a lens 203, and a light shield 202 for shielding part of light incident on the lens 203.

The camera module 200a may be configured to be detachably attached to a ceiling or a windshield inside the vehicle 700.

The camera module 200a may acquire an image of the surroundings of the vehicle 700. For example, the camera module 200a may acquire a vehicle front-view image or a vehicle rear-view image. The image acquired through the camera module 200a may be transmitted to a processor.

For example, an image acquired from the mono camera module 200a may be referred to as a mono image.

The camera module described above with reference to FIG. 2A may be referred to as a mono camera module or a single camera module.

Figure 2B:
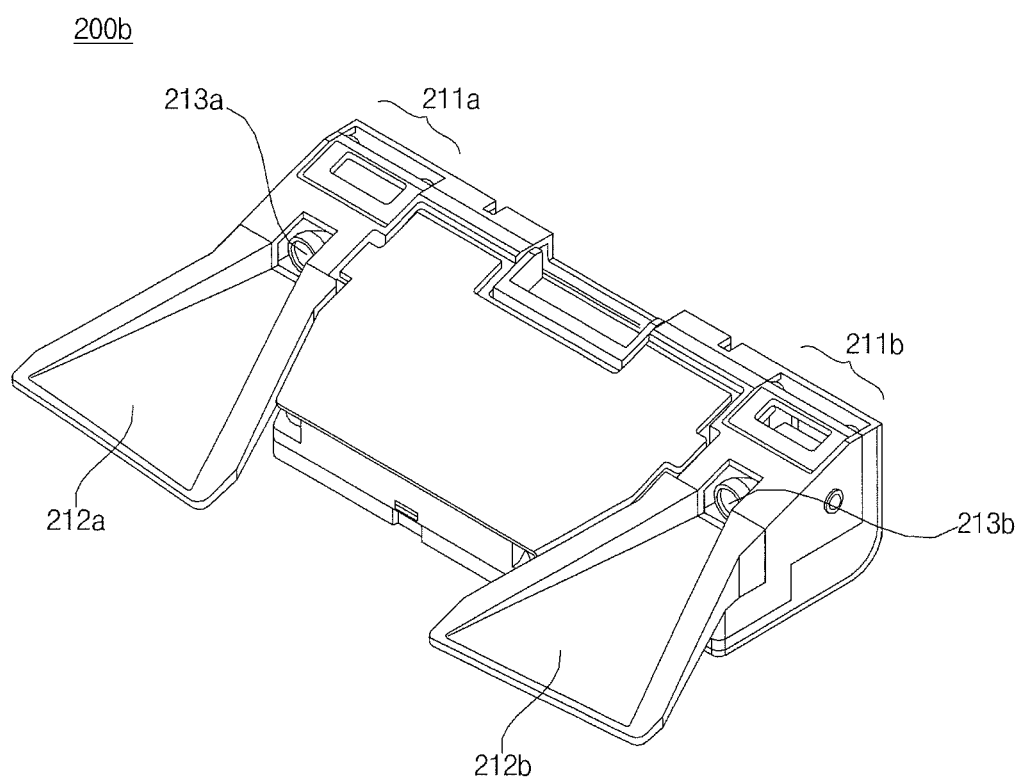

Referring to FIG. 2B, a camera module 200b may include a first camera 211a and a second camera 211b. The first camera 211a may include a first image sensor (for example, a first CCD or CMOS image sensor) and a first lens 213a. The second camera 211b may include a second image sensor (for example, a second CCD or CMOS image sensor) and a second lens 213b.

In some implementations, the camera module 200b may include a first light shield 212a and a second light shield 212b, for shielding part of light incident on the first lens 213a and the second lens 213b.

The camera module 200b may be configured to be detachably attached to the ceiling or the windshield inside the vehicle 700.

The camera module 200b may acquire an image of the surroundings of the vehicle 700. For example, the camera module 200b may acquire a vehicle front-view image or a vehicle rear-view image. An image acquired through the camera module 200b may be transmitted to a processor.

In some implementations, images acquired from the first camera 211a and the second camera 211b may be referred to as stereo images.

The camera module described above with reference to FIG. 2B may be referred to as a stereo camera module.

Figure 2C:
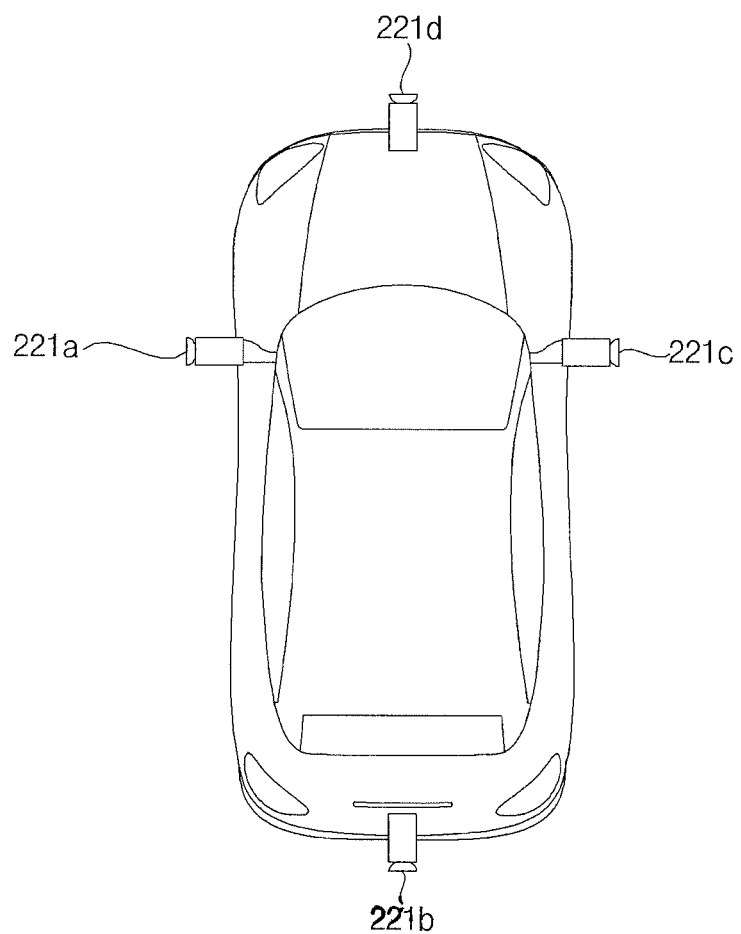

Referring to FIG. 2C, a camera module 200c may include a plurality of cameras 221a, 221b, 221c, and 221d.

For example, a left camera 221a may be installed in a case surrounding a left side mirror, and a right camera 221c may be installed in a case surrounding a right side mirror. A front camera 221d may be installed in an area of a front bumper, and a rear camera 221b may be installed in an area of a trunk lid.

The plurality of cameras 221a, 22b, 221c, and 221d may be arranged at the left side, rear, right side, and front of the vehicle, respectively. Each of the cameras 221a, 22b, 221c, and 221d may include an image sensor (for example, a CCD or CMOS image sensor) and a lens.

The camera module 200c may acquire an image of the surroundings of the vehicle. For example, the camera module 200c may acquire a vehicle front-view image, a vehicle rear-view image, a vehicle left side-view image, and a vehicle right side-view image. An image acquired through the camera module 200c may be transmitted to a processor.

In some implementations, images acquired from the plurality of cameras 221a, 22b, 221c, and 221d illustrated in FIG. 2C or a synthetic image of the acquired images may be referred to as an around-view image.

The camera module described above with reference to FIG. 2C may be referred to as an around-view camera module.

Figure 2D:
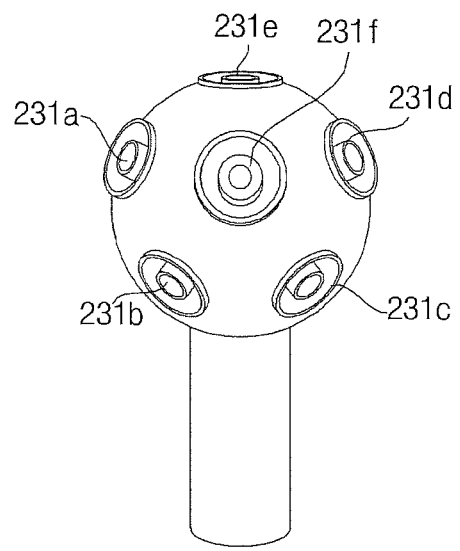

Referring to FIG. 2D, a camera module 200*d* may include a plurality of cameras 231*a*, 23*b*, 231*c*, 231*d*, 231*e*, 231*f*. The exterior of the camera module 200*d* may be shaped into a sphere on the whole. The plurality of cameras 231*a*, 23*b*, 231*c*, 231*d*, 231*e*, 231*f* may be arranged at predetermined intervals in different directions.

The camera module 200*d* may be installed in an area of a body of the vehicle 700. For example, the camera module 200*d* may be installed on a roof of the vehicle 700.

The camera module 200*d* may acquire an omnidirectional image of the surroundings of the vehicle 700. The camera module 200*d* may acquire a vehicle front-view image, a vehicle rear-view image, a vehicle left side-view image, a vehicle right side-view image, a vehicle top-view image, and a vehicle bottom-view image with respect to the vehicle 700.

The camera module 200*d* may acquire an image of the surroundings of the vehicle 700. Each of the plurality of cameras 231*a*, 23*b*, 231*c*, 231*d*, 231*e*, 231*f* may acquire images in different directions. For example, the camera module 200*d* may acquire a vehicle front-view image, a vehicle rear-view image, a vehicle left side-view image, a vehicle right side-view image, a vehicle top-view image, and a vehicle bottom-view image. An image acquired through the camera module 200*d* may be transmitted to a processor.

In some implementations, images acquired from the plurality of cameras 231*a*, 23*b*, 231*c*, 231*d*, 231*e*, 231*f* in FIG. 2D or a synthetic image of the acquired images may be referred to as an omnidirectional image.

To allow each of the plurality of cameras 231*a*, 23*b*, 231*c*, 231*d*, 231*e*, 231*f* to acquire an omnidirectional image of the outside of the vehicle 700, the number and positions of the cameras 231*a*, 23*b*, 231*c*, 231*d*, 231*e*, 231*f*, . . . included in the camera module 200*d* may be determined appropriately. Each of the cameras 231*a*, 23*b*, 231*c*, 231*d*, 231*e*, 231*f* may have an appropriate angle of view so that an image acquired by the camera may overlap partially with an image acquired from an adjacent camera.

Figure 2E:
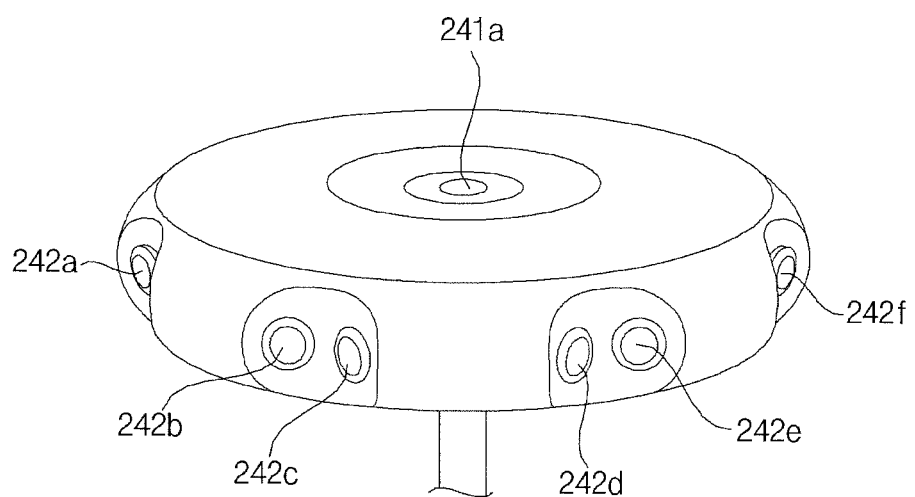

Referring to FIG. 2E, a camera module 200*e* may include a plurality of cameras 241*a*, 242*a*, 242*b*, 242*c*, 242*d*, 242*e*, 242*f*. The exterior of the camera module 200*e* may be shaped into a disc on the whole. The plurality of cameras 241*a*, 242*a*, 242*b*, 242*c*, 242*d*, 242*e*, 242*f* may be arranged at predetermined intervals in different directions.

The camera module 200*e* may be installed in an area of the body of the vehicle 700. For example, the camera module 200*d* may be installed on the roof of the vehicle 700.

The camera module 200*e* may acquire an omnidirectional image of the surroundings of the vehicle 700. The camera module 200*e* may acquire a vehicle front-view image, a vehicle rear-view image, a vehicle left side-view image, a vehicle right side-view image, a vehicle top-view image, and a vehicle bottom-view image with respect to the vehicle 700.

Each of the plurality of cameras 241*a*, 242*a*, 242*b*, 242*c*, 242*d*, 242*e*, 242*f* may include an image sensor (for example, a CCD or CMOS image sensor) and lens.

The camera module 200*e* may acquire an image of the surroundings of the vehicle. Each of the plurality of cameras 241*a*, 242*a*, 242*b*, 242*c*, 242*d*, 242*e*, 242*f* may acquire images in a plurality of directions. For example, the camera module 200*e* may acquire a vehicle front-view image, a vehicle rear-view image, a vehicle left side-view image, a vehicle right side view image, a vehicle top-view image, and a vehicle bottom-view image. An image acquire through the camera module 200*e* may be transmitted to a processor.

In some implementations, images acquired from the plurality of cameras 241*a*, 242*a*, 242*b*, 242*c*, 242*d*, 242*e*, 242*f* illustrated in FIG. 2E or a synthetic image of the acquired images may be referred to as an omnidirectional image.

To allow each of the plurality of cameras 241*a*, 242*a*, 242*b*, 242*c*, 242*d*, 242*e*, 242*f* to acquire an omnidirectional image of the outside of the vehicle 700, the number and positions of the cameras 241*a*, 242*a*, 242*b*, 242*c*, 242*d*, 242*e*, 242*f* included in the camera module 200*e* may be determined appropriately. Among the cameras 241*a*, 242*a*, 242*b*, 242*c*, 242*d*, 242*e*, 242*f*, for example, the first camera 241*a* may acquire a top-view image of the vehicle 700. In this case, the first camera 241*a* is preferably a wide-angle camera. The other cameras 242*a*, 242*b*, 242*c*, 242*d*, 242*e*, 242*f*, except for the first camera 241*a* may acquire side-view images and bottom-view images of the vehicle 700.

Figure 2F:
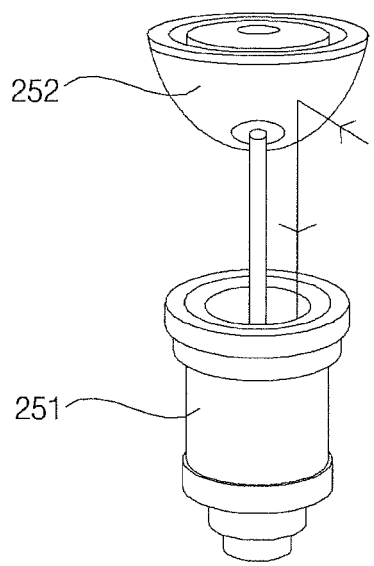

Referring to FIG. 2F, a camera module 200*f* may include a camera 252 and a parabolic mirror 251.

The camera module 200*f* may be installed in an area of the body of the vehicle 700. For example, the camera module 200*f* may be installed on the roof of the vehicle 700.

The camera module 200*f* may acquire an omnidirectional image of the surroundings of the vehicle 700. The camera module 200*f* may acquire a vehicle front-view image, a vehicle rear-view image, a vehicle left side-view image, a vehicle right side view image, a vehicle top-view image, and a vehicle bottom-view image with respect to the vehicle 700.

The camera 252 may include an image sensor (for example, a CCD or CMOS image sensor) and a lens. The camera module 200*f* may acquire an image of the surroundings of the vehicle. The camera 252 may acquire an image reflected on the parabolic mirror 251. An image acquired from the camera 252 may be transmitted to the processor 170 and processed by a predetermined image processing algorithm.

In some implementations, images acquired through the camera 252 illustrated in FIG. 2F or an image obtained by processing the acquired images may be referred to an omnidirectional image.

The camera modules described with reference to FIGS. 2D to 2G may be referred to as omnidirectional camera modules.

FIG. 3 illustrates an example air circulation control device for a vehicle.

Referring to FIG. 3, the vehicle air circulation control device 100 may include the camera module 200, an interface unit 130, a memory 140, the processor 170, and a power supply 190.

The camera module 200 may acquire an image of the surroundings of the vehicle.

Data, a signal, or information generated from the camera module 200 is transmitted to the processor 170.

The camera module 200 may be a camera module described before with reference to FIGS. 2A to 2F.

For example, the camera module 200 may be the mono camera module 200*a*. The mono camera module 200*a* may acquire a mono image as an image of the surroundings of the vehicle.

For example, the camera module 200 may be the stereo camera module 200*b*. The stereo camera module 200*b* may acquire a stereo image as an image of the surroundings of the vehicle.

For example, the camera module 200 may be the around-view camera module 200*c*. The around-view camera module 200*c* may acquire an around-view image as an image of the surroundings of the vehicle.

For example, the camera module 200 may be the omnidirectional camera module 200d, 200e, or 200f. The omnidirectional camera module 200d, 200e, or 200f may acquire an omnidirectional image as an image of the surroundings of the vehicle.

The interface unit 130 may receive information, a signal, or data or transmit information, a signal, or data processed or generated by the processor 170 to the outside. For this purpose, the interface unit 130 may conduct wireless or wired data communication with a controller 770 inside the vehicle, an in-vehicle display device 400, a sensing unit 760, and a vehicle driving unit 750.

The interface unit 130 may receive navigation information by data communication with the controller 770, the in-vehicle display device 400, or a separate navigation device. The navigation information may include information about a destination that has been set, information about a route to the destination, map information related to driving of the vehicle, and information about a current location of the vehicle. In some implementations, the navigation information may include information about a location of the vehicle on a road.

The interface unit 130 may receive sensor information from the controller 770 or the sensing unit 760.

The sensor information may include at least one of vehicle heading information, vehicle location information (Global Positioning System (GPS) information), vehicle angle information, vehicle speed information, vehicle acceleration information, vehicle inclination information, vehicle forward or backward moving information, battery information, fuel information, tire information, vehicle lamp information, vehicle internal temperature information, vehicle ambient temperature information, vehicle internal humidity information, vehicle ambient humidity information, and information indicating whether it is raining.

The sensor information may be acquired from a heading sensor, a yaw sensor, a gyro sensor, a position module, a vehicle forward or backward moving sensor, a wheel sensor, a vehicle speed sensor, a vehicle body inclination sensor, a battery sensor, a fuel sensor, a tire sensor, a hand rotation-based steering sensor, a vehicle internal temperature sensor, a vehicle ambient temperature sensor, a vehicle internal humidity sensor, a vehicle ambient humidity sensor, a rain sensor, a GPS sensor, etc.

Among the sensor information, the vehicle heading information, the vehicle location information, the vehicle angle information, the vehicle speed information, the vehicle inclination information, etc. which are related to traveling of the vehicle may be referred to vehicle traveling information.

Figure 7:
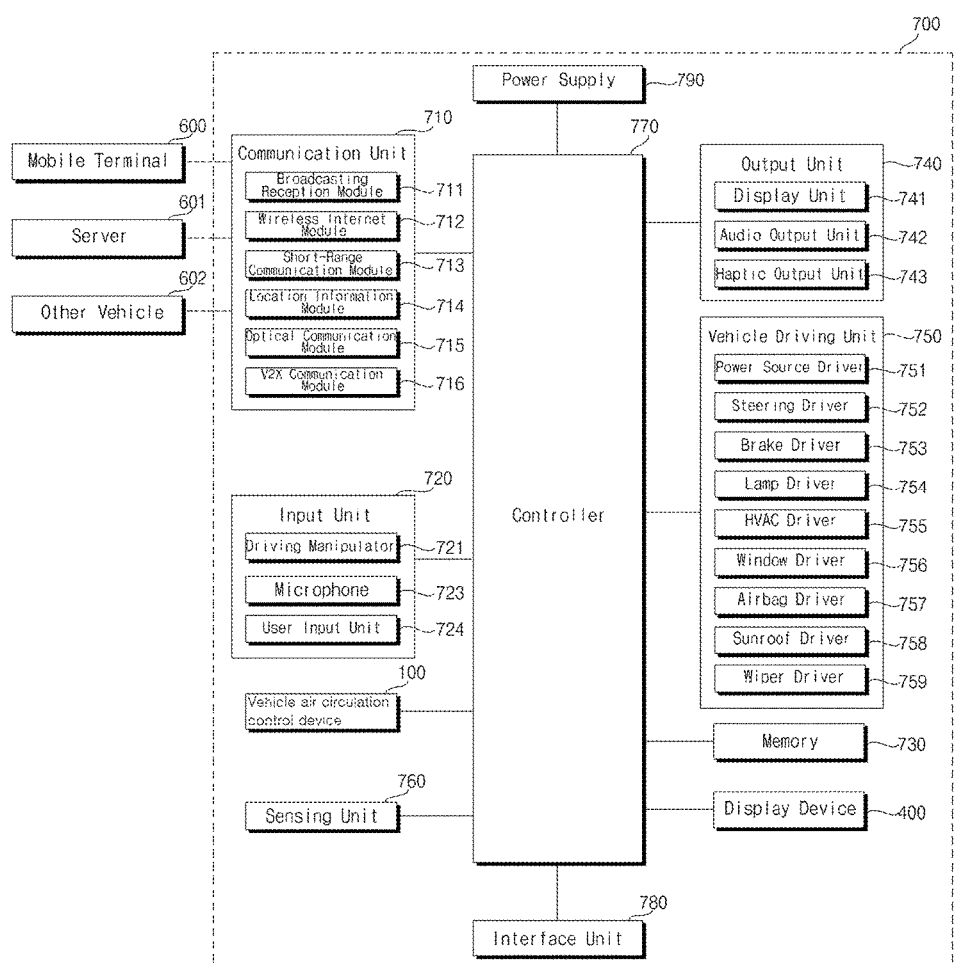
FIG. 7 is a block diagram illustrating an example vehicle.

The interface unit 130 may provide an HVAC control signal to the controller 770 or an HVAC driver 755 (FIG. 7). For example, the processor 170 may provide a signal for controlling switching to the outside air circulation mode or the inside air circulation mode to the HVAC driver 755.

The interface unit 130 may receive passenger information. The passenger information may be received through an input device. Or the passenger information may be information acquired through a passenger sensor (for example, a camera that captures a passenger state). Or the passenger information may be information received from a mobile terminal carried with a passenger.

For example, the interface unit 130 may receive pollen allergy information about a passenger. The pollen allergy information may be received through an input device by an input of the passenger. Or the pollen allergy information may be received from a mobile terminal 600 carried with the passenger.

The memory 140 may store various data for overall operations of the vehicle air circulation control device 100, such as programs for processing or control in the processor 170.

The memory 140 may store data for verifying an object. For example, when a specific object is detected in an image acquired through the camera module 200, the memory 140 may store data for identifying the object by a predetermined algorithm.

In some implementations, the memory 140 may be, in hardware, any of various storage devices such as Read Only Memory (ROM), Random Access Memory (RAM), Erasable and Programmable ROM (EPROM), flash drive, hard drive, etc. The memory 140 may be integrated with the processor 170.

The processor 170 may provide overall control to each unit of the vehicle air circulation control device 100. The processor 170 may be electrically connected to each unit of the vehicle air circulation control device 100.

The processor 170 may subject an image of the surroundings of the vehicle acquired by the camera module 200 to image processing. The processor 170 may perform computer vision-based signal processing on the image of the surroundings of the vehicle.

The processor 170 may synthesize a plurality of images received from the around-view camera module 200c illustrated in FIG. 2C. The plurality of images are received from the plurality of cameras 221a, 22b, 221c, and 221d illustrated in FIG. 2C. The processor 170 may generate an around-view image by synthesizing the plurality of images. For example, the around-view image may be a top-view image.

The processor 170 may detect at least one object based on each image acquired from the plurality of cameras 221a, 22b, 221c, and 221d illustrated in FIG. 2C. Or the processor 170 may detect at least one object based on an around-view image.

The processor 170 may synthesize a plurality of images received from the omnidirectional camera module 200d illustrated in FIG. 2D. The plurality of images are received from the plurality of cameras 231a, 23b, 231c, 231d, 231e, 231f, . . . illustrated in FIG. 2D.

The processor 170 may synthesize all images based on specific feature points detected from parts overlapped between images acquired from the respective cameras 231a, 23b, 231c, 231d, 231e, 231f illustrated in FIG. 2D. For example, the processor 170 may detect a common feature point in an area overlapped between a first image acquired from the first camera 231a and a second image acquired from the second camera 231b. The processor 170 may synthesize the first image and the second image based on the detected feature point. In this manner, the processor 170 may generate an omnidirectional image by synthesizing a plurality of images received from the plurality of cameras 231a, 23b, 231c, 231d, 231e, 231f in FIG. 2D.

The processor 170 may detect at least one object based on each image acquired through the plurality of cameras 231a, 23b, 231c, 231d, 231e, 231f illustrated in FIG. 2D. Or the processor 170 may detect at least one object based on an omnidirectional image.

The processor 170 may synthesize a plurality of images in the omnidirectional camera module 200e illustrated in FIG. 2E. The plurality of images are received from the plurality of cameras 241a, 242a, 242b, 242c, 242d, 242e, 242f illustrated in FIG. 2E in FIG. 2E.

An image acquired from the first camera 241a in FIG. 2E may be partially overlapped with each image acquired from the other cameras 242a, 242b, 242c, 242d, 242e, 242f of FIG. 2E among the plurality of cameras 241a, 242a, 242b, 242c, 242d, 242e, 242f of FIG. 2E. The processor 170 may synthesize images based on specific feature points detected in the overlapped parts.

Also, images acquired from the other cameras (242a, 242b, 242c, 242d, 242e, 242f in FIG. 2E except for the first camera 241a among the plurality of cameras 241a, 242a, 242b, 242c, 242d, 242e, 242f in FIG. 2E may partially overlap with each other. The processor 170 may synthesize images based on specific feature points detected in the overlapped parts.

The processor 170 may generate an omnidirectional image by synthesizing a plurality of images received from the plurality of cameras 241a, 242a, 242b, 242c, 242d, 242e, 242f in FIG. 2E.

The processor 170 may detect at least one object based on each of images acquired from the plurality of cameras 241a, 242a, 242b, 242c, 242d, 242e, 242f in FIG. 2E. Or the processor 170 may detect at least one object based on an omnidirectional image. The vehicle air circulation control device 100 may track movement of the detected object.

The processor 170 may detect at least one object based on each image acquired from the omnidirectional camera module 200f. Or the vehicle air circulation control device 100 may detect at least one object based on an omnidirectional image. The vehicle air circulation control device 100 may track movement of the detected object.

The processor 170 may detect an object in an image of the surroundings of the vehicle. During the object detection, the processor 170 may perform Lane Detection (LD), Vehicle Detection (VD), Pedestrian Detection (PD), Brightspot Detection (BD), Traffic Sign Recognition (TSR), road surface detection, structure detection, etc. The processor may identify the object.

For example, the processor 170 may detect an object based on at least one of a light intensity, a color, a histogram, a feature point, a shape, a space position, and a motion.

The processor 170 may verify the detected object. The processor 170 may verify the detected object by a neural network-based verification scheme, a Support Vector Machine (SVM) scheme, a Haar-like based AdaBoost verification scheme, or a Histograms of Oriented Gradients (HOG) scheme. In this case, the processor 170 may perform object verification by comparing an object detected in an image of the surroundings of the vehicle with data stored in the memory 140.

The processor 170 may track the verified object. The processor 170 may calculate a motion or motion vector of the verified object, and track movement of the object based on the calculated motion or motion vector.

The processor 170 may provide a signal for controlling the HVAC unit to switch to the outside air circulation mode or the inside air circulation mode, based on the detected object.

For example, the processor 170 may determine a current air circulation mode is a first air circulation mode or a second air circulation mode based on the identified object. The processor 170 may provide a signal including information indicating the current air circulation mode.

Herein, the first air circulation mode may be the inside air circulation mode. The inside air circulation mode may indicate circulating air inside the vehicle without bringing in air outside the vehicle. The second air circulation mode may be the outside air circulation mode. The outside air circulation mode may indicate circulating air inside the vehicle by bringing in air outside the vehicle.

The processor 170 may determine whether to switch the HVAC unit to the outside air circulation mode or the inside air circulation mode based on information about the location of the object with respect to the vehicle 700, wind direction information, or wind speed information.

For example, in a state where a contamination-causing object, a contamination-inducing object, or a contamination-indicating object has been detected as an object, upon acquisition of information about wind blowing toward the vehicle from the position of the object, the processor 170 may determine to switch to the inside air circulation mode.

For example, in a state where an air-purifying tree or forest has been detected as an object, upon acquisition of information about wind blowing toward the vehicle from the position of the object, the processor 170 may determine to switch to the outside air circulation mode.

The processor 170 may generate location information about an object based on an image of the surroundings of the vehicle. The processor 170 may generate the location information about the object by object tracking.

The processor 170 may generate wind direction information or wind speed information based on an image of the surroundings of the vehicle.

For example, the processor 170 may detect a wind vane or a wind cone in an image of the surroundings of the vehicle. The processor 170 may generate wind direction information based on a direction in which the wind vane or the wind cone is directed.

For example, the processor 170 may detect a wind vane or a wind cone in an image of the surroundings of the vehicle. The processor 170 may generate wind speed information based on a rotation speed of a blade of the wind vane or an angle of the wind cone with respect to the ground.

For example, the processor may detect snow, fallen leaves, cherry flower petals, etc. in an image of the surroundings of the vehicle. The processor 170 may generate wind direction information or wind speed information based on a pattern in which the snow, the fallen leaves, the cherry flower petals, etc. are blowing.

In some implementations, snow, fallen leaves, and cherry flower petals may be referred to as floating matters.

Figure 4:
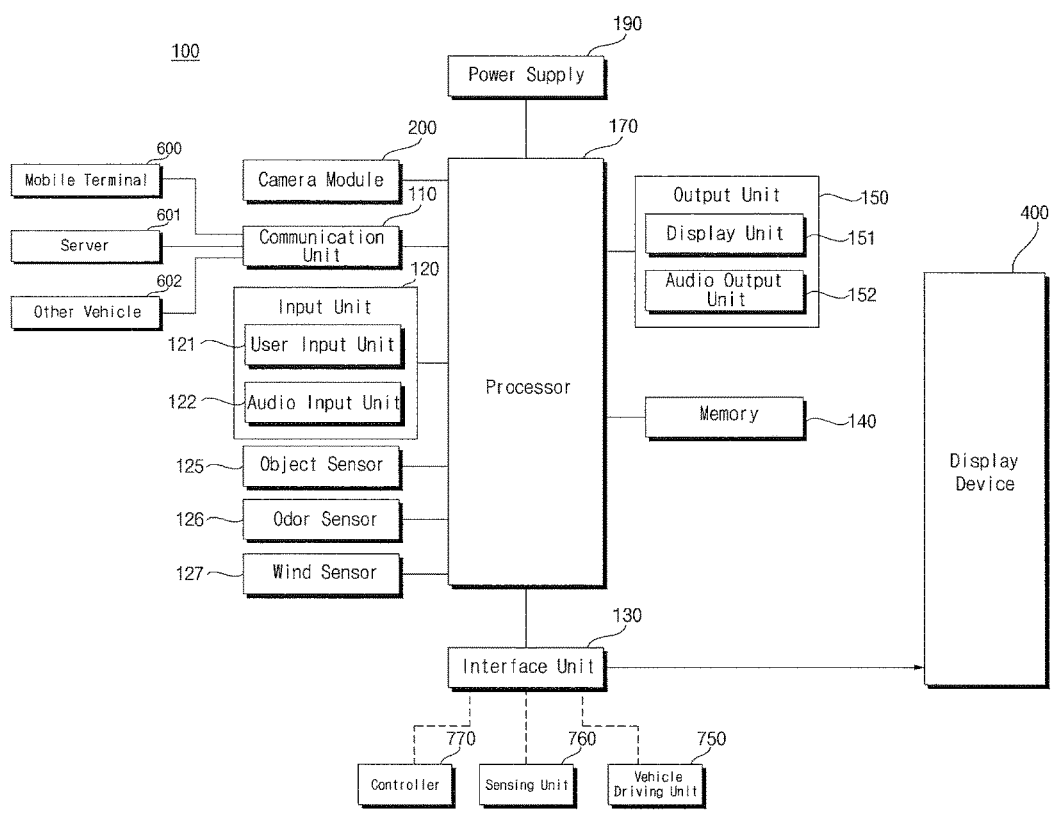
FIG. 4 is a block diagram illustrating an example air circulation control device for a vehicle.

The processor 170 may receive wind direction information or wind speed information from a wind sensor (127 in FIG. 4).

In a state where an object is located within a reference distance in a lane opposite to a traveling lane of the vehicle 700, if wind is blowing in a direction from the object toward the vehicle 700, the processor 170 may provide a signal for controlling switching to the inside air circulation mode.

In a state where an object is located within the reference distance in a lane neighboring to the traveling lane of the vehicle 700, if wind is blowing in a direction from the object toward the vehicle 700, the processor 170 may provide a signal for controlling switching to the inside air circulation mode.

In a state where an object is located within the reference distance on a sidewalk near to the traveling lane of the vehicle 700, if wind is blowing in a direction from the object toward the vehicle 700, the processor 170 may provide a signal for controlling switching to the inside air circulation mode.

The processor 170 may determine whether to switch the HVAC unit to the outside air circulation mode or the inside air circulation mode based on information about a distance between the vehicle 700 and an object.

The processor 170 may generate information about a distance between the vehicle 700 and an object based on an image of the surroundings of the vehicle 700. The processor 170 may acquire the information about the distance between the vehicle 700 and the object based on disparity information.

For example, the processor 170 may generate disparity information based on a stereo image and acquire information about a distance to an object based on the generated disparity information. The stereo image may be acquired through the camera module 200b illustrated in FIG. 2B.

For example, the processor 170 may generate disparity information based on a plurality of mono images and acquire information about a distance to an object based on the generated disparity information. The plurality of mono images may be acquired at predetermined time intervals through a single camera. The mono images may be acquired from one of the camera module 200a of FIG. 2A, the camera module 200c of FIG. 2C, the camera module 200d of FIG. 2D, the camera module 200e of FIG. 2E, and the camera module 200f of FIG. 2F.

The processor 170 may receive information about a distance to an object from a distance sensor (125 in FIG. 4).

The processor 170 may determine whether to switch to the outside air circulation mode or the inside air circulation mode in further consideration of wind direction information or wind speed information in addition to the information about the distance to the object.

The processor 170 may determine whether to switch the HVAC unit to the outside air circulation mode or the inside air circulation mode based on information about a distance to an object and information about a speed relative to the object.

The processor 170 may generate information about the speed relative to the object by tracking the object. After acquiring the information about the distance to the object, the processor 170 may calculate information about a speed relative to the object based on a variation in the distance to the object with passage of time.

When the processor 170 provides a signal for controlling switching to the inside air circulation mode, the processor 170 may provide an HVAC control signal to the HVAC unit so that air may be introduced into the vehicle to prevent formation of moisture on glass included in the vehicle 700.

For example, if moisture is created on the windshield along with switching to the inside air circulation mode based on a detected object, the moisture may obscure the vision of a driver. Moreover, an error may occur during acquisition of an image through the camera module 200. As air for preventing moisture is supplied in advance, the vision of the driver may not be obscured and an error may be prevented during image acquisition of the camera module 200.

When the processor 170 provides a signal for controlling switching to the outside air circulation mode or the inside air circulation mode, the processor 170 may provide an HVAC control signal to the HVAC unit so that cool air or warm air may be introduced into the vehicle to maintain a vehicle internal temperature at a predetermined level.

For example, as the outside air circulation mode or the inside air circulation mode is switched to based on a detected object, a vehicle internal temperature may be changed. In this case, the vehicle internal temperature may be different from a temperature value preset by the user. Thus, cool air or warm air may be supplied into the vehicle so that the changed vehicle internal temperature may be adjusted to the preset value, thereby maintaining the vehicle internal temperature as the user has intended.

The processor 170 may determine a duration of the inside air circulation mode according to an ambient environment.

If the inside air circulation mode has been switched to based on a detected object, the processor 170 may determine a duration of the inside air circulation mode according to a vehicle ambient temperature. The processor 170 may receive information about the vehicle ambient temperature through the interface unit 130.

Temperature affects spreading of a substance. As temperature rises, a contaminant spreads fast in the gas state. If the inside air circulation mode is temporarily switched to in view of object detection, the duration of the inside air circulation mode may be controlled more accurately based on the vehicle ambient temperature.

The processor 170 may determine a time or location at which the inside air circulation mode is switched to based on the vehicle ambient temperature.

In relation to a distance to an object, in the case where the vehicle ambient temperature has a first temperature value, if the distance between the vehicle 700 and the object has a first distance value, the processor 170 may provide a control signal for switching to the inside air circulation mode.

In the case where the vehicle ambient temperature has a second temperature value, if the distance between the vehicle 700 and the object has a second distance value, the processor 170 may provide a control signal for switching to the inside air circulation mode.

The second temperature value may be greater than the first temperature value, and the second distance value may be greater than the first distance value.

The processor 170 may offer a more comfortable environment to a passenger by determining a time or location for switching to the inside air circulation mode adaptively according to the vehicle ambient temperature.

The processor 170 may detect a traffic light in an image of the surroundings of the vehicle. Upon detection of a stop signal from the detected traffic light, the processor 170 may provide a signal for controlling switching to the inside air circulation mode.

More of a contaminant is introduced into the vehicle in a stationary state than during traveling. If there is a contaminant in a certain space, a larger amount of the contaminant is introduced into the vehicle when the vehicle stays in the space than when the vehicle passes through the space. Therefore, if the inside air circulation mode is switched to and the vehicle 700 stops due to a stop signal of a detected traffic light during traveling in downtown or heavy traffic, or in the presence of a vehicle ahead of the vehicle 700, introduction of ambient exhaust fumes into the vehicle 700 may be prevented.

The processor 170 may detect a plurality of other vehicles as objects in an image of the surroundings of a vehicle. If the number of other vehicles detected in a predetermined zone is larger than a reference number, the processor 170 may provide a signal for controlling switching to the inside air circulation mode. The predetermined zone may be an area ahead of the vehicle 700 within a predetermined distance from the vehicle 700.

If the vehicle 700 is traveling in a heavy traffic zone, much of a contaminant may be introduced into the vehicle 700 due to exhaust fumes discharged from other vehicles. In this case, the processor 170 may determine the amount of traffic based on the number of other vehicles located in a predetermined zone. As the amount of traffic is determined based on an image and the inside air circulation mode is switched to based on the traffic amount, introduction of contaminants into the vehicle may be prevented in advance.

If the vehicle 700 is traveling with an object detected, the processor 170 may provide a signal for controlling switching to the outside air circulation mode. If the vehicle 700 is stationary, the processor 170 may provide a signal for controlling switching to the inside air circulation mode. The object may be a preceding vehicle or a muffler of the preceding car.

In the presence of a preceding vehicle, exhaust fumes discharged from the preceding vehicle may be introduced into the vehicle 700. During traveling, the vehicle 700 is apart from the preceding vehicle by a predetermined distance or above. If the vehicle 700 stops, the distance to the preceding vehicle gets shorter. In the presence of a preceding vehicle, more of exhaust fumes discharged from the preceding vehicle may be introduced into the vehicle 700 in a stationary state than during traveling.

With a preceding vehicle detected as an object, the outside air circulation mode or the inside air circulation mode is switched to depending on whether the vehicle 700 is traveling or stationary. Thus, introduction of a contaminant into the vehicle may be prevented in advance.

If an object is not detected due to movement of the object in the stationary state of the vehicle 700, the processor 170 may provide a signal for controlling switching to the outside air circulation mode. The object may be a preceding vehicle or a muffler of the preceding vehicle.

If a preceding vehicle has been detected and then is not detected any longer due to movement of the preceding vehicle, the inside air circulation mode may be switched to the outside air circulation mode, thereby fast introducing ambient fresh air into the vehicle 700.

The processor 170 may detect an intersection in an image of the surrounding of the vehicle. While the vehicle 700 is stationary in the vicinity of the intersection, the processor 170 may detect another vehicle crossing in an overall width direction of the vehicle 700. In this case, the processor 170 may provide a signal for controlling switching to the inside air circulation mode.

In a state where the vehicle 700 is stationary in the vicinity of the intersection, exhaust fumes discharged from another vehicle crossing in the overall width direction of the vehicle 700 may be introduced into the vehicle 700. In this case, the stationary state of the vehicle 700 around the intersection and the other vehicle crossing in the overall width direction are detected by image processing of an image of the surroundings of the vehicle 700 and the inside air circulation mode is switched to. Therefore, introduction of exhaust fumes of other vehicles into the vehicle 700 may be prevented in advance.

Upon detection of, as an object, a diesel vehicle, a motor cycle, a garbage vehicle, a truck, a construction sign board, a soundproof wall, entry or non-entry into a tunnel, entry or non-entry into an underground parking lot, entry or non-entry into an automatic car wash, one other vehicle with a smoking passenger, or a smoking pedestrian, the processor 170 may provide a signal for controlling switching to the inside air circulation mode. For example, the processor 170 may extract feature points of an object in an image of the surroundings of the vehicle 700. The processor 170 may identify the object by comparing the extracted feature points with data stored in the memory 140.

In some implementations, a diesel vehicle, a motor cycle, a garbage vehicle, a truck, and a cigarette may be referred to as contamination-causing matters. A soundproof wall, a tunnel, an underground parking lot, and an automatic car wash may be referred to as contamination-inducing matters. A construction sign board may be referred to as a contamination-indicating matter.

Upon detection of a contamination-causing matter, a contamination-inducing matter, or a contamination-indicating matter as an object, the inside air circulation mode may be switched to before the vehicle 700 approaches the vehicle 700, to thereby prevent introduction of even a slight amount of contaminant into the vehicle 700 in advance.

Upon detection of, as an object, a forest, a flower bed, or an orchard around a traveling road, the processor 170 may provide a signal for controlling switching to the outside air circulation mode. For example, the processor 170 may extract feature points of the object in an image of the surroundings of the vehicle 700. The processor 170 may identify the object by comparing the extracted feature points with data stored in the memory 140.

In some implementations, a forest, a flower bed, and an orchard may be referred to as air-purifying matters.

Upon detection of an air-purifying matter as an object, the outside air circulation mode may be switched to so that purified air may be introduced into the vehicle 700.

The processor 170 may receive passenger information through the interface unit 130. The processor 170 may provide a signal for controlling switching to the outside air circulation mode or the inside air circulation mode based on the passenger information.

For example, the processor 170 may receive information about a pollen allergy of a passenger through the interface unit 130. Upon detection of, as an object, a flower bed or pollen around a traveling road, the processor 170 provide a signal for controlling switching to the inside air circulation mode.

Since the outside air circulation mode or the inside air circulation mode is switched to based on passenger information in this manner, air customized for the traits of a passenger may be supplied into the vehicle.

Upon detection of, as an object, a restaurant sign or smoke from a restaurant, the processor 170 may provide a signal for controlling switching to the inside air circulation mode.

In this case, introduction of unpleasant odor from the restaurant into the vehicle may be prevented.

In some implementations, the processor 170 may provide a signal to a window driver (756 in FIG. 7) or a sunroof driver (758 in FIG. 7).

For example, while providing a signal for controlling switching to the inside air circulation mode, the processor 170 may provide a signal for controlling window closing to the window driver (756 in FIG. 7) and a signal for controlling sunroof closing to the sunroof driver (758 in FIG. 7).

For example, while providing a signal for controlling switching to the outside air circulation mode, the processor 170 may provide a signal for controlling window opening to the window driver (756 in FIG. 7) and a signal for controlling sunroof opening to the sunroof driver (758 in FIG. 7).

In some implementations, the processor 170 may be implemented in hardware using at least one of an Application Specific Integrated Circuits (ASIC), a Digital Signal Processor (DSP), a Digital Signal Processing Device (DSPD), a Programmable Logic Device (PLD), a Field Programmable Gate Array (FPGA), a processor, a controller, a micro-controller, a microprocessor, and an electrical unit for executing other functions.

The power supply 190 may supply power needed for operating each component under the control of the processor 170. Particularly, the power supply 190 may receive power from a battery within the vehicle.

FIG. 4 is a block diagram referred to for describing a vehicle air circulation control device.

Referring to FIG. 4, the vehicle air circulation control device may further include a communication unit 110, an input unit 120, an object sensor 125, an odor sensor 126, a wind sensor 127, and an output unit 150, in addition to the camera module 200, the interface unit 130, the memory 140, the processor 170, and the power supply 190 which have been described before with reference to FIG. 3.

The camera module 200, the interface unit 130, the memory 140, the processor 170, and the power supply 190 have been described before with reference to FIG. 3.

The communication unit 110 may exchange data wirelessly with a mobile terminal 600, a server 601, or another vehicle 602. Particularly, the communication unit 110 may exchange data wirelessly with a mobile terminal of a vehicle driving unit. Various data communication schemes are available as wireless communication schemes such as Bluetooth, Wireless Fidelity (WiFi) Direct, WiFi, Automotive Pixel Link (APiX), Near Field Communication (NFC), etc.

The communication unit 110 may receive weather information and traffic information, for example, Transport Protocol Expert Group (TPEG) information from the mobile terminal 600 or the server 601. In some implementations, the vehicle air circulation control device 100 may transmit detected real-time information to the mobile terminal 600 or the server 601.

If the user is aboard the vehicle, the mobile terminal 600 of the user and the vehicle air circulation control device 100 may be paired with each other, automatically or upon execution of an application by the user.

The communication unit 110 may receive traffic light change information from the external server 601. The external server 601 may reside in a traffic control center that controls traffic.

The communication unit 110 may receive weather information from the external server 601. The external server 601 may be a weather information providing facility or a server of a service provider. For example, the communication unit 110 may receive fine dust information, smog information, or yellow dust information by region from the external server 601.

The input unit 120 may include a user input unit 121 and an audio input unit 122.

The user input unit 121 may include a plurality of buttons or a touch screen. The user input unit 121 may power on and thus operate the vehicle air circulation control device 100 through the plurality of buttons or the touch screen. The user input unit 121 may perform many other input operations.

The audio input unit 122 may receive a voice input of the user. The audio input unit 122 may include a microphone for converting a voice input to an electrical signal. The audio input unit 122 may power on and operate the vehicle air circulation control device 100 by receiving a user voice. The audio input unit 122 may perform many other input operations.

The object sensor 125 may sense an object. The object sensor 125 may include at least one of a radar, a Light Detection And Ranging (LiDAR), an ultrasonic sensor, a Time Of Flight (TOF) sensor, and an infrared sensor.

The object sensor 125 preferably includes a radar or a LiDAR. If the object sensor 125 includes a radar or a LiDAR, the object sensor 125 may sense the presence or absence of an object, a distance to the object, a speed relative to the object, and a location of the object.

Data, a signal, or information generated from the object sensor 125 is transmitted to the processor 170.

The odor sensor 126 may sense a contaminant or odor. The odor sensor 126 may include a device capable of sensing a gaseous contaminant or odor. For example, the odor sensor 143 may include at least one of a metal semiconductor gas sensor, a Quartz Crystal Microbalance (QCM) having an absorbent, a Surface Acoustic Wave (SAW) device, a molecular sensor, and a conductive polymer and Metal Oxide Semiconductor (MOS) gas sensor. The odor sensor 126 may be referred to as an electronic nose (e-nose).

Data, a signal, or information generated from the odor sensor 126 is transmitted to the processor 170.

The wind sensor 127 may sense a wind direction or a wind speed. The wind sensor 127 may include an ultrasonic-type wind direction/wind speed meter. The wind sensor 127 may measure the speed and direction of wind, relying on the property that the propagation speed of ultrasonic waves travelling in the air increases or decreases according to wind.

Data, a signal, or information generated from the wind sensor 127 is transmitted to the processor 170.

The output unit 150 may include a display unit 151 and an audio output unit 152.

The display unit 151 may display various types of information processed by the processor 170. The display unit 151 may display an image related to an operation of the vehicle air circulation control device 100.

To display an image, the display unit 151 may include a transparent display disposed on the windshield, or a Head Up Display (HUD). If the display unit 151 is a HUD, the display unit 151 may include a projection module for projecting an image onto the windshield or a screen provided in the vehicle.

The display unit 151 may be disposed on a steering wheel, a cluster, a center fascia, or a dashboard.

The display unit 151 may be integrated with the display device 400.

The audio output unit 152 may output sound based on an audio signal processed by the processor 170. The audio output unit 152 may include a speaker for converting an electrical signal to sound.

The processor 170 may receive weather information through the communication unit 110. The weather information may include fine dust information, smog information, or yellow dust information by region.

The processor 170 may provide a signal for controlling switching to the outside air circulation mode or the inside air circulation mode based on the weather information.

For example, if the vehicle 700 is traveling in a region in which a fine dust, smog, or yellow dust level is expected to rise to or above a reference value, the processor 170 may provide a signal for controlling switching to the inside air circulation mode based on the weather information. Herein, location information about the vehicle 700 may be based on navigation information.

The processor 170 may receive object information from the object sensor 125. The object information may include information about the presence or absence of an object, information about a distance to the object, information about a speed relative to the object, and information about a location of the object.

The processor 170 may provide a signal for controlling switching to the outside air circulation mode or the inside air circulation mode based on the received distance information about the object.

The processor 170 may receive information about a contaminant or odor sensed by the odor sensor 126. For example, the processor 170 may receive information about a pollution level of ambient air from the odor sensor 126.

The processor 170 may provide a signal for controlling switching to the outside air circulation mode or the inside air circulation mode, further based on the information received from the odor sensor 126.

In a state where the inside air circulation mode has been switched to based on an object, if a pollution level sensed by the odor sensor 126 is equal to or lower than a reference level, the processor 170 may provide a signal for controlling switching to the outside air circulation mode.

If polluted air is not introduced into the vehicle in the inside air circulation mode switched to based on an object detected in an image of the surroundings of the vehicle, the inside air circulation mode may be switched to the outside air circulation mode, thereby supplying ambient fresh air to a passenger.

The processor 170 may receive wind direction information or wind speed information from the wind sensor 127.

The processor 170 may provide a signal for controlling switching to the outside air circulation mode or the inside air circulation mode based on the received wind direction information or wind speed information.

When switching to the outside air circulation mode or the inside air circulation mode, the processor 170 may control output of switching cause information through the output unit 150. The processor 170 may control visual display of the switching cause information on the display unit 150. The processor 170 may control audible indication of the switching cause information through the audio output unit 152.

The processor 170 may control display of an image corresponding to the switching cause information on the display unit 151.

For example, if the outside air circulation mode or the inside air circulation mode is switched to without the image displayed on the display unit 151, the processor 170 may control display of the image in such a manner that the image gets clear gradually.

Figure 5:
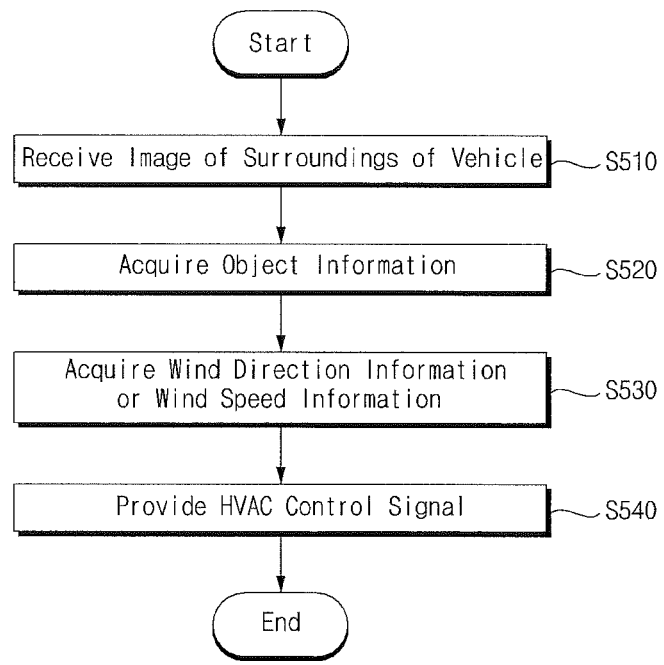
FIG. 5 is a flowchart illustrating an example method of operating an air circulation control device for a vehicle.

FIG. 5 illustrates an example method of operating an air circulation control device for a vehicle.

Referring to FIG. 5, the processor 170 may receive an image of the surroundings of the vehicle from the camera module 200 (S510).

The camera module 200 may include at least one of the mono camera module 200a, the stereo camera module 200b, the around-view camera module 200c, and the omnidirectional camera modules 200d, 200e, and 200f.

The image of the surroundings of the vehicle may include at least one of a mono image, a stereo image, an around-view image, and an omnidirectional image.

The processor 170 may acquire object information based on the image of the surroundings of the vehicle (S510).

The processor 170 may detect an object in the image of the surroundings of the vehicle and verify the detected object. The processor 170 may track the verified object.

The processor 170 may acquire object information through the object detection, verification, and tracking operations. The object information may include information about what the object is, information about the presence or absence of the object, information about a distance to the object, information about a speed relative to the object, and information about a location of the object.

In some implementations, the processor 170 may receive the object information from the object sensor (125 in FIG. 4).

The processor 170 may acquire wind direction information or wind speed information (S520).

The processor 170 may generate the wind direction information or the wind speed information based on the image of the surroundings of the vehicle. The processor 170 may detect a wind vane, an anemometer, a wind cone, or a floating matter in the image of the surroundings of the vehicle. The processor 170 may generate the wind direction information or the wind speed information based on the detected wind vane, anemometer, wind cone, or floating matter.

The processor 170 may receive the wind direction information or the wind speed information from the wind sensor (127 in FIG. 4).

The processor 170 may provide an HVAC control signal based on the object information (S540).

The processor 170 may provide a signal for controlling switching to the outside air circulation mode or the inside air circulation mode based on the object information.

The processor 170 may provide the HVAC control signal to the HVAC unit based on the object information so that air may be supplied into the vehicle.

The processor 170 may provide the HVAC control signal, further based on the wind direction information or the wind speed information.

Figure 6:
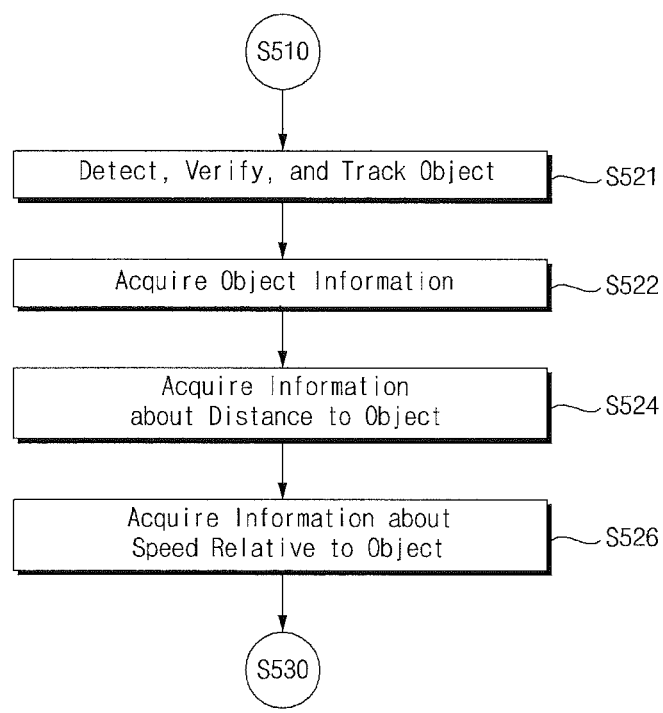
FIG. 6 is a flowchart illustrating an example method of obtaining object information.

FIG. 6 illustrates an example method of obtaining object information.

FIG. 6 shows step S520 of FIG. 5 in greater detail.

The processor 170 may detect an object in an image of the surroundings of the vehicle, verify the detected object, and track the verified object (S521).

The processor 170 may acquire location information about the object (S522). The processor 170 may acquire the location information about the object based on information about pixels occupied by the object in the image of the surroundings of the vehicle.

The processor 170 may receive the object location information from the object sensor 125.

The processor 170 may acquire distance information about the object (S524). The processor 170 may acquire the distance information about the object based on disparity information.

In some implementations, the processor 170 may receive the distance information about the object from the object sensor 125.

The processor 170 may acquire relative speed information about the object (S526). The processor 170 may calculate the relative speed information about the object based on a variation in the distance to the object with passage of time, in a state where information about the distance to the object has been acquired.

FIG. 7 illustrates an example vehicle.

Referring to FIG. 7, the vehicle 700 may include a communication unit 710, an input unit 720, a sensing unit 760, an output unit 740, a vehicle driving unit 750, a memory 730, an interface unit 780, a controller 770, a power supply 790, the vehicle air circulation control device 100, and the in-vehicle display device 400.

The communication unit 710 may include one or more modules that enable wireless communication between the vehicle 700 and the mobile terminal 600, between the vehicle 700 and the external server 601, or between the vehicle 700 and another vehicle 602. Also, the communication unit 710 may include one or more modules that connect the vehicle 700 to one or more networks.

The communication unit 710 may include a broadcasting reception module 711, a wireless Internet module 712, a short-range communication module 713, a location information module 714, an optical communication module 715, and a Vehicle to X (V2X) communication module 716.

The broadcasting reception module 711 receives a broadcast signal or broadcasting information from an external broadcasting control server through a broadcast channel. Herein, broadcasting covers radio broadcasting or TV broadcasting.

The wireless Internet module 712 refers to a module for wireless Internet connectivity, and may reside inside or outside the vehicle 700. The wireless Internet module 712 is configured to transmit and receive wireless signals over a communication network compliant with a wireless Internet technique.

Wireless Internet techniques include, for example, Wireless Local Area Network (WLAN), Wi-Fi Direct, Digital Living Network Alliance (DLNA), Wireless Broadband (WiBro), World Interoperability for Microwave Access (Wi-MAX), High Speed Downlink Packet Access (HSDPA), High Speed Uplink Packet Access (HSUPA), Long Term Evolution (LTE), Long Term Evolution-Advanced (LTE-A), etc. The wireless Internet module 712 transmits and receives data according to at least one of wireless Internet techniques that include other Internet techniques in addition to the above enumerated ones. For example, the wireless Internet module 712 may exchange data wirelessly with the external server 601. The wireless Internet module 712 may receive weather information and traffic information (for example, TPEG information) from the external server 601.

The short-range communication module 713 is used for short-range communication. The short-range communication module 713 may support short-range communication using at least one of Bluetooth, Radio Frequency Identification (RFID), Infrared Data Association (IrDA), Ultra Wideband (UWB), ZigBee, NFC, WiFi, WiFi Direct, Wireless Universal Serial Bus (Wireless USB).

The short-range communication module 713 may conduct short-range communication between the vehicle 700 and at least one external device by establishing a short-range wireless communication network. For example, the short-range communication module 713 may exchange data wirelessly with the mobile terminal 600. The short-range communication module 713 may receive weather information and traffic information (for example, TPEG information) from the mobile terminal 600. For example, if the user is aboard the vehicle 700, the mobile terminal 600 of the user and the vehicle 700 may be paired with each other automatically or upon execution of an application by the user.

The location information module 714 is a module configured to acquire a location of the vehicle 700. A major example of the location information module 714 is a GPS module. For example, the location of the vehicle 700 may be acquired using signals received from GPS satellites at the GPS module.

The optical communication module 715 may include an optical transmitter and an optical receiver.

The optical receiver may receive information by converting an optical signal to an electrical signal. The optical receiver may include a Photo Diode (PD) for receiving light. The PD may convert light to an electrical signal. For example, the optical receiver may receive information about a preceding vehicle by light emitted from a light source included in the preceding vehicle.

The optical transmitter may include at least one light emitting device for converting an electrical signal to an optical signal. The light emitting device is preferably a Light Emitting Diode (LED). The optical transmitter converts an electrical signal to an optical signal and outputs the optical signal to the outside. For example, the optical transmitter may emit an optical signal to the outside by flickering a light emitting device corresponding to a predetermined frequency. In some implementations, the optical transmitter may include a plurality of light emitting device arrays. In some implementations, the optical transmitter may be integrated with a lamp provided in the vehicle 700. For example, the optical transmitter may be at least one of a head lamp, a rear lamp, a stop lamp, a side repeater lamp, and a position lamp. For example, the optical communication module 715 may exchange data with the other vehicle 602 by optical communication.

The V2X communication module 716 is a module configured for wireless communication with the server 601 or the other vehicle 602. The V2X communication module 716 includes a module capable of implementing a Vehicle-to-Vehicle (V2V) or Vehicle-to-Infrastructure (V2I) protocol. The vehicle 700 may conduct wireless communication with the external server 601 and the other vehicle 602 through the V2X communication module 716.

The input unit 720 may include a driving manipulator 721, a microphone 723, and a user input unit 724.

The driving manipulator 721 receives a user input for driving the vehicle 700. The driving manipulator 721 may include a steering input device, a shift input device, an acceleration input device, and a brake input device.

The steering input device receives a traveling heading input for the vehicle 700 from the user. The steering input device is preferably formed into a wheel so that a steering input may be applied by rotation. In some implementations, the steering input device may be configured as a touch screen, a touchpad, or a button.

The shift input device receives a parking (P) input, a drive (D) input, a neutral (N) input, and a reverse (R) input for the vehicle 700 from the user. The shift input device is preferably formed into a lever. In some implementations, the shift input device may be configured as a touch screen, a touchpad, or a button.

The acceleration input device receives an acceleration input for the vehicle 700 from the user. The brake input device receives a deceleration input for the vehicle 700 from the user. The acceleration input device and the brake input device are preferably formed into pedals. In some implementations, the acceleration input device or the brake input device may be configured as a touch screen, a touchpad, or a button.

The microphone 723 may process an external sound signal to electrical data. The processed data may be used in various manners according to a function being executed in the vehicle 700. The microphone 723 may convert a voice command of the user to electrical data. The converted electrical data may be provided to the controller 770.

In some implementations, the sensing unit 760 may include a camera or a microphone.

The user input unit 724 is configured to receive information from the user. Upon input of information through the user input unit 724, the controller 770 may control an operation of the vehicle 700 in correspondence with the input information. The user input unit 724 may include a touch input device or a mechanical input device. In some implementations, the user input unit 724 may be disposed in an area of the steering wheel. In this case, the driver may manipulate the user input unit 724 with his or her finger, while grabbing the steering wheel.

The sensing unit 760 senses a signal related to traveling of the vehicle 700. For this purpose, the sensing unit 760 may include a collision sensor, a wheel sensor, a speed sensor, an inclination sensor, a weight sensor, a heading sensor, a yaw sensor, a gyro sensor, a position module, a vehicle forward or backward moving sensor, a battery sensor, a fuel sensor, a tire sensor, an ultrasonic sensor, a radar, a LiDAR, etc.

Accordingly, the sensing unit 760 may acquire sensing signals for vehicle collision information, vehicle heading information, vehicle location information (GPS information), vehicle angle information, vehicle speed information, vehicle acceleration information, vehicle inclination information, vehicle forward or backward moving information, battery information, fuel information, tire information, vehicle lamp information, vehicle internal temperature information, vehicle internal humidity information, information indicating whether it is raining, a steering wheel rotation angle, etc.

In some implementations, the sensing unit 760 may further include an acceleration pedal sensor, a pressure sensor, an engine speed sensor, an Air Flow Sensor (AFS), an Air Temperature Sensor (ATS), a Water Temperature Sensor (WTS), a Throttle Position Sensor (TPS), a Top Dead Center (TDC) sensor, a Crank Angle Sensor (CAS), etc.

The sensing unit 760 may include a biometric sensing unit. The biometric sensor senses and acquires biometric information about a passenger. The biometric information may include finger print information, iris scan information, retina scan information, hand geometry information, facial recognition information, and voice recognition information. The biometric sensing unit may include a sensor for sensing biometric information about a passenger. Herein, an internal camera and the microphone 723 may operate as sensors. The biometric sensing unit may acquire hand geometry information and facial recognition information through the internal camera.

The output unit 740 is configured to output information processed by the controller 770. The output unit 740 may include a display unit 741, an audio output unit 742, and a haptic output unit 743.

The display unit 741 may display information processed by the controller 770. For example, the display unit 741 may display vehicle-related information. The vehicle-related information may include vehicle control information for direct control of the vehicle or vehicle driving assist information for guiding driving of the driver. Also, the vehicle-related information may include vehicle state information indicting the current state of the vehicle or vehicle traveling information related to traveling of the vehicle.

The display unit 741 may include at least one of an LCD, a Thin Film Transistor-Liquid Crystal Display (TFT LCD), an Organic LED (OLED), a flexible display, a Three-Dimensional (3D) display, and an e-ink display.

The display unit 741 may be configured as a touch screen by forming a mutual layer structure with a touch sensor or being integrated with the touch sensor. The touch screen may serve as an output interface between the vehicle 700 and the user as well as as the user input unit 724 that provides an input interface between the vehicle 700 and the user. In this case, the display unit 741 may include a touch sensor for sensing a touch on the display unit 741 in order to receive a control command in a touch manner. Thus, when the display unit 741 is touched, the touch sensor may sense the touch, and thus the controller 770 may generate a control command corresponding to the touch. Content input by a touch may be a character, a number, or an indication or selectable menu item in various modes.

In some implementations, the display unit 741 may include a cluster so that the driver may check the vehicle state information or the vehicle traveling information, while driving the vehicle 700. The cluster may be positioned on the dashboard. In this case, the driver may view information displayed on the cluster, while gazing ahead of the vehicle 700.

In some implementations, the display unit 741 may be configured as a HUD. If the display unit 151 is configured as a HUD, the display unit 151 may output information through a transparent display provided on the windshield. Or the display unit 741 may include a projection module and thus output information by an image projected onto the windshield.

The audio output unit 742 converts an electrical signal received from the controller 770 to an audio signal. For this purpose, the audio output unit 742 may include a speaker. The audio output unit 742 may output a sound corresponding to an operation of the user input unit 724.

The haptic output unit 743 generates a haptic output. For example, the haptic output unit 743 may vibrate the steering wheel, a safety belt, or a seat so that the user may recognize an output.

The vehicle driving unit 750 may control an operation of various devices of the vehicle. The vehicle driving unit 750 may receive a control signal from the vehicle air circulation control device 100. The vehicle driving unit 750 may control each device based on the control signal.

The vehicle driving unit 750 may include a power source driver 751, a steering driver 752, a brake driver 753, a lamp driver 754, the HVAC driver 755, the window driver 756, an airbag driver 757, a sunroof driver 758, and a suspension driver 759.

The power source driver 751 may perform electronic control on a power source in the vehicle 700.

For example, if a fossil fuel-based engine is a power source, the power source driver 751 may perform electronic control on the engine. Therefore, the power source driver 751 may control the output torque of the engine. If the power source driver 751 is an engine, the power source driver 751 may restrict the speed of the vehicle by limiting the engine output torque under the control of the controller 770.

In another example, if an electrical motor is a power source, the power source driver 751 may control the motor. Thus, the rotation speed and torque of the motor may be controlled.

The power source driver 751 may receive an acceleration control signal from the vehicle air circulation control device 100. The power source driver 751 may control the power source according to the received acceleration control signal.

The steering driver 752 may perform electronic control on a steering device in the vehicle 700. Accordingly, the traveling heading of the vehicle 700 may be changed. The steering driver 752 may receive a steering control signal from the vehicle air circulation control device 100. The steering driver 752 may control the steering device so that the steering device may be steered according to the received steering control signal.

The brake driver 753 may perform electronic control on a brake device in the vehicle 700. For example, the brake driver 753 may decrease the speed of the vehicle 700 by controlling an operation of a brake disposed at a tire. In another example, the traveling heading of the vehicle 700 may be adjusted to the left or right by differentiating operations of brakes disposed respectively at left and right tires. The brake driver 753 may receive a deceleration control signal from the vehicle air circulation control device 100. The brake driver 759 may control the brake device according to the received deceleration control signal.

The lamp driver 764 may control turn-on/turn-off of lamps inside or outside the vehicle 700. Also, the lamp driver 764 may control the intensity, direction, etc. of light from a lamp. For example, the lamp driver 764 may control a side repeater lamp, a brake lamp, etc.

The HVAC driver 755 may perform electronic control on the HVAC unit in the vehicle 700. For example, if a vehicle internal temperature is high, the HVAC unit may be controlled to operate and supply cool air into the vehicle 700.

The window driver 756 may perform electronic control on a window device in the vehicle 700. For example, opening and closing of left and right side windows of the vehicle 700 may be controlled.

The airbag driver 757 may perform electronic control on an airbag device in the vehicle 700. For example, the airbag driver 757 may control inflation of an airbag in an emergency situation.

The sunroof driver 758 may perform electronic control on a sunroof device in the vehicle. For example, the sunroof driver 758 may control opening or closing of the sunroof.

The suspension driver 759 may perform electronic control on a suspension device in the vehicle. For example, if the surface of a road is rugged, the suspension driver 759 may control the suspension device to reduce jerk of the vehicle 700. The suspension driver 759 may receive a suspension control signal from the vehicle air circulation control device 100. The suspension driver 759 may control the suspension device according to the received suspension control signal.

The memory 730 is electrically connected to the controller 770. The memory 730 may store basic data for a unit, control data for controlling an operation of the unit, and input and output data. The memory 730 may be any of various storage devices in hardware, such as ROM, RAM, EPROM, flash drive, hard drive, etc. The memory 730 may store various data for overall operations of the vehicle 700, such as programs for processing or controlling in the controller 770.

The interface unit 780 may serve as paths to various types of external devices connected to the vehicle 700. For example, the interface unit 780 may include a port connectable to the mobile terminal 600. The interface unit 780 may be connected to the mobile terminal 600 through the port. In this case, the interface unit 780 may exchange data with the mobile terminal 600.

In some implementations, the interface unit 780 may serve as a path for supplying electrical energy to the connected mobile terminal 600. If the mobile terminal 600 is electrically connected to the interface unit 780, the interface unit 780 supplies electrical energy received from the power supply 790 to the mobile terminal 600 under the control of the controller 770.

The controller 770 may provide overall control to each unit inside the vehicle 700. The controller 770 may be referred to as an Electronic Control Unit (ECU).

The controller 770 may be implemented in hardware using at least one of an ASIC, a DSP, a DSPD, a PLDs, an FPGA, a processor, a controller, a micro-controller, a microprocessor, and an electrical unit for executing other functions.

The power supply 790 may supply power needed for operating each component under the control of the controller 770. Particularly, the power supply 790 may receive power from a battery within the vehicle.

The vehicle air circulation control device 100 may exchange data with the controller 770. Various types of information, data, or control signals generated from the vehicle air circulation control device 100 may be output to the controller 770. The vehicle air circulation control device 100 may be the vehicle air circulation control device described before with reference to FIGS. 1 to 7C.

The in-vehicle display device 400 may exchange data with the controller 770. The controller 770 may, receive navigation information from the in-vehicle display device 400 or a separate navigation device. The navigation information may include information about a destination that has been set, information about a route to the destination, and map information or information about a current location of the vehicle, which are related to vehicle traveling.

Figure 8A:
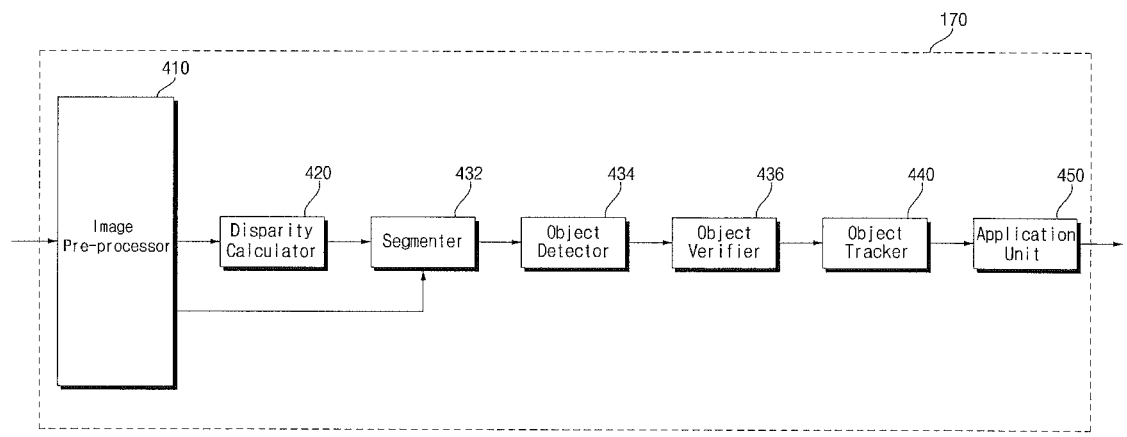
FIGS. 8A and 8B are block diagrams illustrating an example processor.
Figure 8B:
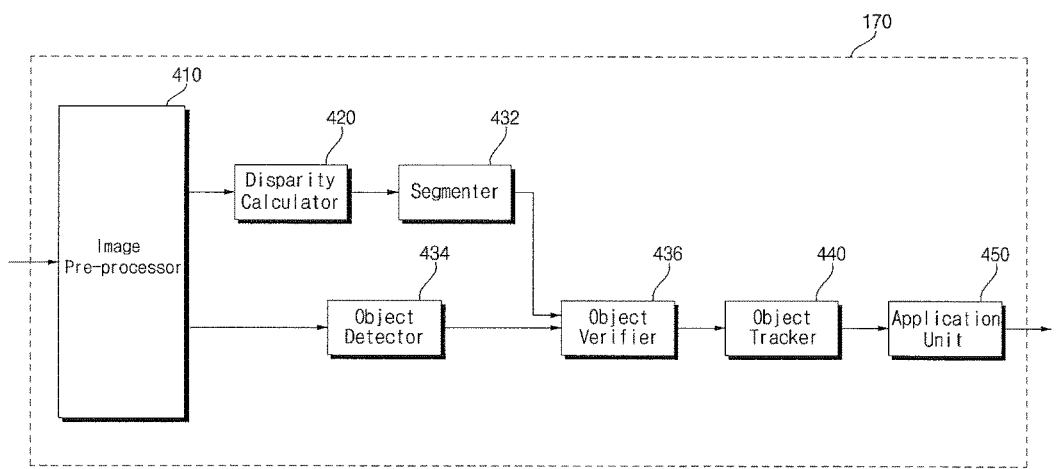

FIGS. 8A and 8B illustrates an example processor.

Figure 9:
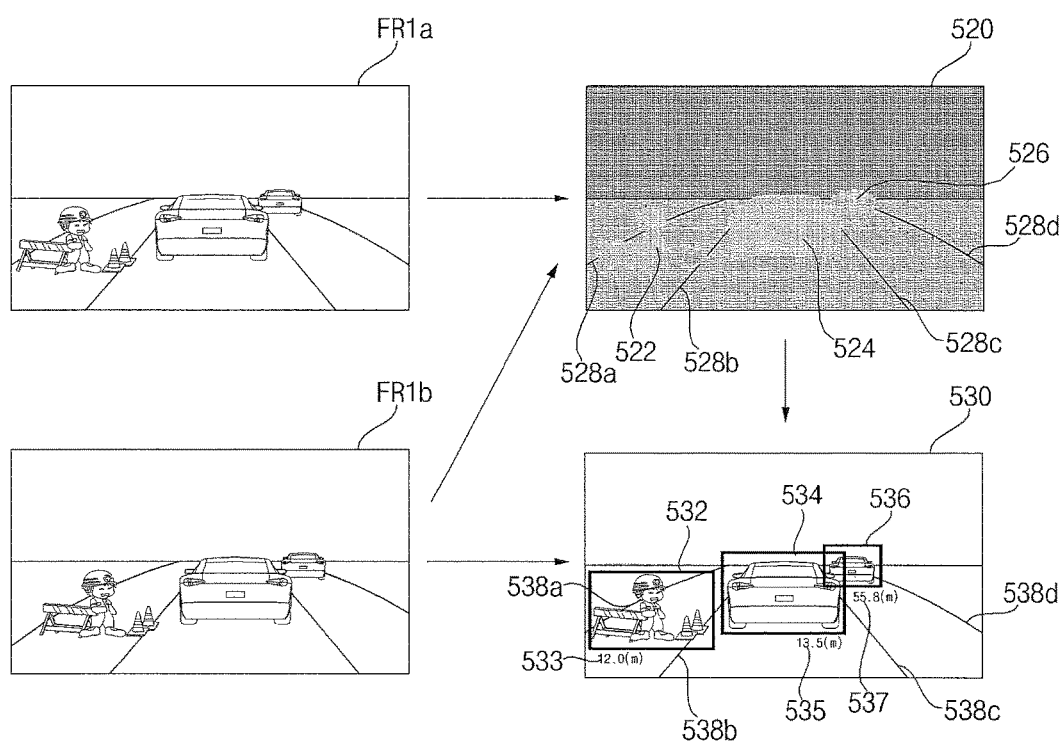
FIG. 9 is a diagram illustrating an example method of detecting objects by a processor.

FIG. 9 illustrates an example method of detecting objects by a processor.

Referring to FIG. 8A, which shows an exemplary internal block diagram of the processor 170, the processor 170 may include an image pre-processor 410, a disparity calculator 420, a segmenter 432, an object detector 434, an object verifier 436, an object tracker 440, and an application unit 450.

The image preprocessor 410 may receive an image from the camera module 200 and pre-process the received image. The image may be at least one of a mono image, a stereo image, an around-view image, and an omnidirectional image.

The image preprocessor 410 may subject the image to noise reduction, rectification, calibration, color enhancement, Color Space Conversion (CSC), interpolation, camera gain control, etc. Therefore, a clearer image than captured by the camera module 200 may be acquired.

The disparity calculator 420 receives a plurality of images or a generated around-view image, which have been signal-processed in the image preprocessor 410, performs stereo matching on a plurality of mono images or stereo images sequentially received for a predetermined time, and acquires a disparity map through the stereo matching. The disparity calculator 420 may acquire disparity information about the surroundings of the vehicle.

The stereo matching may be performed on a pixel basis or a predetermined block basis of images. In some implementations, a disparity map may refer to a map representing binocular parallax information about a plurality of images as numerals.

The segmenter 432 may perform segmentation and clustering on an image based on the disparity information received from the disparity calculator 420.

Specifically, the segmenter 432 may separate a background and a foreground from at least one image based on the disparity information.

For example, an area having disparity information equal to or less than a predetermined value in the disparity map may be calculated as a background and removed. Thus, a foreground is relatively separated.

In another example, an area having disparity information equal to or greater than a predetermined value in the disparity map may be calculated as a foreground and extracted. Thus, the foreground may be separated.

As described above, a foreground and a background are separated from each other based on disparity information extracted based on an image. Therefore, a signal processing speed, a signal processing amount, etc. may be reduced during object detection.

The object detector 434 may detect an object based on image segments received from the segmenter 432.

The object detector 434 may detect an object in at least one image based on disparity information.

The object detector 434 may detect an object in at least one image. For example, the object detector 434 may detect an object in the foreground separated by the image segmentation.

The object verifier 436 may classify and verify the separated object.

For this purpose, the object verifier 436 may use a neural network-based verification scheme, an SVM scheme, a Haar-like based AdaBoost verification scheme, or a HOG scheme.

In some implementations, the object verifier 436 may verify the object by comparing the detected object with objects stored in the memory 140.

For example, the object verifier 436 may verify adjacent vehicles, lanes, a road surface, a sign board, a dangerous region, a tunnel, etc. in the vicinity of the vehicle.

The object tracker 440 tracks the verified object. For example, the object tracker 440 may verify an object in sequentially acquired images, calculate a motion or motion vector of the verified object, and track movement of the object based on the calculated motion or motion vector. Accordingly, the adjacent vehicles, lanes, the road surface, the signboard, the dangerous region, the tunnel, etc. in the vicinity of the vehicle may be tracked.

The application unit 450 may calculate a risk of the vehicle 700 based on various objects around the vehicle, for example, the other vehicles, the lanes, the road surface, and the sign board. Further, the application unit 450 may calculate a probability of rear-ending a preceding vehicle and determine whether the vehicle 700 slips.

The application unit 450 may output a message or the like to provide information about the calculation and determination based on the calculated risk and rear-end collision possibility, or the determination made as to whether the vehicle 700 slips. Or the application unit 450 may generate, as vehicle control information, a control signal for posture control or traveling control.

FIG. 8B illustrates another example processor.

Referring to FIG. 8B, the processor 170 illustrated in FIG. 8A and the processor 170 illustrated in FIG. 8B are identical in terms of internal components and different in terms of a signal processing sequence.

The object detector 434 may receive a mono image, a stereo image, an around-view image, or an omnidirectional image and detect an object in the received image. Compared to the example in FIG. 8A, where an object is detected in a segmented image based on disparity information, an object may be detected directly from a mono image, a stereo image, an around-view image, or an omnidirectional image.

The object verifier 436 may classify and verify a detected and separated object based on image segments received from the segmenter 432 and the object detected by the object detector 434.

For this purpose, the object verifier 436 may use a neural network-based verification scheme, an SVM scheme, a Haar-like based AdaBoost verification scheme, or a HOG scheme.

FIG. 9 illustrates an example method of detecting objects by a processor.

Referring to FIG. 9, the camera module 200 acquires images FR1a and FR1b. The acquired images FR1a and FR1b may be a plurality of mono images or stereo images.

The disparity calculator 420 of the processor 170 receives the signal-processed images FR1a and FR1b from the image pre-processor 410 and acquires a disparity map by performing stereo matching on the images FR1a and FR1b.

The disparity map represents disparities between the images FR1a and FR1b as levels. It may be determined that a distance to the vehicle is shorter for a higher disparity level, and longer for a lower disparity level.

When the disparity map is displayed, luminosity may be higher for a higher disparity level and lower for a lower disparity level on the disparity map.

In FIG. 9, first to fourth lanes 528a, 528b, 528c, and 528d have their corresponding disparity levels, a construction site 522, a first preceding vehicle 524, and second preceding vehicle 526 have their corresponding disparity levels on the disparity map 520, by way of example.

The segmenter 432, the object detector 434, and the object verifier 436 perform segmentation, object detection, and object verification on at least one of the images FR1a and FR1b based on the disparity map 520.

In FIG. 9, object detection and object verification are performed on the second image FR1b using the disparity map 520, by way of example.

First to fourth lanes 538a, 538b, 538c, and 538d, a construction site 532, a first preceding vehicle 534, and a second preceding vehicle 536 may be detected as objects and verified in an image 530.

As images are acquired successively, the object tracker 440 may track a verified object.

FIGS. 10 to 14 illustrate example methods of operating an air circulation control device for a vehicle.

Figure 10:
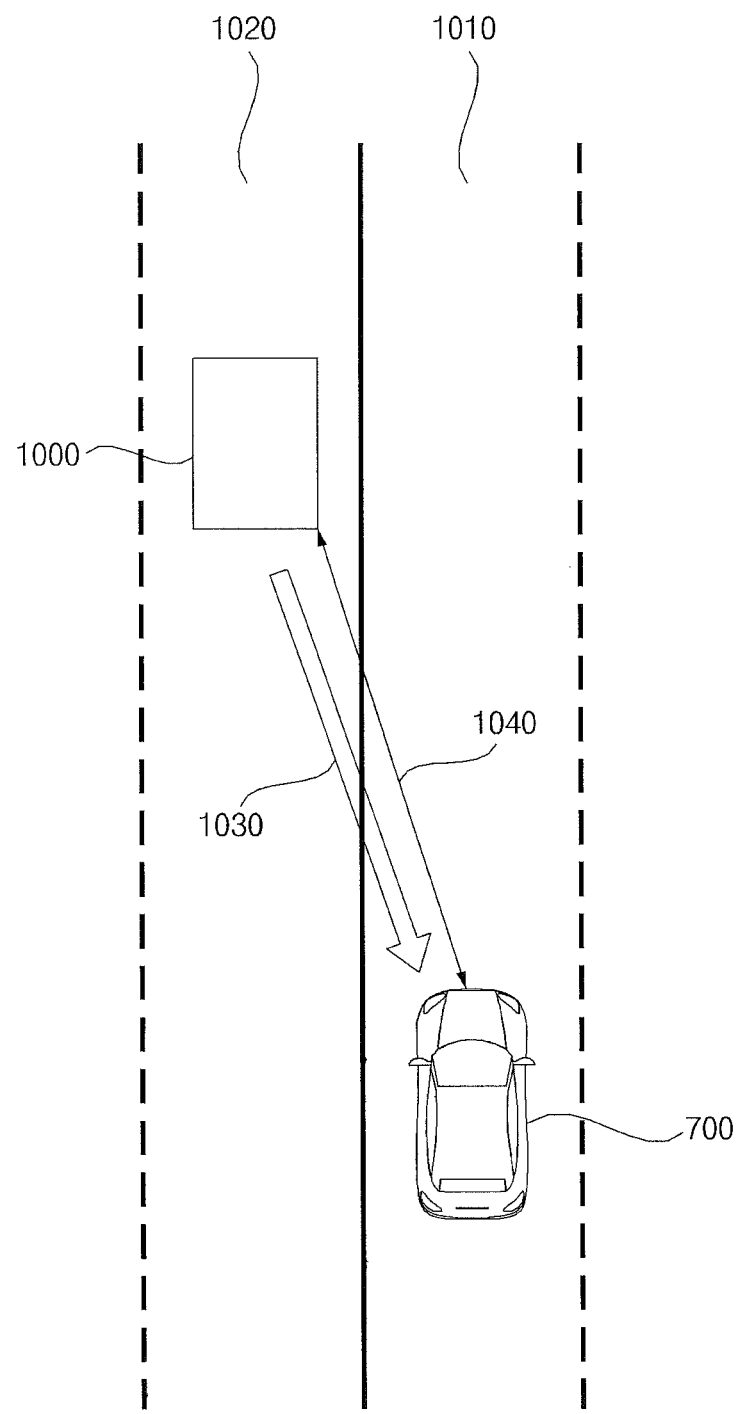
FIGS. 10 to 14 are diagrams illustrating example methods of operating an air circulation control device for a vehicle.

Referring to FIG. 10, an object 1000 may be located in a lane 1020 opposite to a traveling lane 1010. The object 1000 may travel in an opposite direction to the vehicle 700. With a distance 1040 between the vehicle 700 and the object 1000 being equal to or smaller than a reference distance, wind may blow in a direction 1030 from the object 1000 toward the vehicle 700. In this case, the processor 170 may provide a signal for controlling switching to the inside air circulation mode.

The processor 170 may provide a signal for controlling switching to the outside air circulation mode or the inside air circulation mode in correspondence with a relative speed between the vehicle 700 and the object 1000.

For example, the processor 170 may determine a speed at which the outside air circulation mode or the inside air circulation mode is switched to in correspondence with the relative speed between the vehicle 700 and the object 1000.

For example, the processor 170 may determine a duration of the inside air circulation mode in correspondence with the relative speed between the vehicle 700 and the object 1000.

Because the vehicle 700 and the object 1000 are traveling facing each other, the relative speed may have a negative value. As the absolute value of the relative speed is larger, the vehicle 700 and the object 1000 pass by each other faster. Then, the relative distance between the vehicle 700 and the object 1000 increases gradually. Since the processor 170 provides a signal for controlling switching to the inside air circulation mode in correspondence with the relative speed between the vehicle 700 and the object 1000, the inside air circulation mode may be switched to fast and may not be maintained unnecessarily.

The processor 170 may provide a signal for controlling switching to the outside air circulation mode or the inside air circulation mode in correspondence with a speed of wind blowing from the object 1000 toward the vehicle 700.

For example, the processor 170 may determine a speed at which the outside air circulation mode or the inside air circulation mode is switched to in correspondence with the wind speed. Since the processor 170 provides a signal for controlling switching to the inside air circulation mode in correspondence with the wind speed, the inside air circulation mode may be fast switched to according to the wind speed.

The object 1000 may be a contamination-causing matter, a contamination-inducing matter, or a contamination-indicating matter.

Figure 11:
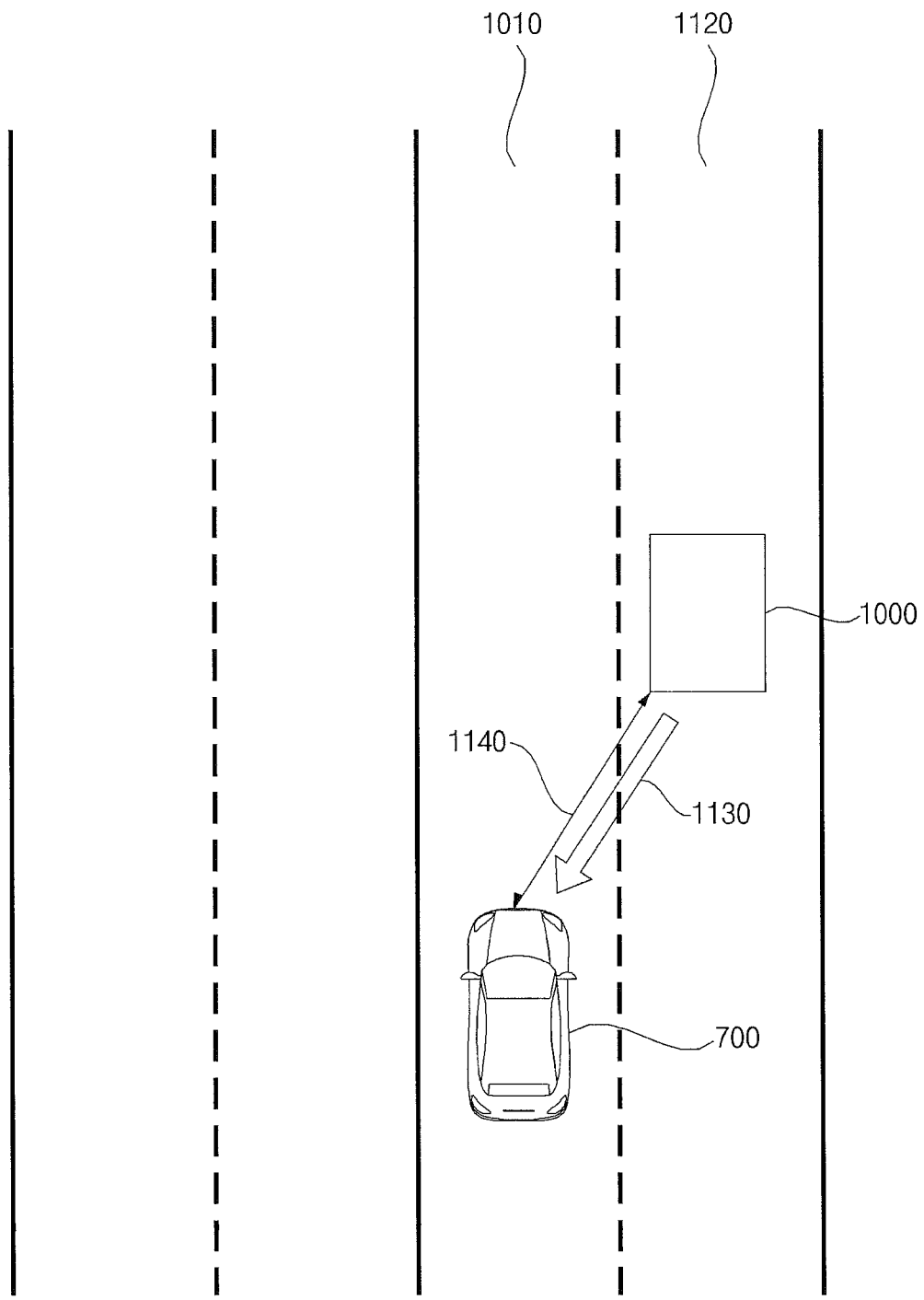

In FIG. 11, an object is located in a lane neighboring to a lane in which a vehicle is traveling.

Referring to FIG. 11, the object 1000 may be located on a lane 1120 neighboring to the traveling lane 1010. The object 1000 and the vehicle 700 may be traveling in the same direction. With a distance 1140 between the vehicle 700 and the object 1000 being equal to or smaller than a reference distance, wind may blow in a direction 1130 from the object 1000 toward the vehicle 700. In this case, the processor 170 may provide a signal for controlling switching to the inside air circulation mode.

The processor 170 may provide a signal for controlling switching to the outside air circulation mode or the inside air circulation mode in correspondence with a relative speed between the vehicle 700 and the object 1000.

For example, the processor 170 may determine a speed at which the outside air circulation mode or the inside air circulation mode is switched to in correspondence with the relative speed between the vehicle 700 and the object 1000.

For example, the processor 170 may determine a duration of the inside air circulation mode in correspondence with the relative speed between the vehicle 700 and the object 1000.

Because the vehicle 700 and the object 1000 are traveling in the same direction, the relative speed may have a negative value or a positive value.

If the relative speed has a negative value, the distance between the vehicle 700 and the object 1000 decreases. In this case, since the processor 170 determines a speed at which the inside air circulation mode is switched to in correspondence with the relative speed, the inside air circulation mode may be fast switched to.

If the relative speed has a positive value, the distance between the vehicle 700 and the object 1000 increases. In this case, since the processor 170 determines a duration of the inside air circulation mode in correspondence with the relative speed, the inside air circulation mode may not be maintained unnecessarily.

The processor 170 may provide a signal for controlling switching to the outside air circulation mode or the inside air circulation mode in correspondence with a speed of wind blowing from the object 1000 toward the vehicle 700.

For example, the processor 170 may determine a speed at which the outside air circulation mode or the inside air circulation mode is switched to in correspondence with the wind speed. Since the processor 170 provides a signal for controlling switching to the inside air circulation mode in correspondence with the wind speed, the inside air circulation mode may be fast switched to according to the wind speed.

The object 1000 may be a contamination-causing matter, a contamination-inducing matter, or a contamination-indicating matter.

Figure 12:
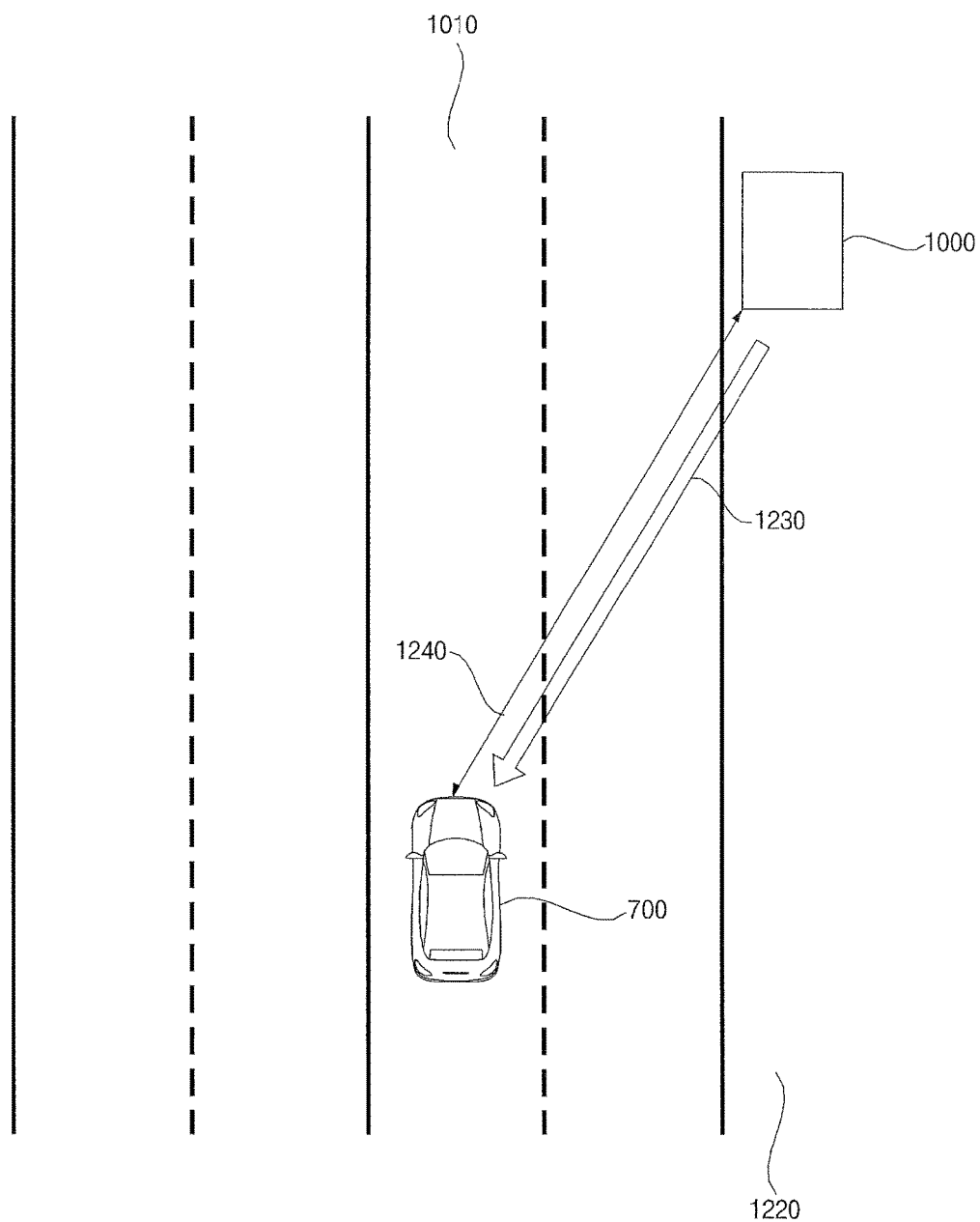

In FIG. 12, an object is located on a sidewalk near to a lane in which a vehicle is traveling.

Referring to FIG. 12, the object 1000 may be located on a sidewalk 1220 near to the traveling lane 1010. The object 1000 and the vehicle 700 may be traveling in the same direction. With a distance 1240 between the vehicle 700 and the object 1000 being equal to or smaller than a reference distance, wind may blow in a direction 1230 from the object 1000 toward the vehicle 700. In this case, the processor 170 may provide a signal for controlling switching to the inside air circulation mode.

The processor 170 may provide a signal for controlling switching to the outside air circulation mode or the inside air circulation mode in correspondence with a relative speed between the vehicle 700 and the object 1000.

For example, the processor 170 may determine a speed at which the outside air circulation mode or the inside air circulation mode is switched to in correspondence with the relative speed between the vehicle 700 and the object 1000.

For example, the processor 170 may determine a duration of the inside air circulation mode in correspondence with the relative speed between the vehicle 700 and the object 1000.

Because the vehicle 700 is traveling faster than the object 1000, the relative speed may have a negative value. As the absolute value of the relative speed is higher, the vehicle 700 passes by the object 1000 faster. Then, a relative distance between the vehicle 700 and the object 1000 increases gradually. Since the processor 170 provides a signal for controlling switching to the inside air circulation mode in correspondence with the relative speed between the vehicle 700 and the object 1000, the inside air circulation mode may be fast switched to and may not be maintained unnecessarily.

The processor 170 may provide a signal for controlling switching to the outside air circulation mode or the inside air circulation mode in correspondence with a speed of wind blowing from the object 1000 toward the vehicle 700.

For example, the processor 170 may determine a speed at which the outside air circulation mode or the inside air circulation mode is switched to in correspondence with the wind speed. Since the processor 170 provides a signal for controlling switching to the inside air circulation mode in correspondence with the wind speed, the inside air circulation mode may be fast switched to according to the wind speed.

The object 1000 may be a contamination-causing matter, a contamination-inducing matter, or a contamination-indicating matter. For example, the object 1000 may be a smoking pedestrian.

Figure 13:
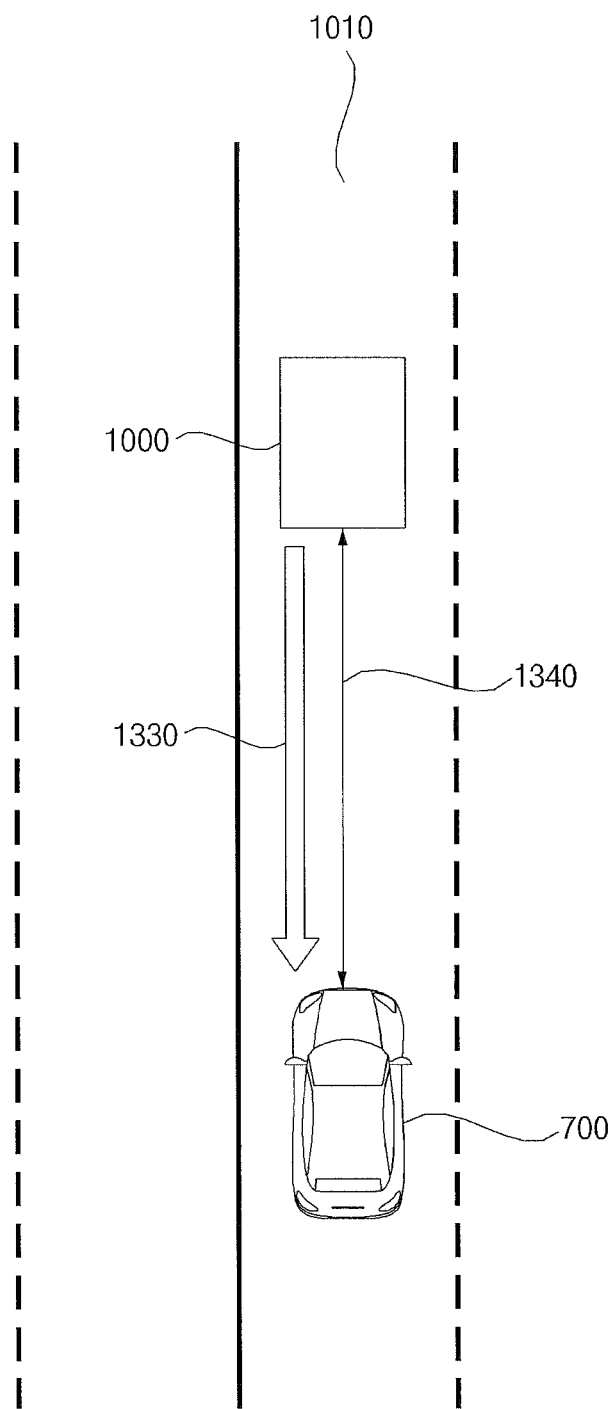

FIG. 13 illustrate example methods of operating a vehicle air circulation control device based on object information.

Referring to FIG. 13, the processor 170 may detect the object 1000 in an image of the surroundings of the vehicle 700. The processor 170 may determine whether to switch to the outside air circulation mode or the inside air circulation mode based on object information.

For example, the processor 170 may determine whether to switch to the outside air circulation mode or the inside air circulation mode based on a location of the detected object 1000, a distance 1340 between the vehicle 700 and the object 1000, and a relative speed between the vehicle 700 and the object 1000, independently or in combination.

In some implementations, the processor 170 may generate the object information based on the image of the surroundings of the vehicle. Or the processor 170 may receive the object information from the object sensor (125 in FIG. 4).

The processor 170 may determine whether to switch to the outside air circulation mode or the inside air circulation mode based on the object information and information about the wind direction 1330 or wind speed information.

In some implementations, the processor 170 may generate the wind direction information or the wind speed information based on the image of the surroundings of the vehicle. Or the processor 170 may receive the wind direction information or the wind speed information from the wind sensor (127 in FIG. 4).

Figure 14:
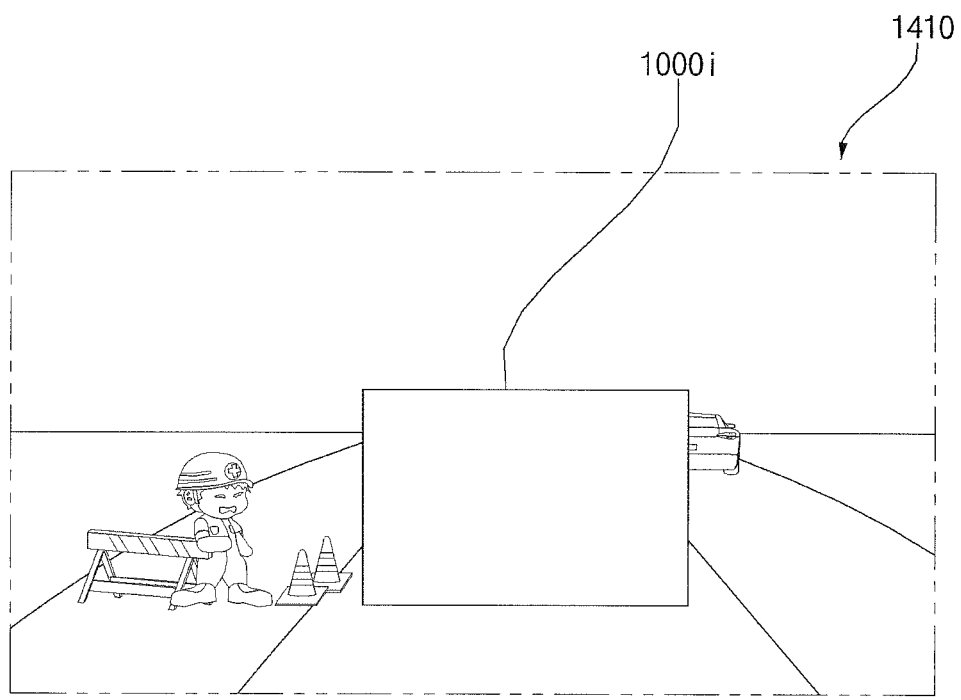

FIG. 14 illustrate example methods of operating a vehicle air circulation control device based on an acquired image 1410.

Referring to FIG. 14, the processor 170 may detect an object 1000i in an image of the surroundings of the vehicle. Herein, the image of the surroundings of the vehicle may include one of a mono image, a stereo image, an around-view image, and an omnidirectional image.

The processor 170 may generate location information about the object 1000i, information about a distance between the vehicle 700 and the object 1000i, and information about a relative speed between the vehicle 700 and the object 1000i based on the image of the surroundings of the vehicle.

The processor 170 may acquire the location information about the object 1000i based on information about pixels occupied by the object 1000i in the image of the surroundings of the vehicle.

The processor 170 may acquire the information about the distance between the vehicle 700 and the object 1000i based on disparity information.

In a state where the distance information about the object 1000i has been acquired, the processor 170 may acquire the information about the relative distance between the vehicle 700 and the object 1000i based on a variation in the distance to the object 1000i with passage of time.

Figure 15A:
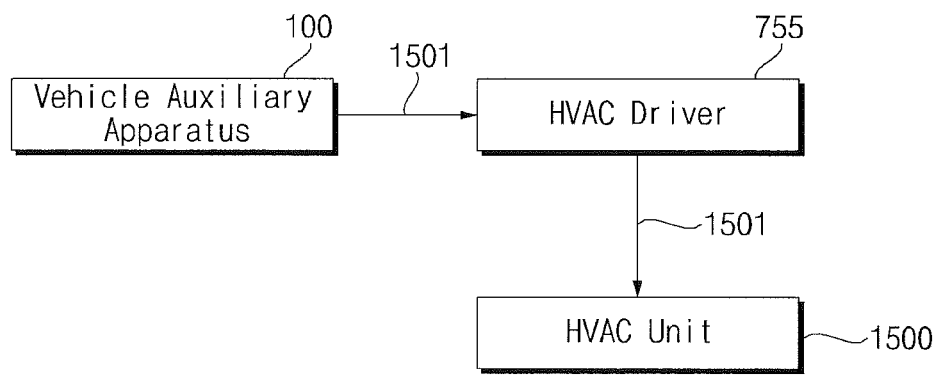
FIGS. 15A to 15C are diagrams illustrating example methods of providing an air conditioning control signal from an air circulation control device to a vehicle.
Figure 15A:
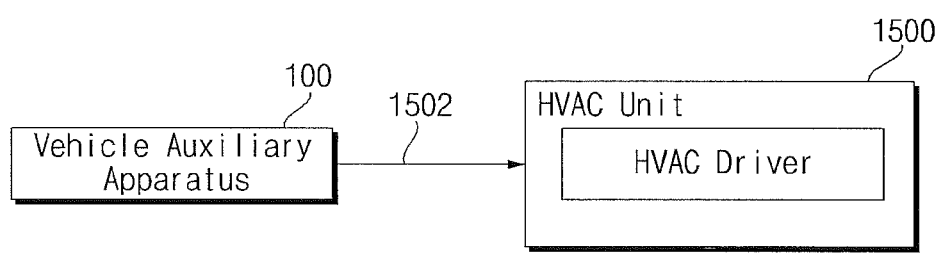
Figure 15B:
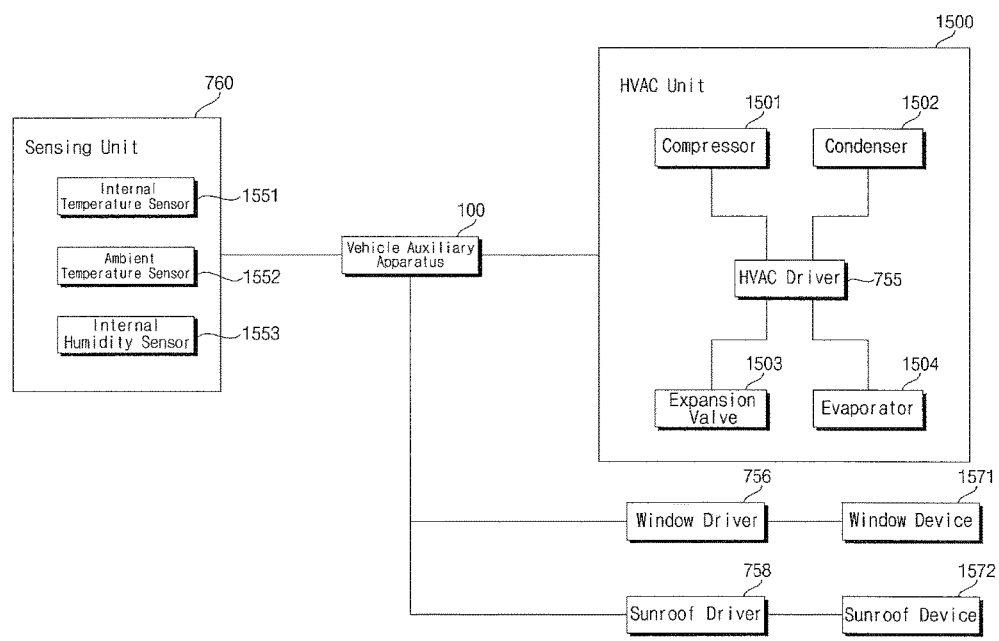
Figure 15C:
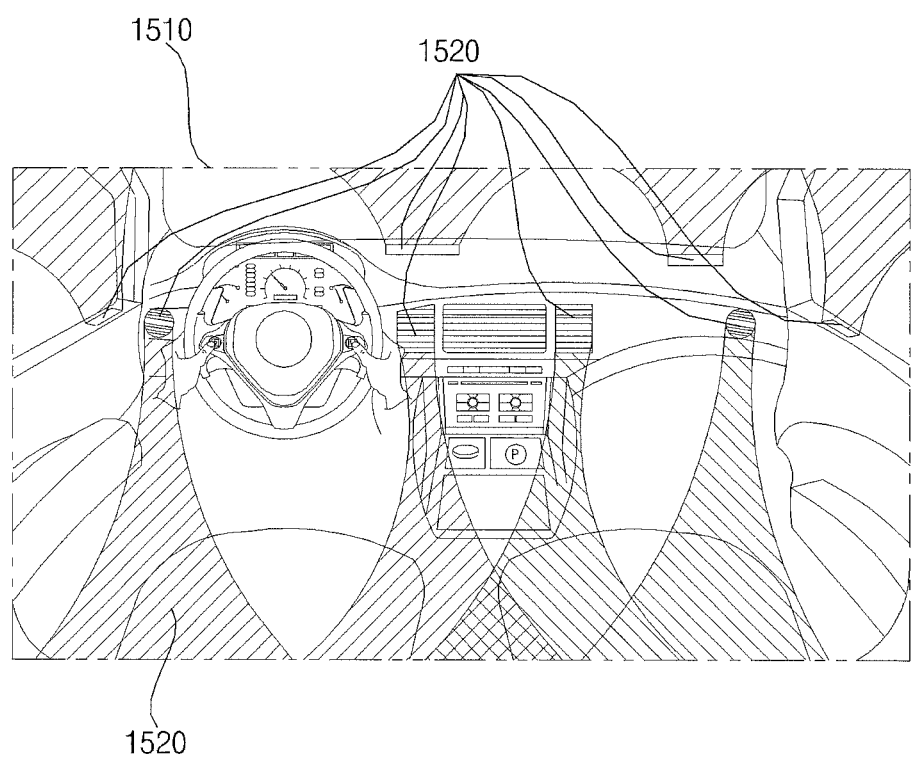

FIGS. 15A to 15C illustrate example methods of providing an air conditioning control signal from an air circulation control device to a vehicle.

Referring to FIG. 15A, the vehicle air circulation control device 100 may provide a signal 1501 for controlling an HVAC unit 1500 to the HVAC driver 755. The HVAC driver 755 may control the HVAC unit 1500 in correspondence with the received signal 1501.

In some implementations, the vehicle air circulation control device 100 may provide a signal 1502 for controlling the HVAC unit 1500 to the HVAC unit 1500. In this case, the HVAC driver 755 may be incorporated into the HVAC unit 1500.

The processor 170 may provide a signal for controlling the HVAC unit 1500 to switch to the outside air circulation mode or the inside air circulation mode.

The processor 170 may provide an HVAC control signal to the HVAC unit 1500 so that air may be supplied inside the vehicle.

Referring to FIG. 15B, the HVAC unit 1500 may include a compressor 1501, a condenser 1502, an expansion valve 1503, and an evaporator 1504.

The compressor 1501 sucks, compresses, and circulates a coolant. The compressor 150 converts a low-pressure gaseous coolant into a high-temperature, high-pressure gaseous coolant and transfers the high-temperature, high-pressure gaseous coolant to the condenser 1502. The compressor 1501 may operate by engine power. Or the compressor 1501 may operate by a motor that provides a driving force.

The condenser 1502 converts the high-temperature, high-pressure gaseous coolant received from the compressor 1501 to an aqueous coolant by cooling the high-temperature, high-pressure gaseous coolant.

The expansion value 1503 decreases the pressure of the aqueous coolant and controls a flow amount of the coolant introduced into the evaporator 1504.

The evaporator 1504 converts the low-temperature, low-pressure saturated liquid-vapor coolant received after an expansion operation to a gas (overheated vapor) by heat exchange between the low-temperature, low-pressure saturated liquid-vapor coolant and internal or ambient air of the vehicle. The heat-exchanged air is changed to a low-pressure, low-humidity state and discharged into the vehicle by a fan.

The processor 170 of the vehicle air circulation control device 100 may receive sensing information from the sensing unit 760 through the interface unit 130.

For example, the processor 170 may receive vehicle internal temperature information from an internal temperature sensor 1551.

For example, the processor 170 may receive vehicle ambient temperature information from an ambient temperature sensor 1552.

For example, the processor 170 may receive vehicle internal humidity information from an internal humidity sensor 1553. For example, the internal humidity sensor 1553 may sense humidity around the windshield in the vehicle. The processor 170 may receive information about the humidity around the windshield in the vehicle.

If the vehicle interval temperature is different from the vehicle ambient temperature, moisture may be formed on glass (for example, the windshield) inside the vehicle. Herein, moisture formation may be referred to as fogging.

The processor 170 may predict whether moisture is formed on the glass inside the vehicle based on the internal temperature information and the ambient temperature information. For example, the processor 170 may predict whether moisture is formed on the glass inside the vehicle based on the difference between an internal temperature value and an ambient temperature value.

If the processor 170 predicts that moisture will be formed, the processor 170 may provide a control signal for driving the compressor 1501 to the HVAC driver 755. The processor 170 may determine how much to drive the compressor 1501 based on the difference between the internal temperature value and the ambient temperature value.

As the compressor 1501 operates, the HVAC unit 1500 may supply cool air to the glass inside the vehicle. As a consequence, moisture formation on the glass inside the vehicle may be prevented in advance.

The processor 170 may determine whether moisture is formed on the glass inside the vehicle based on internal humidity information.

If determining moisture formation, the processor 170 may provide a control signal for driving the compressor 1501 to the HVAC driver 755. The processor 170 may determine how much to drive the compressor 1501 based on a humidity value.

As the compressor 1501 operates, the HVAC unit 1500 may supply cool air to the glass inside the vehicle. As a consequence, moisture formation on the glass inside the vehicle may be prevented in advance.

In some implementations, if predicting or determining moisture formation, the processor 170 may provide a signal for controlling window opening to the window driver 756. The processor 170 may determine how much to open a window based on the difference between the internal temperature value and the ambient temperature value, or the humidity value. The window driver 756 may open a window by controlling a window device 1571.

In some implementations, if predicting or determining moisture formation, the processor 170 may provide a signal for controlling sunroof opening to the sunroof driver 768. The processor 170 may determine how much to open the sunroof based on the difference between the internal temperature value and the ambient temperature value, or the humidity value. The sunroof driver 768 may open the sunroof by controlling a sunroof device 1572.

As the compressor 1501 operates, the HVAC unit 1500 may supply cool air to the glass inside the vehicle. As a consequence, moisture formation on the glass inside the vehicle may be prevented in advance.

In some implementations, the HVAC unit 1500 may further include a heater core and a heater hose, for heating.

The HVAC unit 1500 may further include a blower for blowing heat-exchanged air.

Referring to FIG. 15C, when the processor 170 provides a signal for controlling switching to the inside air circulation mode, moisture may be formed on glass 1510 included in the vehicle 700. In this case, the processor 170 may provide a HVAC control signal to the HVAC unit 1500 so that air may be supplied inside the vehicle through discharge holes 1520 to prevent moisture.

If the inside air circulation mode is switched to during traveling in the outside air circulation mode, moisture may be formed on glass included in the vehicle 700. The processor 170 may provide an HVAC control signal for preventing moisture along with a signal for controlling switching to the inside air circulation mode. For example, the processor 170 may provide a signal for controlling driving of the compressor along with a signal for controlling switching to the inside air circulation mode to the HVAC driver 755. The processor 170 may determine how much to drive the compressor 1501 based on the difference between the vehicle internal temperature value and the vehicle ambient temperature value. Or if the inside air circulation mode is switched to during traveling in the outside air circulation mode, the vehicle 700 or the processor 170 may determine how much to drive the compressor 1501 based on the humidity value.

Formation of moisture on the glass 1510 included in the vehicle 700 may be prevented by the above control operation.

In some implementations, a driver for adjusting an air discharge direction may be included in a discharge hole. When the processor 170 provides an HVAC control signal for preventing moisture, the processor 170 may control air to be discharged toward the glass by controlling the driver.

When the processor 170 provides a signal for controlling switching to the outside air circulation mode or the inside air circulation mode, a vehicle internal temperature may be changed. In this case, the processor 170 may provide an HVAC control signal to the HVAC unit 1500 so that cool air or warm air may be supplied inside the vehicle to maintain the vehicle internal temperature at a predetermined value. For example, the processor 170 may provide a signal for controlling driving of the compressor 1501 or the heating core along with the signal for controlling switching to the outside air circulation mode or the inside air circulation mode to the HVAC driver 755. Herein, the processor 170 may determine how much to drive the compressor 1501 or the heating core based on the predetermined temperature.

Since the processor 170 provides a signal for controlling a vehicle internal temperature along with a signal for controlling switching to the outside air circulation mode or the inside air circulation mode, the vehicle internal temperature may be maintained constant.

Figure 16:
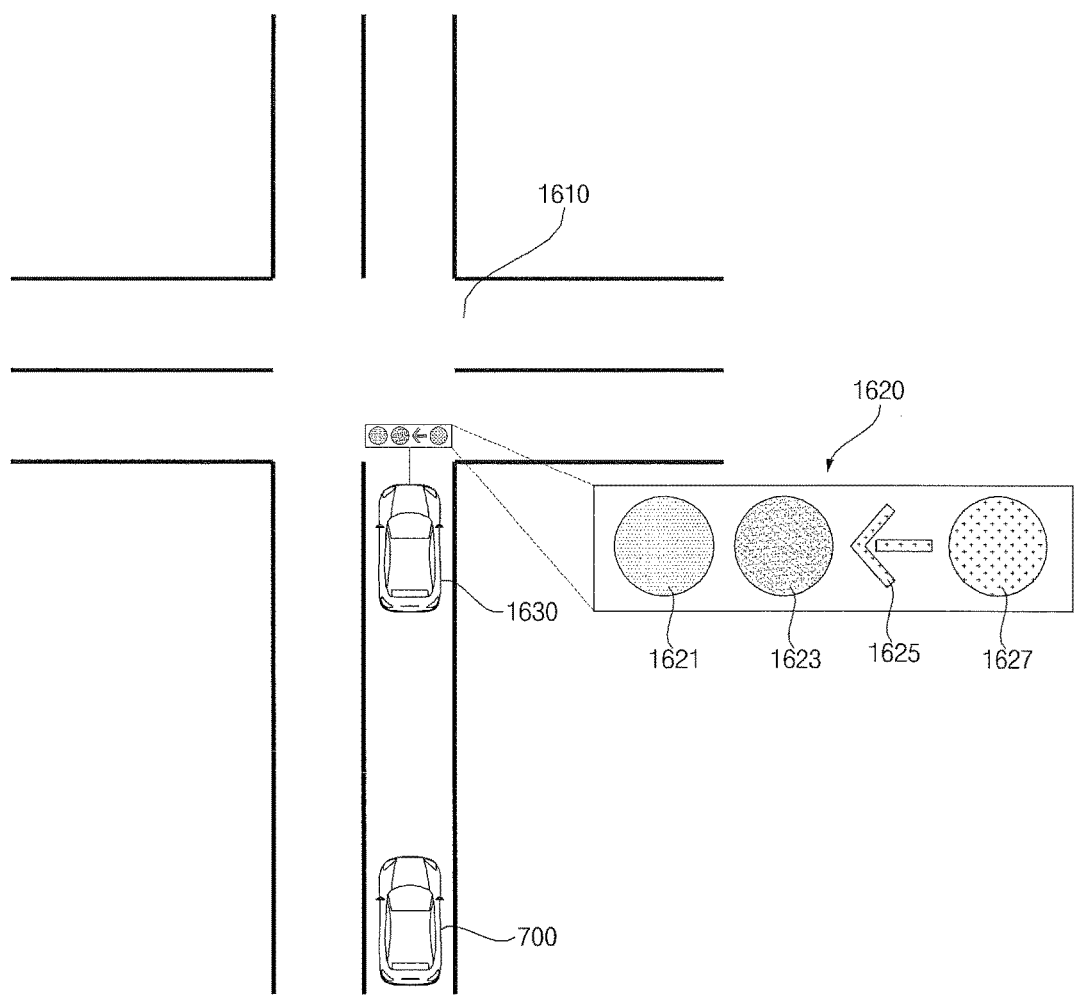
FIG. 16 is a diagram illustrating an example method of operating an air circulation control device for a vehicle based on a traffic light.

FIG. 16 illustrate an example method of operating an air circulation control device for a vehicle based on a traffic light.

Referring to FIG. 16, the processor 170 may detect a traffic light 1620 as an object in an image of the surroundings of the vehicle. The processor 170 may acquire a stop signal 1621 or a go signal 1625 or 1627 of the detected traffic light 1620.

The processor 170 may provide a signal for controlling switching to the outside air circulation mode or the inside air circulation mode in correspondence with the signals 1621, 1623, 1625, and 1627 of the acquired traffic light 1620.

Upon acquisition of the stop signal 6121, the processor 170 may provide a signal for controlling switching to the inside air circulation mode. In the presence of another vehicle 1630 ahead of the vehicle 700, exhaust fumes discharged from the vehicle 1630 may be introduced into the vehicle 700 in the stationary state of the vehicle 700. Introduction of exhaust fumes from another vehicle may be blocked by switching to the inside air circulation mode upon acquisition of the stop signal 1621.

Upon acquisition of the go signal 1625 or 1627, the processor may provide a signal for controlling switching to the outside air circulation mode. If the vehicle 700 is traveling, a distance to the preceding vehicle 1630 becomes greater. Thus, even though the outside air circulation mode is switched to, exhaust fumes from the other vehicle 1630 are not introduced into the vehicle 700.

In some implementations, the processor 170 may acquire information about a distance between the traffic light 1620 and the vehicle 700. The processor 170 may determine the distance between the traffic light 1620 and the vehicle 700 based on disparity information.

Upon acquisition of the go signal 1625 or 1627, the processor 170 may provide a signal for controlling switching to the outside air circulation mode a predetermined time later according to the distance between the traffic light 1620 and the vehicle 700. If the vehicle 700 is apart from the traffic light 1620 by a predetermined distance, the vehicle 700 may start a predetermined time (interval) later even though the traffic light 1620 outputs the go signal 1625 or 1627. Introduction of exhaust fumes from another vehicle into the vehicle 700 may be prevented by maintaining the inside air circulation mode until before the vehicle 700 starts.

The processor 170 may detect movement of the preceding vehicle 1630 ahead of the vehicle 700 in an image of the surroundings of the vehicle 700. Upon detection of movement of the other vehicle 1630 after acquiring the go signal 1625 or 1627, the processor 170 may provide a signal for controlling switching to the outside air circulation mode.

In some implementations, the processor 170 may detect a plurality of other vehicles between the traffic light 1620 and the vehicle 700. Upon acquisition of the go signal 1625 or 1627, the processor 170 may provide a signal for controlling switching to the outside air circulation mode a predetermined time later according to the number of other vehicles detected between the traffic light 1620 and the vehicle 700. As more and more other vehicles are located between the vehicle 700 and the traffic light 1620, a time interval spanning from turn-on of the go signal 1625 or 1627 to the start of the vehicle 700 may become longer. The processor 170 maintains the inside air circulation mode during the time interval even after the go signal 1625 or 1627 is turned on, thereby preventing introduction of exhaust fumes from other vehicles into the vehicle 700.

In some implementations, the vehicle 700 may receive signal switching information about the traffic light 1620 from the external server (601 in FIG. 7) through the V2X communication module (716 in FIG. 7). Herein, the external server (601 in FIG. 7) may be a traffic control server. The processor 170 may receive the signal switching information about the traffic light 1620 through the interface unit 130.

The processor 170 may acquire an expected departure time of the vehicle based on the signal switching information and the distance between the traffic light 1620 and the vehicle 700 or the number of other vehicles located between the vehicle 700 and the traffic light 1620. The processor 170 may provide a signal for controlling switching to the outside air circulation mode at the expected departure time.

Figure 17:
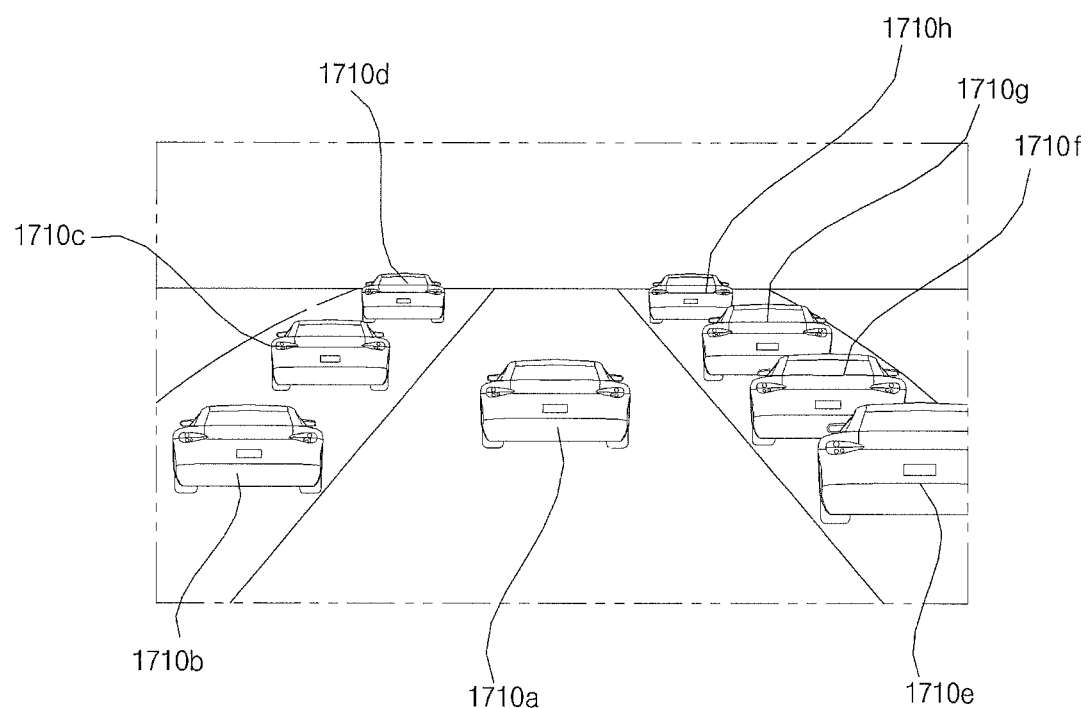
FIG. 17 is a diagram illustrating an example method of operating an air circulation control device for a vehicle based on traffic.

FIG. 17 illustrate an example method of operating an air circulation control device for a vehicle based on traffic.

Referring to FIG. 17, the processor 170 may provide a signal for controlling switching to the inside air circulation mode based on traffic amount information.

The processor 170 may determine the amount of traffic according to the number of other vehicles 1710*a*, 1710*b*, 1710*c*, 1710*d*, 1710*e*, 1710*f*, 1710*g*, and 1710*h* in a predetermined zone.

The processor 170 may detect a plurality of other vehicles 1710*a*, 1710*b*, 1710*c*, 1710*d*, 1710*e*, 1710*f*, 1710*g*, and 1710*h* in an image of the surroundings of the vehicle. If the number of other vehicles detected in the predetermined zone is equal to or larger than a reference number, the processor 170 may provide a signal for controlling switching to the inside air circulation mode. The predetermined zone may be an area ahead within a predetermined distance from the vehicle 700.

If the vehicle 700 is traveling in a heavy traffic zone, exhaust fumes discharged from a plurality of other vehicles may be introduced into the vehicle 700. In this case, introduction of exhaust fumes into the vehicle 700 may be blocked in advance by switching to the inside air circulation mode.

In some implementations, the vehicle 700 may receive traffic amount information from the external server (601 in FIG. 7) through the V2X communication module (716 in FIG. 7). The external server (601 in FIG. 7) may be a traffic control server. The processor 170 may receive the traffic amount information through the interface unit 130.

The processor 170 may provide a signal for controlling switching to the inside air circulation mode based on the traffic amount information.

Figure 18:
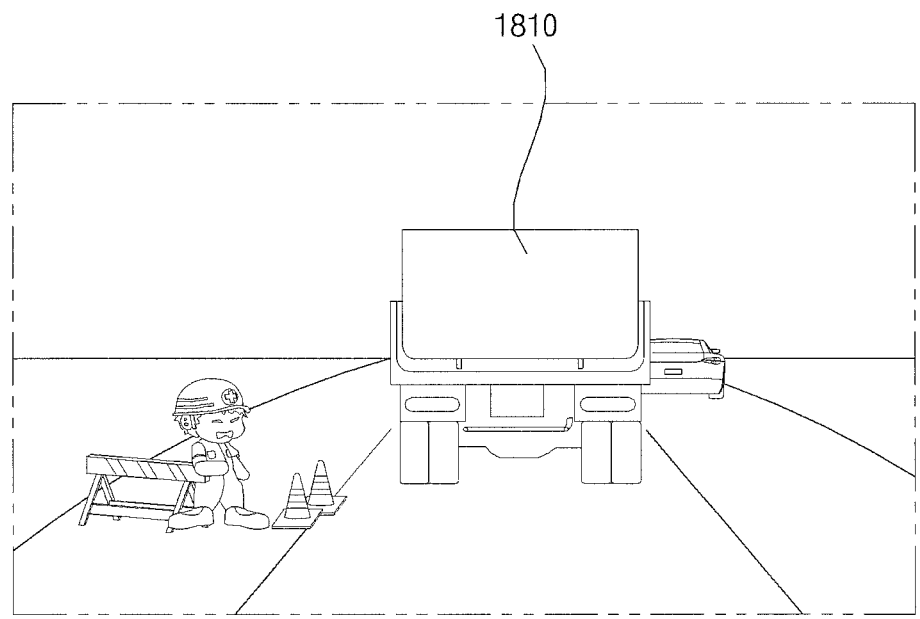
FIGS. 18 and 19 are diagrams illustrating an example method of operating an air circulation control device for a vehicle based on driving or stop of the vehicle.
Figure 19:
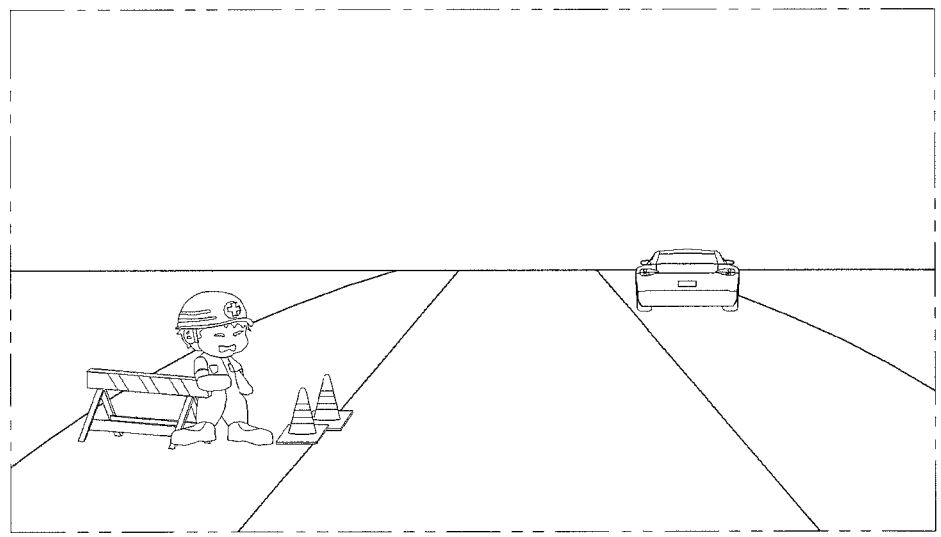

FIGS. 18 and 19 illustrate example methods of operating an air circulation control device for a vehicle based on driving or stop of the vehicle.

Referring to FIG. 18, the processor 170 may detect an object 1810 in an image of the surroundings of the vehicle. The object 1810 may be a contamination-causing matter. For example, the object 180 may be a preceding diesel vehicle, a motor cycle, a garbage vehicle, a truck, or a vehicle carrying a smoking passenger.

If the vehicle 700 is traveling in a state where an object has been detected, the processor 170 may provide a signal for controlling switching to the outside air circulation mode. Despite the presence of the preceding object 1810, if the vehicle 700 is traveling, the vehicle 700 gets apart from the object 1810 by a predetermined distance or above. If the distance between the object 1810 and the vehicle 700 is equal to or larger than a reference distance, the processor 170 may provide a signal for controlling switching to the outside air circulation mode.

If the vehicle 700 stops in the state where an object has been detected, the processor 170 may provide a signal for controlling switching to the inside air circulation mode. In the presence of the preceding object 1810, if the vehicle 700 is traveling, the vehicle 700 gets closer to the object 1810. In the presence of the preceding object 1810, more of a contaminant discharged from the preceding object 1810 may be introduced into the vehicle 700 in the stationary state of the vehicle 700 than during traveling of the vehicle 700. If the vehicle 700 stops in the state where an object has been detected, the inside air circulation mode may be switched to, thereby blocking introduction of a contaminant into the vehicle 700 in advance.

As illustrated in the example of FIG. 19, if the object (1810 in FIG. 19) has moved and thus is not detected any longer in the stationary state of the vehicle 700, the processor 170 may provide a signal for controlling switching to the outside air circulation mode.

In the case where a preceding object (1810 in FIG. 18) has been detected and is not detected any longer due to movement of the preceding object (1810 in FIG. 18), the inside air circulation mode may be switched to the outside air circulation mode. Therefore, ambient fresh air may be introduced fast into the vehicle.

Figure 20:
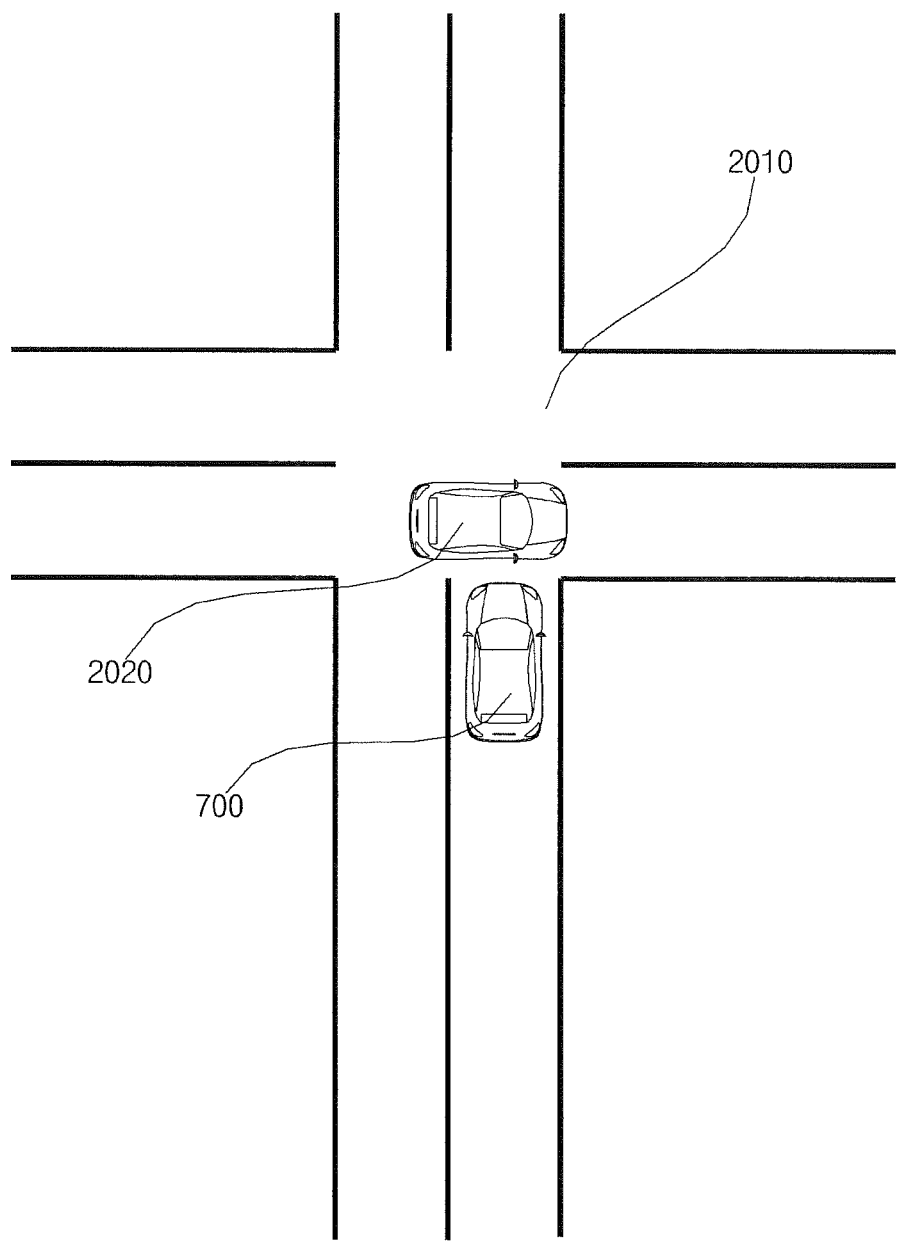
FIG. 20 is a diagram illustrating an example method of operating an air circulation control device for a vehicle based on intersection information.

FIG. 20 illustrate an example method of operating an air circulation control device for a vehicle based on intersection information.

Referring to FIG. 20, the processor 170 may acquire information about an intersection 2010 based on an image of the surroundings of the vehicle. The processor 170 may recognize the intersection 2010 based on a road surface, a traffic light, lanes (for example, an intersection of lanes), a side of another vehicle, or a traffic sign board, which is detected in the image of the surroundings of the vehicle.

The processor 170 may acquire the intersection information based on navigation information.

In a state where the traffic 700 stops around the intersection 201, the processor 170 may detect an object 2020 crossing in the overall width direction of the vehicle 700. In this case, the processor 170 may provide a signal for controlling switching to the inside air circulation mode. The object 2020 may be a contamination-causing matter. For example, the object 2020 may be a preceding diesel vehicle, a motor cycle, a garbage vehicle, a truck, or a vehicle carrying a smoking passenger.

If the vehicle 700 is the first of vehicles waiting at the intersection, a contaminant discharged from the object 2020 traveling in a direction intersecting with an expected traveling direction of the vehicle 700 may be introduced into the vehicle 700. In this case, introduction of a contaminant may be prevented by switching to the inside air circulation mode.

FIGS. 21A to 21L and 22A to 22B illustrate example objects.

Figure 21A:
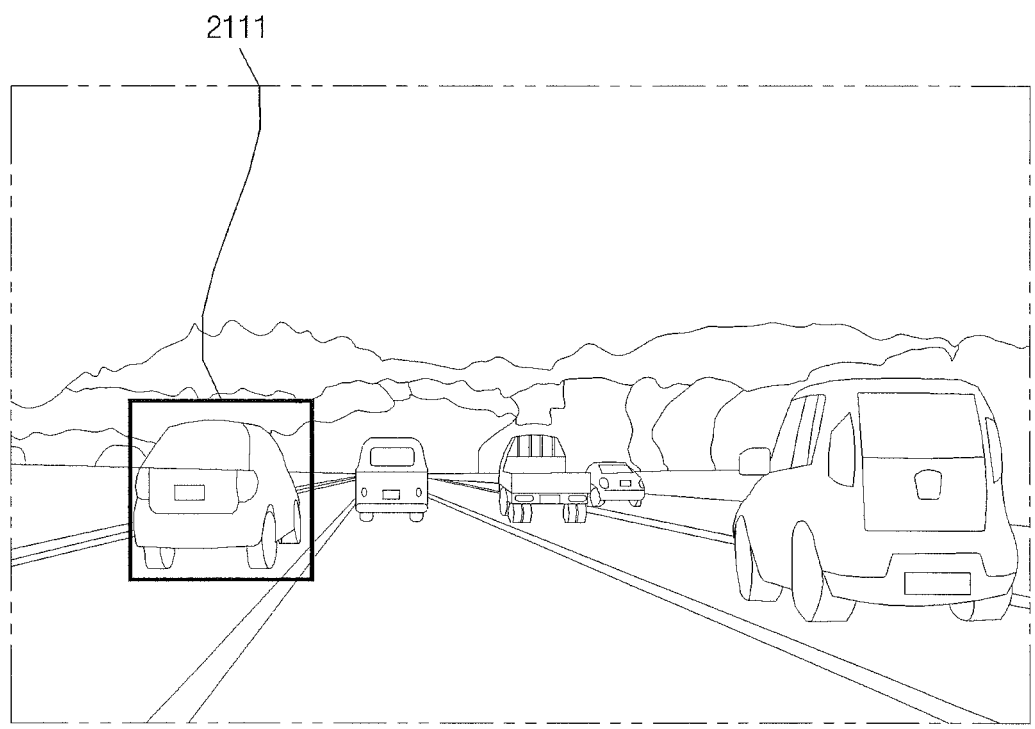
FIGS. 21A to 21L are diagrams illustrating example objects.
Figure 21B:
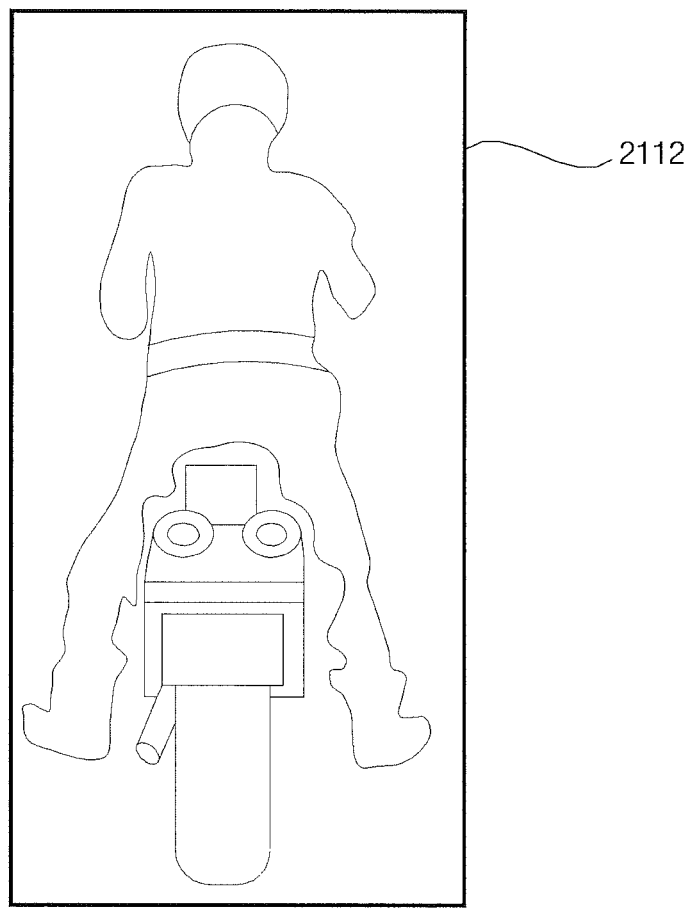
Figure 21C:
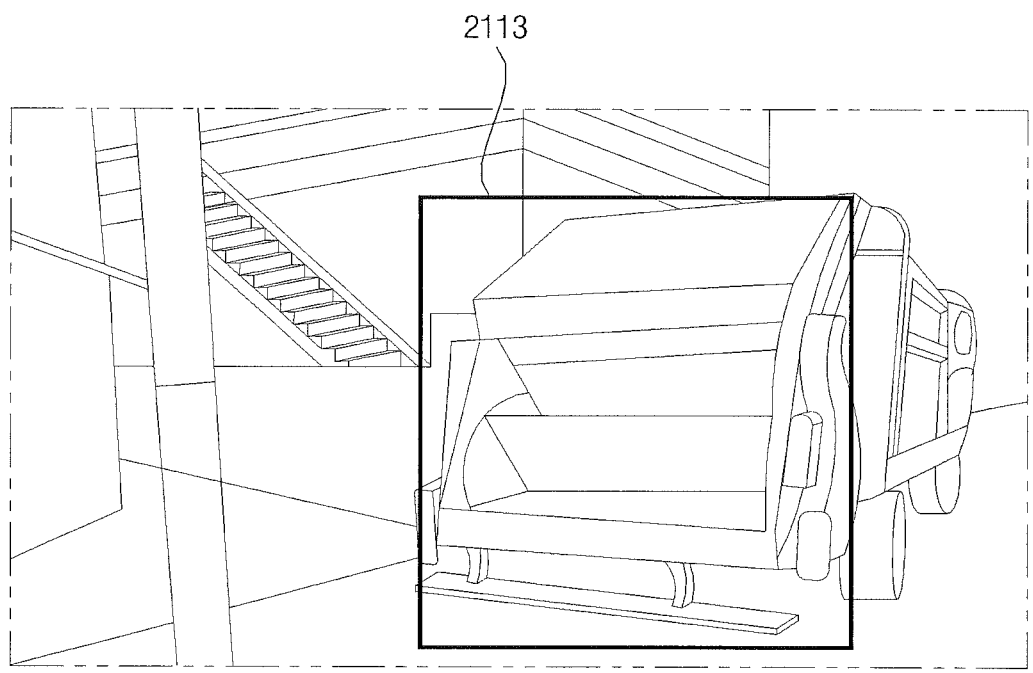
Figure 21D:
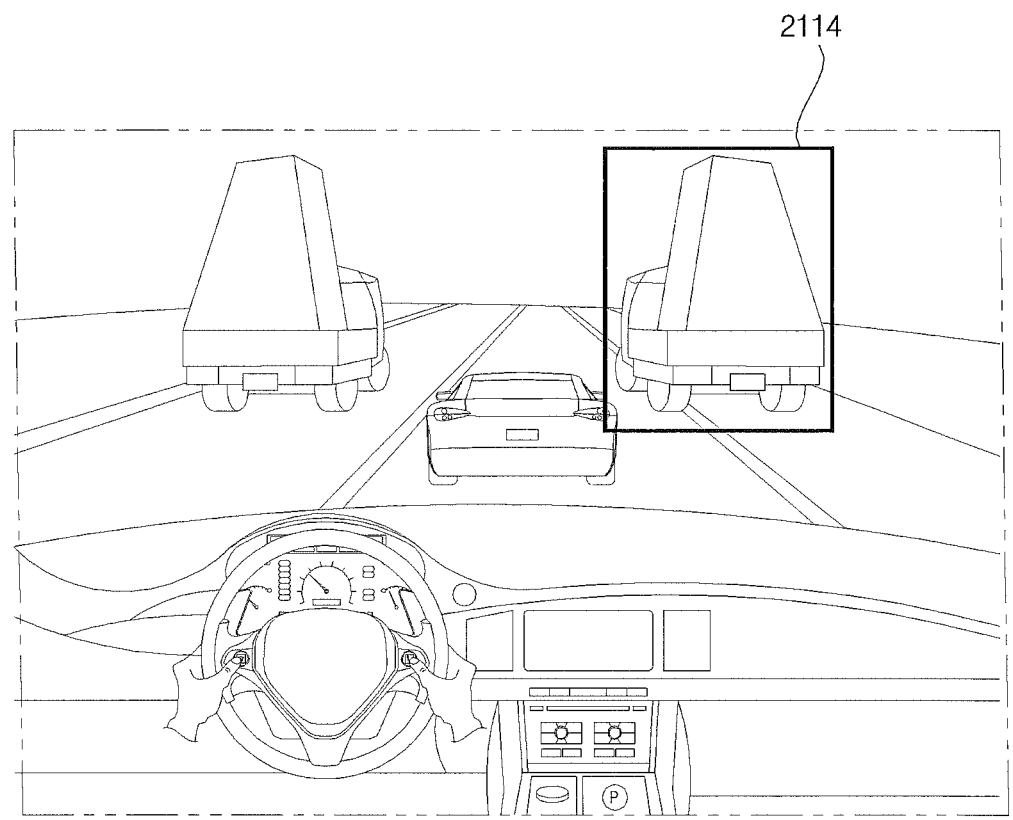
Figure 21E:
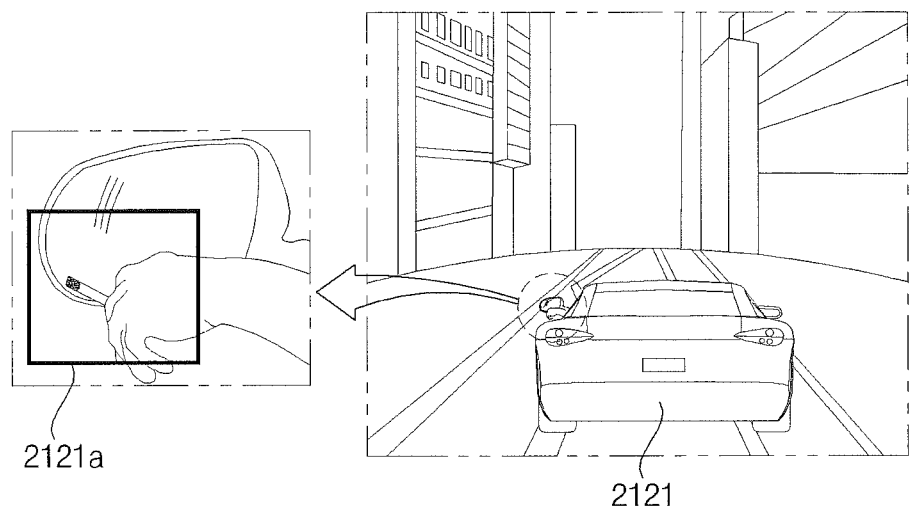
Figure 21F:
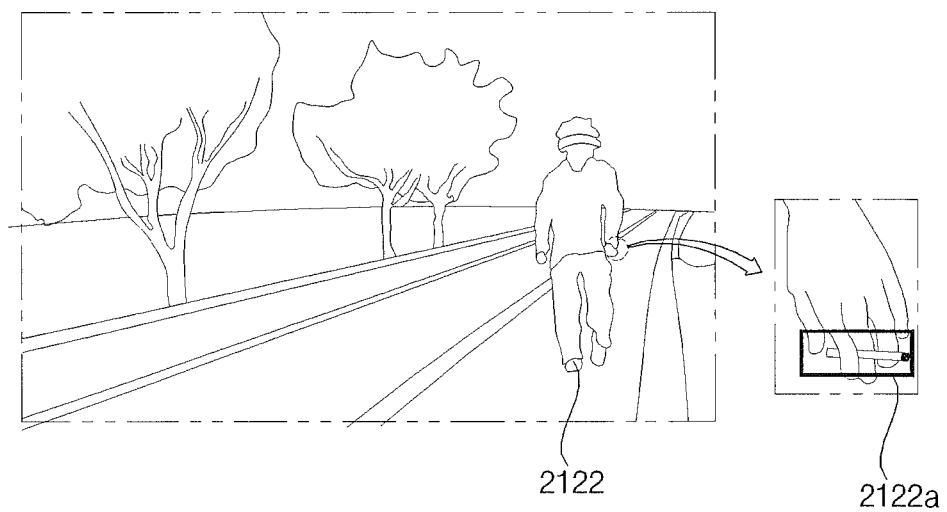
Figure 21G:
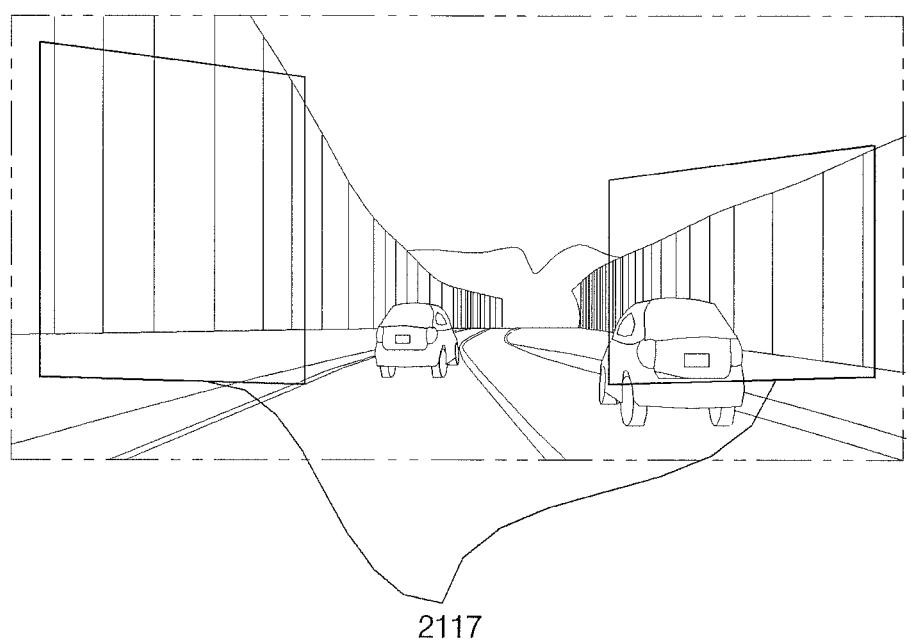
Figure 21H:
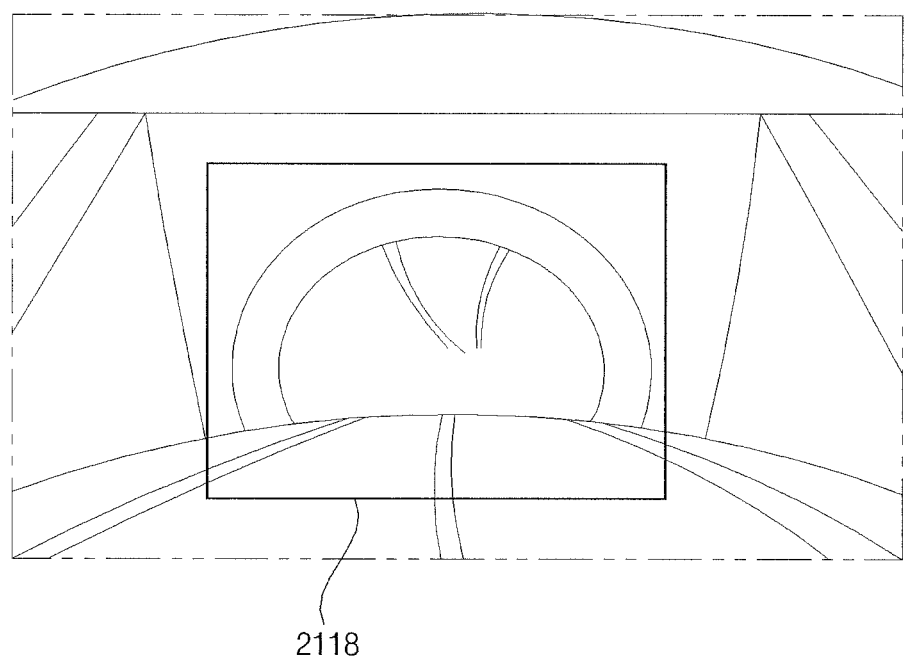
Figure 21I:
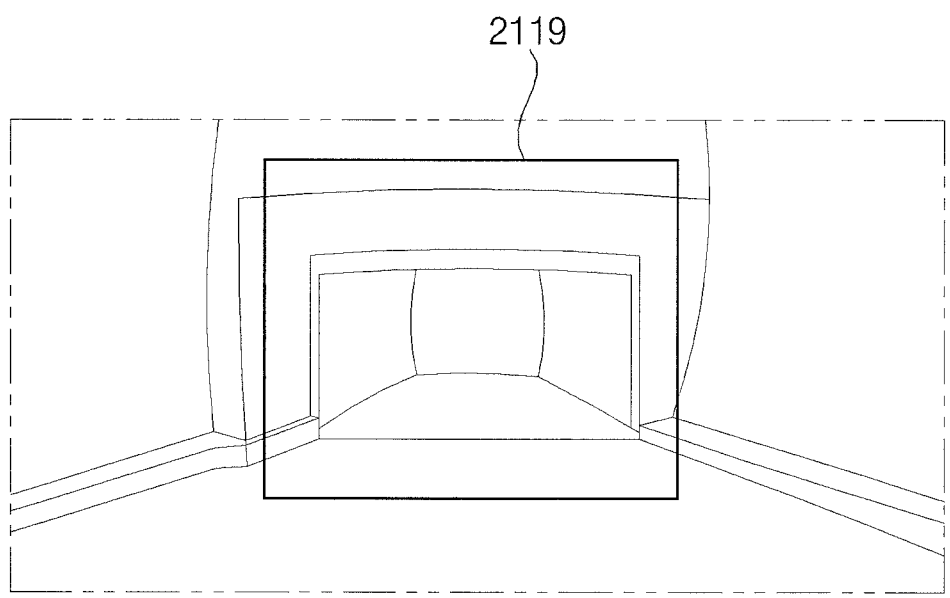
Figure 21J:
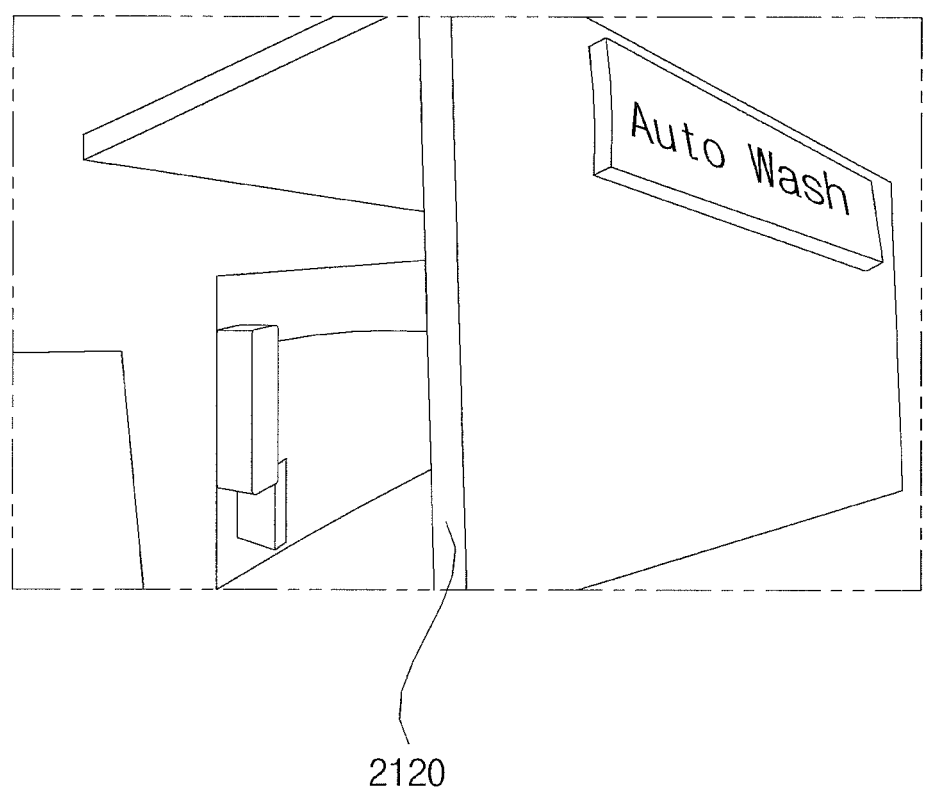
Figure 21K:
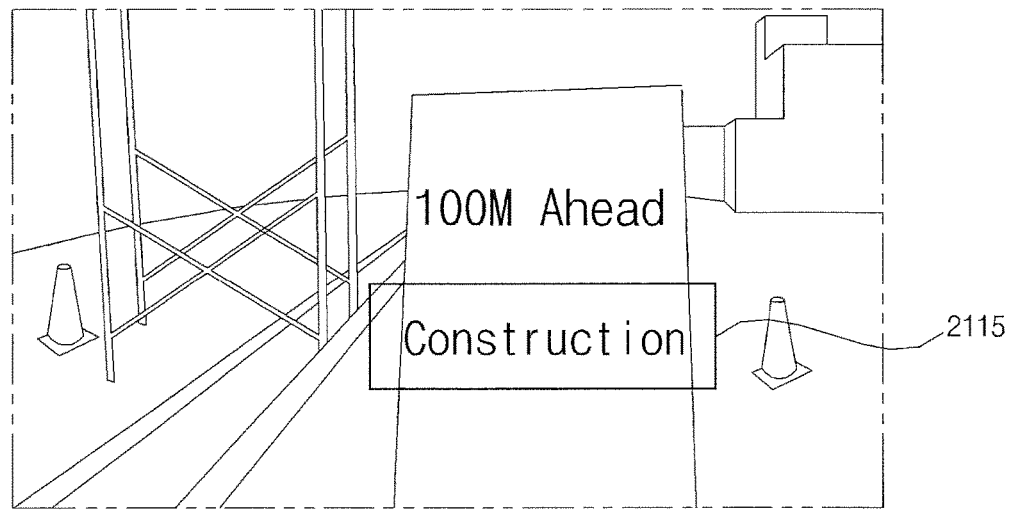
Figure 21K:
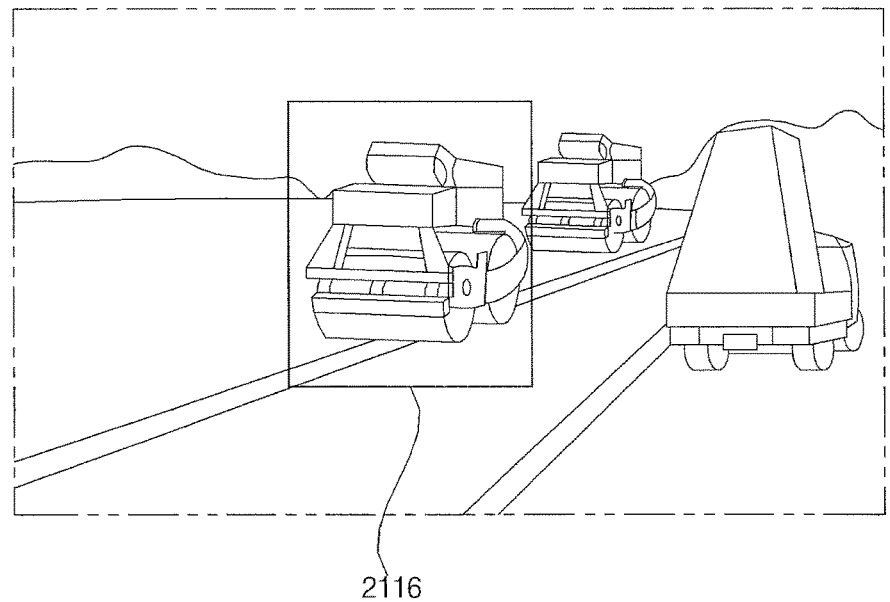
Figure 21L:
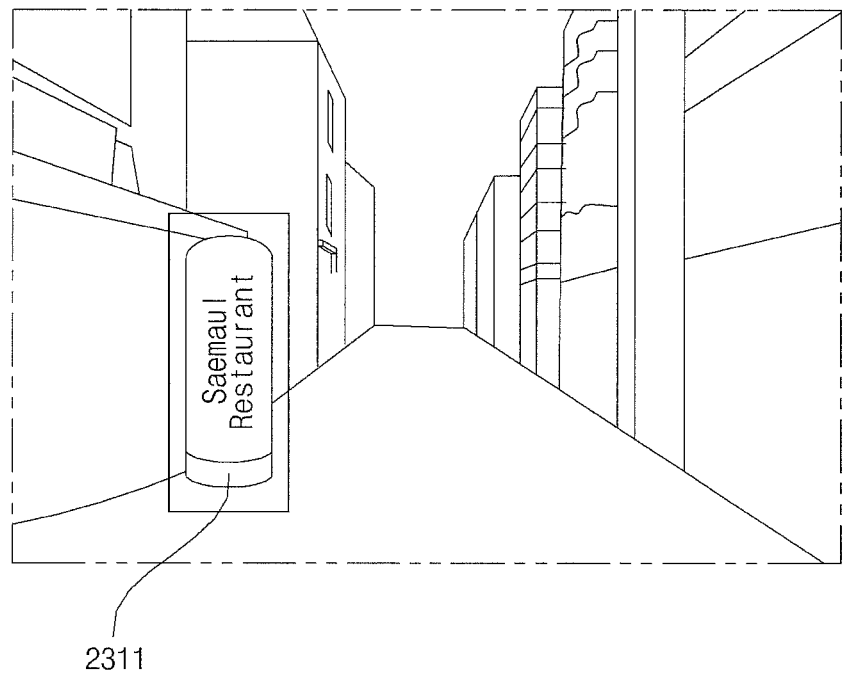

Objects may include contamination-causing matters (FIGS. 21A to 21F), contamination-inducing matters (FIGS. 21G to 21J), and contamination-indicating matters (FIG. 21K to FIG. 21L).

The contamination-causing matters (FIGS. 21A to 21F) may include a diesel vehicle (2111 in FIG. 21A), a motor cycle (2112 in FIG. 21B), a garbage vehicle (2113 in FIG. 21C), a truck (2114 in FIG. 21*d*), a vehicle carrying a smoking passenger (2121 in FIG. 21E), and a smoking pedestrian (2122 in FIG. 21F).

Since the diesel vehicle (2111 in FIG. 21A) discharges an exhaust gas rich in nitrogen oxides, the diesel vehicle may be classified as a contamination-causing matter. The processor 170 may detect the diesel vehicle (2111 in FIG. 21A) based on a feature point such as a shape, a size, or a vehicle type (Sport Utility Vehicle (SUV), etc.), or a license plate.

The motor cycle (2112 in FIG. 21B) includes a 2-stroke engine. Since the motor cycle (2112 in FIG. 21B) discharges a contaminant due to incomplete combustion of the 2-stroke engine, the motor cycle may be classified as a contamination-causing matter. The processor 170 may detect the motor cycle (2112 in FIG. 21B) based on a feature point such as a shape or a size, or a license plate.

The garbage vehicle (2113 in FIG. 21C) loads garbage. The garbage vehicle (2113 in FIG. 21C) may be classified as a contamination-causing matter due to stench of garbage and a contaminant. The processor 170 may detect the garbage vehicle (2113 in FIG. 21C) based on a feature point such as a shape, a size, or a color, or a license plate.

The truck (2114 in FIG. 21D) loads various items. Most of trucks (2114 in FIG. 21D) are diesel vehicles. The truck (2114 in FIG. 21D) may be classified as a contamination-causing matter due to a contaminant among the various items and an exhaust gas discharged through the cycle stroke of a diesel engine. The processor 170 may detect the truck (2114 in FIG. 21D) based on a feature point such as a shape (for example, the shape of a loaded part) or a size, or a license plate.

The vehicle carrying a smoking passenger (2121 in FIG. 21E) may be classified as a contamination-causing matter due to smoke of a cigarette. The processor 170 may detect a cigarette exposed from another vehicle 2121 or a hand 2121a grabbing a cigarette. The processor 170 may detect a cigarette based on a feature point of smoke, a feature point of a cigarette flame color, or a feature point of a cigarette shape. The processor 170 may detect a hand grabbing a cigarette based on a feature point of the shape of the hand grabbing a cigarette.

The smoking pedestrian (2122 in FIG. 21F) may be classified as a contamination-causing matter due to smoke of a cigarette. The processor 170 may detect a cigarette or a hand 2122a grabbing the cigarette. The processor 170 may detect the cigarette based on a feature point of smoke, a feature point of a cigarette flame color, or a feature point of a cigarette shape. The processor 170 may detect the hand grabbing the cigarette based on a feature point of the shape of the hand grabbing the cigarette.

The contamination-inducing matters (FIGS. 21G to 21J) may include a soundproof wall (2117 in FIG. 21G), a tunnel (2118 in FIG. 21H), an underground parking lot (2119 in FIG. 21I), and an automatic wash (2120 in FIG. 21J).

The soundproof wall (2117 in FIG. 21G), the tunnel (2118 in FIG. 21H), the underground parking lot (2119 in FIG. 21I), and the automatic wash (2120 in FIG. 21J) induce a contaminant discharged from a contaminant-causing matter to stay in a specific zone. In this case, the concentration of the contaminant increases in the specific zone.

The processor 170 may detect the contamination-inducing matters (FIGS. 21G to 21J) based on feature points such as a shape and a size. The processor 170 may determine entry into a contamination-inducing matter (FIGS. 21G to 21J) based on a distance to the contamination-inducing matter (FIGS. 21G to 21J).

When the vehicle 700 approaches or enters the contamination-inducing matter (FIGS. 21G to 21J), the processor 170 may provide a signal for controlling switching to the inside air circulation mode.

Contamination-indicating matters (FIGS. 21K to 21L) may include a construction sign board (2115 in FIG. 21K), construction equipment (2116 in FIG. 21K), a restaurant sign 2311, and smoke from a restaurant.

The processor 170 may detect the construction sign board (2115 in FIG. 21K) and the restaurant sign 2311 by symbol recognition or character recognition.

The processor 170 may detect the construction equipment (2116 in FIG. 21K) based on a feature point such as a shape, a size, or a color.

In some implementations, when the vehicle 700 is traveling by a construction site detected based on the construction sign board (2115 in FIG. 21K) or the construction equipment (2116 in FIG. 21K), the processor 170 may provide a signal for controlling switching to the inside air circulation mode. After the vehicle 700 passes by the construction site, the processor 170 may provide a signal for controlling switching to the outside air circulation mode.

The processor 170 may detect smoke from a restaurant based on navigation information and a feature point such as a smoke shape.

Figure 22A:
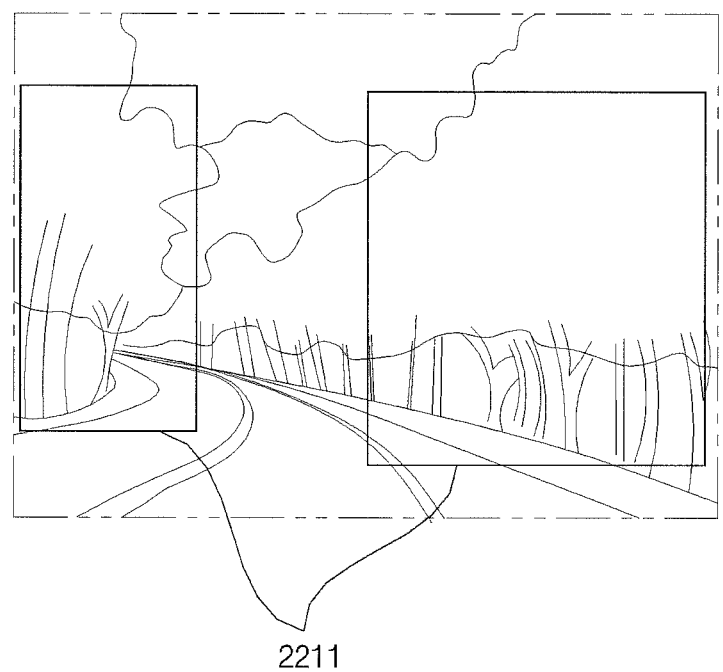
FIGS. 22A and 22B are diagrams illustrating example objects.
Figure 22B:
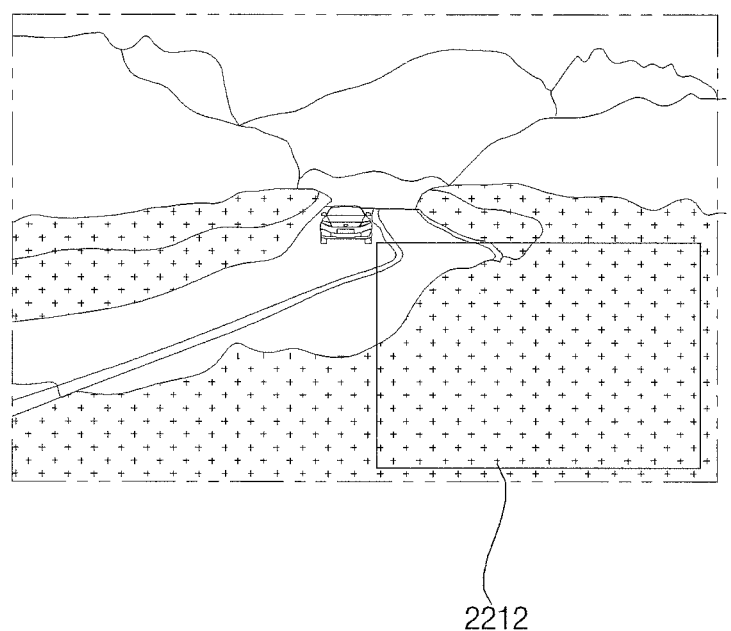

Objects may include air-purifying matters (FIGS. 22A and 22B).

The air-purifying matters (FIGS. 22A and 22B) may include a forest (2211 in FIG. 22A), a flower bed (2212 in FIG. 22B), and an orchard.

The forest (2211 in FIG. 22A), the flower bed (2212 in FIG. 22B), and the orchard around a road purify air and supply clean air. Upon detection of an air-purifying matter (FIGS. 22A and 22B), the processor 170 may provide a signal for controlling switching to the outside air circulation mode. In this case, fresh and clean air may be supplied to a passenger.

The processor 170 may detect a forest (2211 in FIG. 22A) or an orchard. The processor 170 may detect a plurality of trees planted on a side of a road based on a feature point such as a shape, a size, or a location (for example, around a road). If a plurality of trees stand successively along a road, the processor 170 may recognize a forest or an orchard from the trees.

The processor 170 may detect a flower bed (2212 in FIG. 22B). The processor 170 may detect a plurality of flowers based on a feature point such as a shape, a size, or a location. If a plurality of flowers are successive along a road, the processor 170 may recognize a flower bed from the flowers.

Figure 23A:
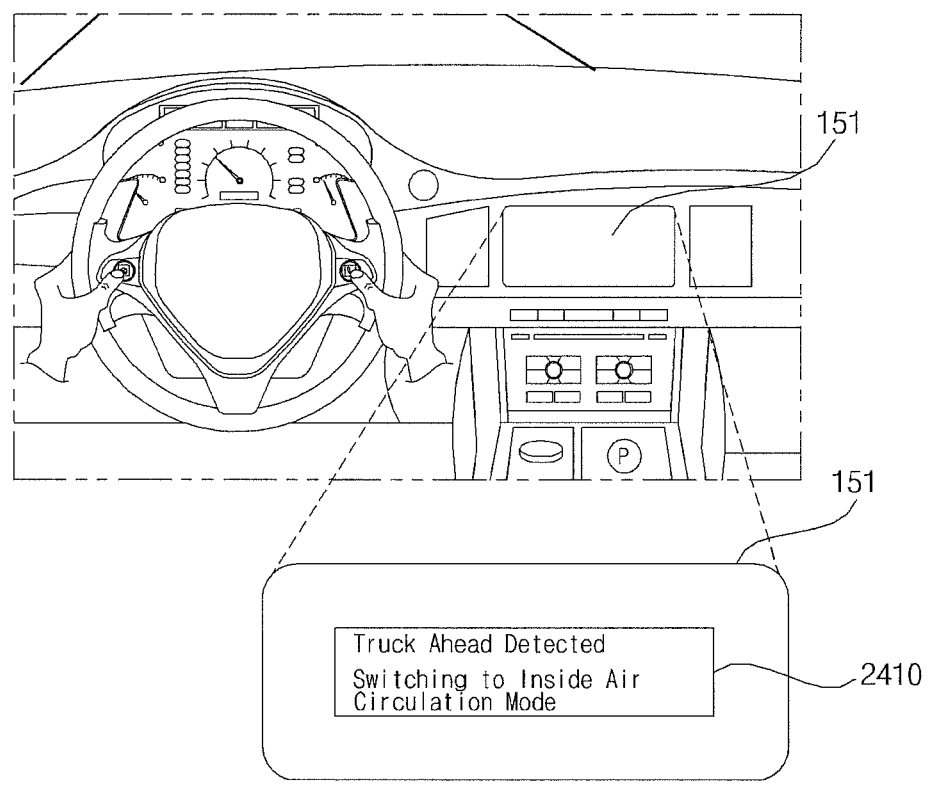
FIGS. 23A and 23B are diagrams illustrating an example method of outputting switching cause information.
Figure 23B:
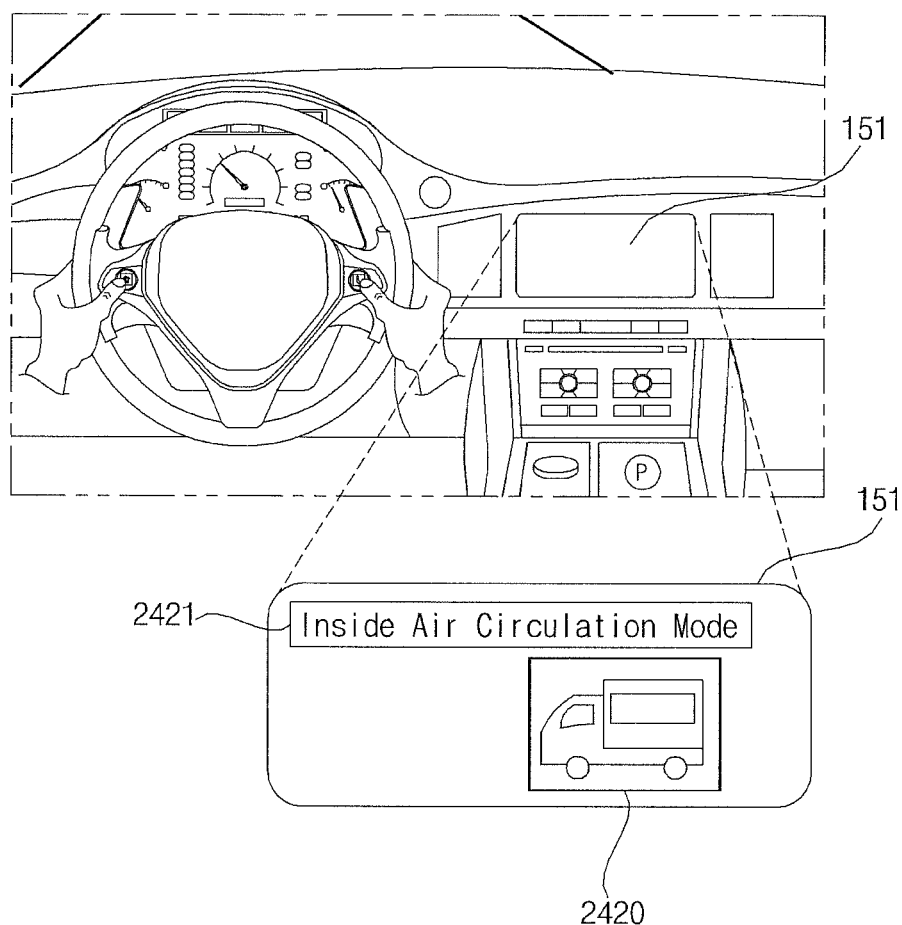

FIGS. 23A and 23B illustrate example methods of outputting switching cause information.

Referring to FIGS. 23A and 23B, if the outside air circulation mode or the inside air circulation mode is switched to based on an object, the processor 170 may control output of switching cause information through the output unit 150.

As illustrated in FIG. 23A, the processor 170 may control display of switching cause information 2410 on the display unit 151. The processor 170 may control display of information (2421 in FIG. 23B) indicating whether the outside air circulation mode or the inside air circulation mode is switched to on the display unit 151.

As illustrated in FIG. 23B, the processor 170 may control display of an image 2420 corresponding to switching cause information on the display unit 151. In this case, if the outside air circulation mode or the inside air circulation mode is switched to without the image displayed on the display unit 151, the image may be controlled to become clear gradually in correspondence with a switching speed.

Figure 24A:
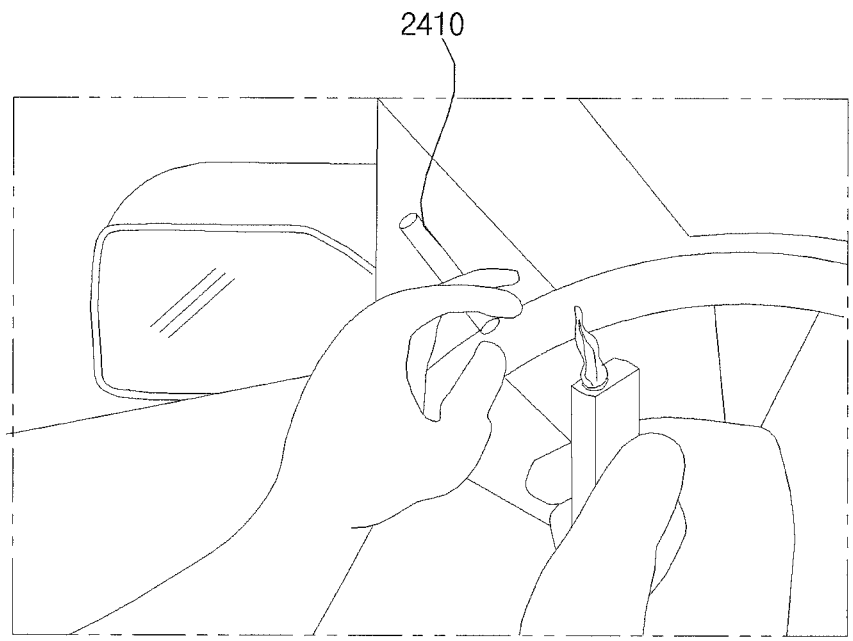
FIGS. 24A and 24B are diagrams illustrating an example method of operating an air circulation control device for a vehicle based on an object identified from an inside image of a vehicle.
Figure 24B:
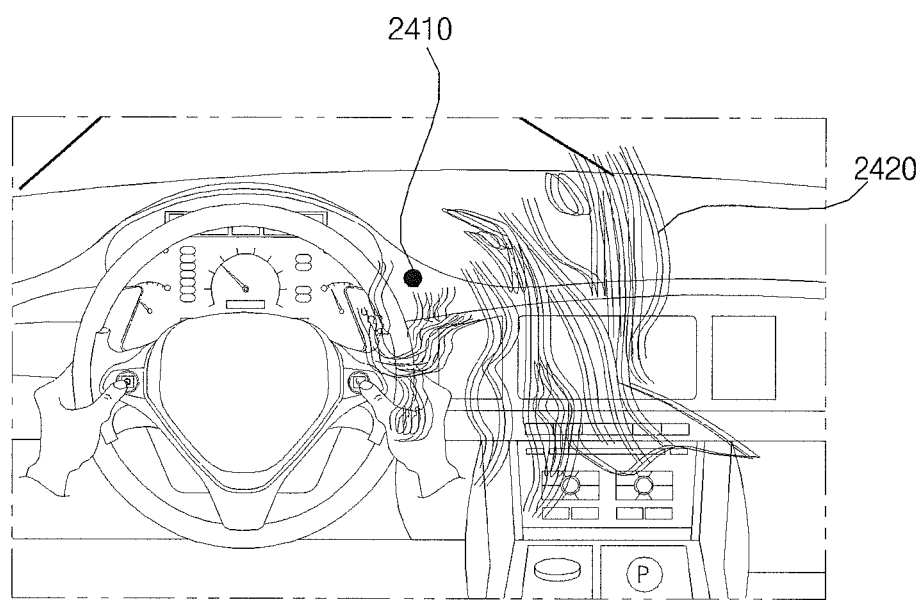

FIGS. 24A and 24B illustrate example methods of operating an air circulation control device for a vehicle based on an object identified from an inside image of a vehicle.

The vehicle air circulation control device 100 may further include an internal camera module 2410. The internal camera module 2410 may be disposed inside the vehicle and acquire an image of the interior of the vehicle. The image of the interior of the vehicle acquired from the internal camera module 2410 may be transmitted to the processor 170.

Referring to FIG. 24A, the processor 170 may detect a cigarette or cigarette smoke in the image of the interior of the vehicle. Upon detection of a cigarette 2401 or cigarette smoke, the processor 170 may provide a signal for controlling switching to the outside air circulation mode. The processor 170 may provide a signal for controlling opening of the sunroof or a window.

Referring to FIG. 24B, the processor 170 may detect cigarette smoke 2420 in an image of the interior of the vehicle. If the detected smoke is not from a cigarette, the processor 170 may provide a signal for controlling switching to the outside air circulation mode. The processor 170 may provide a control signal for introducing air into the vehicle with maximum output to the HVAC unit. The processor 170 may provide a signal for controlling opening of the sunroof or a window. The processor 170 may output an alarm through the output unit (150 in FIG. 4). The processor 170 may elicit escape by outputting a warning and a stop indication alarm. The processor 170 may output location information about an extinguisher. The processor 170 may provide state information to the external devices 600, 601, and 602 by transmitting a signal to the V2X communication module 716 through the interface unit 130.

What is claimed is:

1. An air circulation control device for a vehicle, the air circulation control device comprising:
   a camera configured to capture an outside image of the vehicle; and
   a processor configured to:
   identify an object from the outside image,
   determine that an outside-inside air circulation mode is a first air circulation mode or a second air circulation mode based on the identified object,
   provide a signal including information indicating the outside-inside air circulation mode, and
   based on the signal, control a heating, ventilating, and air conditioning (HVAC) unit to switch between the first air circulation mode and the second air circulation mode,
   wherein the processor is further configured to:
   determine that the outside-inside air circulation mode is the first air circulation mode or the second air circulation mode based on location information, wind direction information, or wind speed information, the location information indicating a location of the object, the wind direction information indicating a wind direction relative to the vehicle, and the wind speed information indicating a wind speed relative to the vehicle,
   wherein the processor is further configured to:
   determine a wind direction from the object toward the vehicle based on the outside image, the location information, and the wind direction information,
   determine a distance between the object and the vehicle,
   determine that a current location of the object is a sidewalk adjacent to a traveling lane of the vehicle, and
   determine, based on the wind direction, the distance, and the current location of the object, that the outside-inside air circulation mode is the first air circulation mode or the second air circulation mode.

2. The air circulation control device of claim 1, wherein the processor is configured to generate the location information, the wind direction information, and the wind speed information based on the outside image.

3. The air circulation control device of claim 1, wherein the processor is configured to:
   determine a wind direction from the object toward the vehicle,
   determine a distance between the object and the vehicle, and
   determine, based on the wind direction and the distance, that the outside-inside air circulation mode is the first air circulation mode or the second air circulation mode.

4. The air circulation control device of claim 1, wherein the processor is configured to:
   determine a wind direction from the object toward the vehicle based on the outside image, the location information, and the wind direction information,
   determine a distance between the object and the vehicle,
   determine that a current lane that the object is located is a traveling lane of the vehicle or an opposite lane of the vehicle, and
   determine, based on the wind direction, the distance, and the current lane, that the current air circulation mode is the first air circulation mode or the second air circulation mode.

5. The air circulation control device of claim 1, wherein the processor is configured to determine that the outside-inside air circulation mode is the first air circulation mode or the second air circulation mode based on distance information indicating a distance between the object and the vehicle.

6. The air circulation control device of claim 5, wherein the processor is configured to determine that the outside-inside air circulation mode is the first air circulation mode or the second air circulation mode based on wind direction information or wind speed information, the wind direction information indicating a wind direction relative to the vehicle, and the wind speed information indicating a wind speed relative to the vehicle.

7. The air circulation control device of claim 5, wherein the processor is configured to generate the distance information based on the outside image.

8. The air circulation control device of claim 5, further comprising one or more object sensors configured to measure a distance between an object and the vehicle,
   wherein the processor is configured to obtain the distance information from the one or more object sensors.

9. The air circulation control device of claim 5, wherein the processor is configured to determine that the outside-inside air circulation mode is the first air circulation mode or the second air circulation mode based on speed information indicating a speed of the vehicle relative to the object.

10. The air circulation control device of claim 1, wherein the processor is configured to provide, based on a determination that the outside-inside air circulation mode is the first air circulation mode, a signal that results in a process to reduce condensation inside the vehicle.

11. The air circulation control device of claim 1, wherein the processor is configured to provide, based on a determination that the outside-inside air circulation mode is the first air circulation mode, a signal that adjusts a temperature inside the vehicle.

12. The air circulation control device of claim 1, wherein the processor is configured to:
   determine that a current temperature inside the vehicle satisfies a threshold temperature, and
   provide, based on the determination that the current temperature inside the vehicle satisfies the threshold temperature, a signal including information indicating a duration of the outside-inside air circulation mode.

13. The air circulation control device of claim 1, wherein the processor is configured to:
   identify a traffic light in the outside image,
   determine whether the identified traffic light indicates go or stop, and
   determine, based on the determination whether the identified traffic light indicates go or stop, that the outside-inside air circulation mode is the first air circulation mode or the second air circulation mode.

14. The air circulation control device of claim 1, wherein the processor is configured to:
identify one or more vehicles from the outside image,
determine that a number of the one or more vehicles satisfies a threshold, and
determine, based on the determination that the number of the one or more vehicles satisfies the threshold, that the outside-inside air circulation mode is the first air circulation mode or the second air circulation mode.

15. The air circulation control device of claim 1, wherein the processor is configured to:
obtain a current speed of the vehicle,
determine that the vehicle is travelling or stopping based on the current speed, and
determine, based on the determination that the vehicle is travelling or stopping, that the outside-inside air circulation mode is the first air circulation mode or the second air circulation mode.

16. The air circulation control device of claim 15, wherein the processor is configured to determine, based on the determination whether the object is identified, that the outside-inside air circulation mode is the first air circulation mode or the second air circulation mode.

17. The air circulation control device of claim 1, wherein the processor is configured to:
identify an intersection from the outside image,
identify a first vehicle crossing the intersection,
determine that the first vehicle is within a threshold distance from the vehicle,
determine whether the vehicle is traveling or stopping, and
determine, based on the determination that the first vehicle is within the threshold distance from the vehicle and the determination of whether the vehicle is travelling or stopping, that the outside-inside air circulation mode is the first air circulation mode or the second air circulation mode.

18. The air circulation control device of claim 1, wherein the processor is configured to:
determine whether the identified object is one of a diesel vehicle, a motor cycle, a garbage vehicle, a truck, a construction sign board, a soundproof wall, a parking lot gate, an automatic wash gate, a vehicle carrying a smoking passenger, or a smoking pedestrian, and
determine, based on the determination of whether the identified object is one of a diesel vehicle, a motor cycle, a garbage vehicle, a truck, a construction sign board, a soundproof wall, a parking lot gate, an automatic wash gate, a vehicle carrying a smoking passenger, or a smoking pedestrian, that the outside-inside air circulation mode is the first air circulation mode or the second air circulation mode.

19. The air circulation control device of claim 1, wherein the processor is configured to:
determine whether the identified object is one or more trees, one or more flowers, or an orchard, and
determine, based on the determination of whether the identified object is the one or more trees, the one or more flowers, or the orchard, that the outside-inside air circulation mode is the first air circulation mode or the second air circulation mode.

20. The air circulation control device of claim 1, further comprising an interface unit configured to communicate with a user device or a control unit of the vehicle,
wherein the processor is configured to:
receive user information using the interface unit, and
determine, based on the user information, that the outside-inside air circulation mode is the first air circulation mode or the second air circulation mode.

21. The air circulation control device of claim 20, wherein the processor is configured to:
determine whether the user information includes pollen allergy information of a user,
determine whether the identified object includes one or more allergy-causing plants, and
determine, based on the pollen allergy information of the user and the determination of whether the identified object includes one or more allergy-causing plants, that the outside-inside air circulation mode is the first air circulation mode or the second air circulation mode.

22. The air circulation control device of claim 1, wherein the processor is configured to:
determine that the identified object includes a restaurant sign or smoke from a restaurant, and
determine, based on the determination that the identified object includes a restaurant sign or smoke from a restaurant, that the outside-inside air circulation mode is the first air circulation mode or the second air circulation mode.

23. The air circulation control device of claim 1, further comprising an odor sensor configured to detect a certain type of material from outside air of the vehicle,
wherein the processor is configured to determine, based on the type of material detected by the odor sensor, that the outside-inside air circulation mode is the first air circulation mode or the second air circulation mode.

24. The air circulation control device of claim 23, wherein the processor is configured to:
determine whether the type of material detected by the odor sensor satisfies a threshold level, and
determine, based on the determination that the type of material detected by the odor sensor satisfies the threshold level, that the outside-inside air circulation mode is the first air circulation mode or the second air circulation mode.

25. The air circulation control device of claim 1, further comprising an output unit configured to communicate with an external device for providing the signal including information indicating the outside-inside air circulation mode.

26. The air circulation control device of claim 25, wherein the output unit includes a display unit and the processor is configured to provide graphics data associated with the outside-inside air circulation mode to the display unit.

27. The air circulation control device of claim 26, wherein the graphics data include first graphics data indicating the outside-inside air circulation mode and second graphics data indicating a cause of changing an air circulation mode.

28. The air circulation control device of claim 1, further comprising an interface unit configured to communicate with a user device or a control unit of the vehicle,
wherein the processor is configured to:
obtain a current temperature inside the vehicle and a threshold temperature that reduces risk of condensation inside the vehicle using the interface unit,
determine, based on the current temperature inside the vehicle and the threshold temperature that reduces risk of condensation inside the vehicle, whether condensation will occur inside the vehicle, and
provide, based on a determination that condensation will likely occur inside the vehicle, a signal that results in a process directed to reducing condensation inside the vehicle.

29. The air circulation control device of claim 28, wherein the signal that results in a process directed to reducing condensation inside the vehicle includes information indicating a temperature difference between the current temperature inside the vehicle and the threshold temperature that reduces risk of condensation inside the vehicle.

30. The air circulation control device of claim 29, wherein the processor is configured to provide, based on a determination that condensation will occur inside the vehicle, a signal for controlling a window or a sunroof.

31. The air circulation control device of claim 30, wherein the signal for controlling the window or the sunroof includes information indicating a temperature difference between the current temperature inside the vehicle and the threshold temperature that reduces risk of condensation inside the vehicle.

32. The air circulation control device of claim 1, further comprising an interface unit configured to obtain vehicle internal humidity information,
wherein the processor is configured to
determine whether condensation will occur inside the vehicle based on the vehicle internal humidity information, and
provide, based on the determination that condensation will occur inside the vehicle, a signal that results in a process that reduces condensation inside the vehicle.

33. The air circulation control device of claim 1, wherein the first air circulation mode indicates circulating air inside the vehicle without bringing in air outside the vehicle and the second air circulation mode indicates circulating air inside the vehicle by bringing in air outside the vehicle.

34. The air circulation control device of claim 1, further comprising one or more wind sensors configured to detect a wind direction and a wind speed,
wherein the processor is configured to generate the wind direction information and the wind speed information based on the wind direction and the wind speed that are detected by the one or more wind sensors.

35. The air circulation control device of claim 1, wherein the processor is configured to:
determine a duration of the first air circulation mode based on a vehicle ambient temperature in a state in which the outside-inside air circulation mode has been switched to the first air circulation mode according to the identified object.

36. The air circulation control device of claim 35, wherein the processor is configured to:
determine a distance between the identified object and the vehicle,
provide a control signal to switch to the first air circulation mode in a state in which (i) the distance between the identified object and the vehicle satisfies a first distance value and (ii) the vehicle ambient temperature satisfies a first temperature value,
provide the control signal to switch to the first air circulation mode in a state in which (i) the distance between the identified object and the vehicle satisfies a second distance value and (ii) the vehicle ambient temperature satisfies a second temperature value,
wherein the second temperature value is greater than the first temperature value and the second distance value is greater than the first distance value.

37. A vehicle comprising:
an air circulation controlling unit; and
an air quality monitoring unit that includes:
a camera configured to capture an outside image of the vehicle, and
a processor configured to (i) identify an object from the outside image, (ii) determine that an outside-inside air circulation mode is a first air circulation mode or a second air circulation mode based on the identified object, and (iii) provide a signal including information indicating the outside-inside air circulation mode,
wherein the air circulation controlling unit is configured to circulate air inside the vehicle based on the signal including information indicating the outside-inside air circulation mode,
wherein the processor is further configured to:
determine that the outside-inside air circulation mode is the first air circulation mode or the second air circulation mode based on location information, wind direction information, or
wind speed information, the location information indicating a location of the object, the wind direction information indicating a wind direction relative to the vehicle, and the wind speed information indicating a wind speed relative to the vehicle,
wherein the processor is further configured to:
determine a wind direction from the object toward the vehicle based on the outside image, the location information, and the wind direction information,
determine a distance between the object and the vehicle,
determine that a current location of the object is a sidewalk adjacent to a traveling lane of the vehicle, and
determine, based on the wind direction, the distance, and the current location of the object, that the outside-inside air circulation mode is the first air circulation mode or the second air circulation mode.

* * * * *